US011870069B2

(12) United States Patent
Wu et al.

(10) Patent No.: US 11,870,069 B2
(45) Date of Patent: *Jan. 9, 2024

(54) CATHODE ACTIVE MATERIALS FOR LITHIUM-ION BATTERIES

(71) Applicant: Apple Inc., Cupertino, CA (US)

(72) Inventors: Huiming Wu, San Jose, CA (US); Hongli Dai, Los Altos, CA (US); Dapeng Wang, Cupertino, CA (US); Christopher S. Johnson, Naperville, IL (US); John David Carter, Bolingbrook, IL (US); Yanjie Cui, Arlington Heights, CA (US); Arturo Gutierrez, Naperville, IL (US); Hakim H Iddir, Hoffman Estates, IL (US); Arthur Jeremy Kropf, Westmont, IL (US); Yan Li, Westmont, IL (US); Victor A. Maroni, Naperville, IL (US); Anh D. Vu, Naperville, IL (US); Xiaoping Wang, Naperville, IL (US); Zhenzhen Yang, Westmont, IL (US)

(73) Assignee: Apple Inc., Cupertino, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 16/178,304

(22) Filed: Nov. 1, 2018

(65) Prior Publication Data
US 2019/0074514 A1 Mar. 7, 2019

Related U.S. Application Data

(60) Division of application No. 15/804,186, filed on Nov. 6, 2017, now Pat. No. 10,141,572, which is a
(Continued)

(51) Int. Cl.
*H01M 4/525* (2010.01)
*H01M 4/131* (2010.01)
(Continued)

(52) U.S. Cl.
CPC .......... *H01M 4/525* (2013.01); *H01M 4/131* (2013.01); *H01M 4/523* (2013.01); *H01B 1/08* (2013.01);
(Continued)

(58) Field of Classification Search
None
See application file for complete search history.

(56) References Cited

U.S. PATENT DOCUMENTS 5,744,262 A 4/1998 Cheng et al.
5,993,998 A 11/1999 Yasuda
(Continued)

FOREIGN PATENT DOCUMENTS

CN 1588675 3/2005
CN 1702891 11/2005
(Continued)

OTHER PUBLICATIONS

U.S. Appl. No. 16/057,388, filed Aug. 7, 2018, Dai et al.
(Continued)

*Primary Examiner* — Laura Weiner
(74) *Attorney, Agent, or Firm* — BakerHostetler

(57) ABSTRACT

Compounds, powders, and cathode active materials that can be used in lithium ion batteries are described herein. Methods of making such compounds, powders, and cathode active materials are described.

9 Claims, 41 Drawing Sheets

Related U.S. Application Data continuation of application No. 15/458,618, filed on Mar. 14, 2017, now Pat. No. 10,164,256.

(60) Provisional application No. 62/307,964, filed on Mar. 14, 2016, provisional application No. 62/307,956, filed on Mar. 14, 2016.

(51) Int. Cl.

| | |
|---|---|
| *H01M 4/52* | (2010.01) |
| *H01M 10/0525* | (2010.01) |
| *H01M 4/36* | (2006.01) |
| *H01M 4/505* | (2010.01) |
| *H01M 4/485* | (2010.01) |
| *H01M 4/66* | (2006.01) |
| *H01B 1/08* | (2006.01) |
| *H01M 4/50* | (2010.01) |
| *H01M 4/58* | (2010.01) |
| *H01M 4/02* | (2006.01) |
| *H01M 4/04* | (2006.01) |

(52) U.S. Cl.
CPC .......... *H01M 4/0471* (2013.01); *H01M 4/366* (2013.01); *H01M 4/485* (2013.01); *H01M 4/502* (2013.01); *H01M 4/505* (2013.01); *H01M 4/582* (2013.01); *H01M 4/5825* (2013.01); *H01M 4/661* (2013.01); *H01M 10/0525* (2013.01); *H01M 2004/021* (2013.01); *H01M 2004/028* (2013.01); *H01M 2220/30* (2013.01)

(56) References Cited

U.S. PATENT DOCUMENTS

| | | | |
|---|---|---|---|
| 6,007,947 A | 12/1999 | Mayer | |
| 6,077,496 A | 6/2000 | Hiraoka et al. | |
| 6,677,082 B2 | 1/2004 | Thackeray et al. | |
| 6,680,143 B2 | 1/2004 | Thackeray et al. | |
| 6,805,996 B2 | 10/2004 | Hosoya | |
| 6,878,487 B2 | 4/2005 | Cho et al. | |
| 7,135,252 B2 | 11/2006 | Thackeray et al. | |
| 7,179,565 B2 | 2/2007 | Okochi et al. | |
| 7,205,072 B2 | 4/2007 | Kang et al. | |
| 7,235,193 B2 | 6/2007 | Park et al. | |
| 7,238,450 B2 | 6/2007 | Howard, Jr. et al. | |
| 7,255,963 B2 | 8/2007 | Nagayama et al. | |
| 7,314,682 B2 | 1/2008 | Thackeray et al. | |
| 7,314,684 B2 | 1/2008 | Kang et al. | |
| 7,435,402 B2 | 10/2008 | Kang et al. | |
| 7,468,223 B2 | 12/2008 | Thackeray et al. | |
| 7,655,361 B2 | 2/2010 | Kim et al. | |
| 7,691,535 B2 | 4/2010 | Shiozaki et al. | |
| 7,732,096 B2 | 6/2010 | Thackeray et al. | |
| 7,754,384 B2 | 7/2010 | Patoux et al. | |
| 7,897,674 B2 | 3/2011 | Zaghib | |
| 7,923,149 B2 | 4/2011 | Hwang et al. | |
| 8,148,011 B2 | 1/2012 | Thackeray et al. | |
| 8,187,746 B2 | 5/2012 | Chen et al. | |
| 8,206,852 B2 | 6/2012 | Chang et al. | |
| 8,277,683 B2 | 10/2012 | Deng et al. | |
| 8,337,727 B2 | 12/2012 | Chen et al. | |
| 8,343,663 B2 | 1/2013 | Jung et al. | |
| 8,383,077 B2 | 2/2013 | Thackeray et al. | |
| 8,801,960 B2 | 8/2014 | Ueda et al. | |
| 8,802,290 B2 | 8/2014 | Li et al. | |
| 9,166,222 B2 | 10/2015 | Amiruddin et al. | |
| 9,716,265 B2 | 7/2017 | Dai et al. | |
| 10,084,187 B2 | 9/2018 | Dai et al. | |
| 10,128,494 B2 | 11/2018 | Dai et al. | |
| 10,141,572 B2 * | 11/2018 | Wu ........................ | H01M 4/525 |
| 10,164,256 B2 * | 12/2018 | Wu ........................ | H01M 4/525 |
| 10,297,821 B2 | 5/2019 | Dai et al. | |
| 10,297,823 B2 | 5/2019 | Dai et al. | |
| 10,347,909 B2 | 7/2019 | Dai et al. | |
| 10,593,941 B2 | 3/2020 | Dai et al. | |
| 10,597,307 B2 | 3/2020 | Dai et al. | |
| 10,615,413 B2 | 4/2020 | Dai et al. | |
| 11,362,331 B2 * | 6/2022 | Dai ........................ | H01M 4/525 |
| 2002/0061444 A1 | 5/2002 | Kweon et al. | |
| 2002/0114995 A1 | 8/2002 | Thackery | |
| 2002/0136954 A1 | 9/2002 | Thackery | |
| 2002/0182504 A1 | 12/2002 | Imachi et al. | |
| 2003/0013017 A1 | 1/2003 | Nagayama et al. | |
| 2003/0039886 A1 | 2/2003 | Zhang et al. | |
| 2003/0054250 A1 | 3/2003 | Kweon et al. | |
| 2003/0073002 A1 | 4/2003 | Imachi et al. | |
| 2003/0082445 A1 | 5/2003 | Smieth et al. | |
| 2003/0087155 A1 | 5/2003 | Cho et al. | |
| 2003/0134200 A1 | 7/2003 | Tanaka et al. | |
| 2004/0029008 A1 | 2/2004 | Winterberg | |
| 2004/0191633 A1 | 9/2004 | Johnson et al. | |
| 2004/0201948 A1 | 10/2004 | Hosoya et al. | |
| 2004/0213729 A1 | 10/2004 | Suhara et al. | |
| 2004/0253516 A1 | 12/2004 | Yuasa et al. | |
| 2004/0258836 A1 | 12/2004 | Besenhard et al. | |
| 2005/0026040 A1 | 2/2005 | Thackery | |
| 2005/0074675 A1 | 4/2005 | Nishijima et al. | |
| 2005/0130042 A1 | 6/2005 | Liu et al. | |
| 2005/0136329 A1 | 6/2005 | Howard, Jr. et al. | |
| 2005/0181279 A1 | 8/2005 | Hosoya | |
| 2005/0265909 A1 | 12/2005 | Kajiya et al. | |
| 2005/0271948 A1 | 12/2005 | Kang | |
| 2006/0024584 A1 | 2/2006 | Kim et al. | |
| 2006/0068293 A1 | 3/2006 | Kim et al. | |
| 2006/0081818 A1 | 4/2006 | Ito et al. | |
| 2006/0088767 A1 | 4/2006 | Li et al. | |
| 2006/0099508 A1 | 5/2006 | Thackeray et al. | |
| 2006/0159994 A1 | 7/2006 | Dahn et al. | |
| 2006/0177739 A1 | 8/2006 | Endo et al. | |
| 2006/0194118 A1 | 8/2006 | Yew et al. | |
| 2006/0240326 A1 | 10/2006 | Lee | |
| 2007/0048619 A1 | 3/2007 | Inda | |
| 2007/0072086 A1 | 3/2007 | Nakagawa | |
| 2007/0117014 A1 | 5/2007 | Saito et al. | |
| 2007/0122705 A1 | 5/2007 | Paulsen et al. | |
| 2007/0141469 A1 | 6/2007 | Tokunaga et al. | |
| 2007/0172739 A1 | 7/2007 | Visco | |
| 2007/0202407 A1 | 8/2007 | Eberman et al. | |
| 2007/0264573 A1 | 11/2007 | Yamada et al. | |
| 2007/0292761 A1 | 12/2007 | Park et al. | |
| 2008/0057401 A1 | 3/2008 | Mori et al. | |
| 2008/0090150 A1 | 4/2008 | Nakura | |
| 2008/0118836 A1 | 5/2008 | Hwang et al. | |
| 2008/0118847 A1 | 5/2008 | Jung et al. | |
| 2008/0131778 A1 | 6/2008 | Watanabe et al. | |
| 2008/0131781 A1 | 6/2008 | Yong et al. | |
| 2008/0160415 A1 | 7/2008 | Wakita et al. | |
| 2008/0268339 A1 | 10/2008 | Suzuki | |
| 2008/0280205 A1 | 11/2008 | Jiang et al. | |
| 2008/0311473 A1 | 12/2008 | Sasaoka et al. | |
| 2008/0318131 A1 | 12/2008 | Watanabe et al. | |
| 2009/0092903 A1 | 4/2009 | Johnson et al. | |
| 2009/0146115 A1 | 6/2009 | Xiao et al. | |
| 2009/0200510 A1 | 8/2009 | Watanabe et al. | |
| 2009/0202905 A1 | 8/2009 | Morita et al. | |
| 2009/0239148 A1 | 9/2009 | Jiang | |
| 2010/0055567 A1 | 3/2010 | Nakai et al. | |
| 2010/0086853 A1 | 4/2010 | Venkatachalam et al. | |
| 2010/0086854 A1 | 4/2010 | Kumar et al. | |
| 2010/0151332 A1 | 6/2010 | Lopez et al. | |
| 2010/0173197 A1 | 7/2010 | Li et al. | |
| 2010/0304225 A1 | 12/2010 | Pascaly et al. | |
| 2011/0014518 A1 | 1/2011 | Nakai et al. | |
| 2011/0017529 A1 | 1/2011 | Kumar et al. | |
| 2011/0031437 A1 | 2/2011 | Nagase et al. | |
| 2011/0052981 A1 | 3/2011 | Lopez et al. | |
| 2011/0053001 A1 | 3/2011 | Babic et al. | |
| 2011/0065006 A1 | 3/2011 | Ogasa | |
| 2011/0076556 A1 | 3/2011 | Karthikeyan et al. | |
| 2011/0076564 A1 | 3/2011 | Yu et al. | |
| 2011/0081578 A1 | 4/2011 | Chang et al. | |
| 2011/0089369 A1 | 4/2011 | Patoux et al. | |

(56) References Cited

U.S. PATENT DOCUMENTS

| | | |
|---|---|---|
| 2011/0111294 A1 | 5/2011 | Lopez et al. |
| 2011/0111298 A1 | 5/2011 | Lopez et al. |
| 2011/0121240 A1 | 5/2011 | Amine et al. |
| 2011/0136019 A1 | 6/2011 | Amiruddin et al. |
| 2011/0143174 A1 | 6/2011 | Kim |
| 2011/0165463 A1 | 7/2011 | Chang et al. |
| 2011/0165474 A1 | 7/2011 | Im et al. |
| 2011/0171371 A1 | 7/2011 | Li et al. |
| 2011/0171539 A1 | 7/2011 | Patoux et al. |
| 2011/0200864 A1 | 8/2011 | Dai |
| 2011/0200880 A1 | 8/2011 | Yu |
| 2011/0223492 A1 | 9/2011 | Sakitani et al. |
| 2011/0244331 A1 | 10/2011 | Karthikeyan et al. |
| 2011/0294006 A1 | 12/2011 | Amine et al. |
| 2011/0294019 A1 | 12/2011 | Amine et al. |
| 2012/0015250 A1 | 1/2012 | Teng et al. |
| 2012/0028134 A1 | 2/2012 | Kim et al. |
| 2012/0040247 A1 | 2/2012 | Manivannan et al. |
| 2012/0168696 A1 | 7/2012 | Huang et al. |
| 2012/0196176 A1 | 8/2012 | He et al. |
| 2012/0258369 A1 | 10/2012 | Yokoyama et al. |
| 2012/0282522 A1 | 11/2012 | Axelbaum et al. |
| 2012/0295155 A1 | 11/2012 | Deng et al. |
| 2013/0004826 A1 | 1/2013 | Li et al. |
| 2013/0011738 A1 | 1/2013 | Zhou |
| 2013/0101893 A1 | 4/2013 | Dai et al. |
| 2013/0149604 A1 | 6/2013 | Fujiki et al. |
| 2013/0252107 A1 | 9/2013 | Lee et al. |
| 2013/0260249 A1 | 10/2013 | Choi |
| 2013/0344391 A1 | 12/2013 | Yushin et al. |
| 2014/0087065 A1 | 3/2014 | Li et al. |
| 2014/0087254 A1 | 3/2014 | Li et al. |
| 2014/0087256 A1 | 3/2014 | Li et al. |
| 2014/0087261 A1 | 3/2014 | Li et al. |
| 2014/0141331 A1 | 5/2014 | Lee et al. |
| 2014/0158932 A1 | 6/2014 | Sun et al. |
| 2014/0175329 A1 | 6/2014 | Palma et al. |
| 2014/0193693 A1 | 7/2014 | Hoshina et al. |
| 2014/0234715 A1 | 8/2014 | Fasching et al. |
| 2014/0272563 A1 | 9/2014 | Dai et al. |
| 2015/0010819 A1 | 1/2015 | Lee et al. |
| 2015/0140421 A1 | 5/2015 | Ihara et al. |
| 2015/0171423 A1 | 6/2015 | Kim et al. |
| 2015/0180024 A1 | 6/2015 | Nose |
| 2015/0188144 A1 | 7/2015 | Shin et al. |
| 2015/0243971 A1 | 8/2015 | Cho et al. |
| 2015/0303519 A1 | 10/2015 | Hanazaki |
| 2015/0311522 A1 | 10/2015 | Fang et al. |
| 2016/0036043 A1 | 2/2016 | Dai et al. |
| 2016/0133929 A1 | 5/2016 | Hah et al. |
| 2016/0156032 A1 | 6/2016 | Lee et al. |
| 2016/0260965 A1 | 9/2016 | Wu et al. |
| 2016/0293941 A1 | 10/2016 | Yamasaki et al. |
| 2016/0315315 A1 | 10/2016 | Olken et al. |
| 2016/0351973 A1 | 12/2016 | Albano et al. |
| 2017/0018767 A1 | 1/2017 | Park et al. |
| 2017/0092949 A1 | 3/2017 | Dai et al. |
| 2017/0133678 A1 | 5/2017 | Ozoemena et al. |
| 2017/0155145 A1 | 6/2017 | Kusachi et al. |
| 2017/0187071 A1 | 6/2017 | Wang et al. |
| 2017/0187072 A1 | 6/2017 | Wang et al. |
| 2017/0214045 A1 | 7/2017 | Dai et al. |
| 2017/0263917 A1 | 9/2017 | Dai et al. |
| 2017/0263928 A1 | 9/2017 | Dai et al. |
| 2017/0263929 A1 | 9/2017 | Wu et al. |
| 2017/0279162 A1 | 9/2017 | Vissers et al. |
| 2017/0346082 A1 | 11/2017 | Dai et al. |
| 2018/0062156 A1 | 3/2018 | Wu et al. |
| 2018/0079655 A1 | 3/2018 | Dai et al. |
| 2018/0083277 A1 | 3/2018 | Dai et al. |
| 2018/0083278 A1 | 3/2018 | Dai et al. |
| 2018/0114983 A9 | 4/2018 | Dai et al. |
| 2018/0114984 A9 | 4/2018 | Wu et al. |
| 2018/0123117 A9 | 5/2018 | Dai et al. |
| 2018/0215629 A1 | 8/2018 | Honma et al. |
| 2018/0257947 A9 | 9/2018 | Dai et al. |
| 2018/0294522 A1 | 10/2018 | Dai et al. |
| 2018/0331360 A1 | 11/2018 | Meng et al. |
| 2018/0351173 A1 | 12/2018 | Dai et al. |
| 2019/0027747 A9 | 1/2019 | Dai et al. |
| 2019/0051893 A1 | 2/2019 | Zhang et al. |
| 2019/0067686 A1 | 2/2019 | Dai et al. |
| 2020/0044242 A1 | 2/2020 | Wang et al. |
| 2020/0058933 A1 | 2/2020 | Wu et al. |
| 2020/0075951 A1 | 3/2020 | Dai et al. |
| 2020/0189930 A1 | 6/2020 | Dai et al. |
| 2020/0259208 A1 | 8/2020 | Yamamoto |
| 2020/0266435 A1 | 8/2020 | Dai et al. |
| 2020/0358093 A1 | 11/2020 | Oshita et al. |

FOREIGN PATENT DOCUMENTS

| | | |
|---|---|---|
| CN | 1770514 | 10/2006 |
| CN | 101083321 | 12/2007 |
| CN | 101088918 | 12/2007 |
| CN | 101150190 | 3/2008 |
| CN | 101223660 | 7/2008 |
| CN | 101284681 | 10/2008 |
| CN | 101304090 | 11/2008 |
| CN | 101355161 | 1/2009 |
| CN | 101510603 | 8/2009 |
| CN | 101694877 | 4/2010 |
| CN | 101734728 | 6/2010 |
| CN | 102110808 | 6/2011 |
| CN | 102195094 A | 9/2011 |
| CN | 102299299 | 12/2011 |
| CN | 102332585 | 1/2012 |
| CN | 102368548 | 3/2012 |
| CN | 101789499 | 4/2012 |
| CN | 102439765 A | 5/2012 |
| CN | 102479947 | 5/2012 |
| CN | 102484249 | 5/2012 |
| CN | 102544575 | 7/2012 |
| CN | 102646831 | 8/2012 |
| CN | 102683666 | 9/2012 |
| CN | 102723459 | 10/2012 |
| CN | 102751481 | 10/2012 |
| CN | 102881891 | 1/2013 |
| CN | 103151520 | 6/2013 |
| CN | 103296249 | 9/2013 |
| CN | 102386381 | 1/2014 |
| CN | 103560250 | 2/2014 |
| CN | 103606674 | 2/2014 |
| CN | 103682311 | 3/2014 |
| CN | 103872302 | 6/2014 |
| CN | 103872315 | 6/2014 |
| CN | 103972493 | 8/2014 |
| CN | 104022280 | 9/2014 |
| CN | 104201323 | 12/2014 |
| CN | 104300138 | 1/2015 |
| CN | 104466099 | 3/2015 |
| CN | 104577128 | 4/2015 |
| CN | 104868122 | 8/2015 |
| CN | 104966833 A | 10/2015 |
| CN | 105161710 | 12/2015 |
| CN | 105895909 A | 8/2016 |
| CN | 106450211 | 2/2017 |
| DE | 10352063 | 6/2005 |
| JP | 4-267053 | 9/1992 |
| JP | H-10-087327 | 4/1998 |
| JP | 2001-167763 * | 6/2001 |
| JP | 2001-319652 A | 11/2001 |
| JP | 2002-201028 | 7/2002 |
| JP | 2004-047180 A | 2/2004 |
| JP | 2005-101003 | 4/2005 |
| JP | 2005-149867 | 6/2005 |
| JP | 2005-289700 | 10/2005 |
| JP | 2005-302507 A | 10/2005 |
| JP | 2006-173137 * | 6/2006 |
| JP | 2006-344509 | 12/2006 |
| JP | 2007-091502 | 4/2007 |
| JP | 2007-517368 | 6/2007 |
| JP | 2007-173113 | 7/2007 |
| JP | 2009-4311 | 1/2009 |

(56) References Cited

FOREIGN PATENT DOCUMENTS

| | | |
|---|---|---|
| JP | 2009-217981 | 9/2009 |
| JP | 2010-541166 | 12/2010 |
| JP | 2011-105594 | 6/2011 |
| JP | 2011-113869 | 6/2011 |
| JP | 2013-180917 | 9/2013 |
| JP | 2017-191738 | 10/2014 |
| JP | 2015-213038 | 11/2015 |
| JP | 2016-517615 A | 6/2016 |
| KR | 10-2002-0063501 | 8/2002 |
| KR | 10-2005-0121727 | 12/2005 |
| KR | 10-2014-0073856 | 6/2014 |
| KR | 10-2014-0108615 | 9/2014 |
| KR | 2016-0010313 * | 1/2016 |
| KR | 101731473 | 4/2017 |
| TW | 201126798 | 8/2011 |
| TW | 201311545 A | 3/2013 |
| TW | 201342695 | 10/2013 |
| WO | WO 2003/049216 A1 | 6/2003 |
| WO | WO 2003/081698 A1 | 10/2003 |
| WO | WO 2004/045015 | 5/2004 |
| WO | WO 2004/102700 A1 | 11/2004 |
| WO | WO 2004/107480 | 12/2004 |
| WO | WO 2008/069351 | 6/2008 |
| WO | WO 2009/120515 | 10/2009 |
| WO | WO 2010/011569 | 1/2010 |
| WO | WO 2010/139404 | 12/2010 |
| WO | WO 2011/020073 | 2/2011 |
| WO | WO 2011/054441 | 5/2011 |
| WO | WO 2013/048048 | 4/2013 |
| WO | WO 2014/014913 | 1/2014 |
| WO | WO 2014/119165 | 8/2014 |
| WO | WO 2016/143572 | 9/2016 |
| WO | WO 2019/211366 A1 | 11/2019 |

OTHER PUBLICATIONS

U.S. Appl. No. 16/175,093, filed Oct. 30, 2018, Dai et al.

Zhao et al., "Progress of Research on the Li-rich Cathode Materials xLi2MnO3(1-x)LiMO2(M+Co, Fe, Ni1/2Mn1/2 . . . ) for Li-ion Batteries," Journal of Inorganic Materials, vol. 26(7), pp. 673-679, Jul. 2011.

Lee et al., "Characteristics of LiCoO2 and Its Precursor Synthesized by a Uniform Precipitation Method," Electrochemical and Solid-State Letters, 2010, vol. 13, No. 7, pp. A81-A84.

Kobayashi et al., "Study on the Crystal and Electronic Structures of the Layered Li2Mo3—LiMo2 Materials in Li De-Intercalation Process," *Photon Factory Activity Report*, 2012, vol. 29, No. 2011, 1 pp.

Giordano et al., "Metal Nitride and Metal Carbide Nanoparticles by a Soft Urea Pathway," *Chem. Mater.*, 2009, vol. 21, pp. 5136-5144.

Dou et al., "Synthesis and electrochemical properties of layered LiNi0.5-xMn0.5-xCo2xO2 for lithium-ion battery from nickel manganese cobalt precursor," *J Solid State Electrochem*, (2011), vol. 15, pp. 399-404.

Li, "Layered Oxides Li1+xM1—xO2 (M=Ni, Mn, Co, Al) as Cathode Materials for Rechargeable Lithium Ion Batteries," Dissertation, Submitted in partial fulfillment of the requirements for the degree of Doctor of Philosophy in Materials Science and Engineering in the Graduate School of Binghamton University State University of New York, Jul. 22, 2011, Published by UMI Dissertation Publishing, UMI No. 3474185, 158 pages.

Hu et al., "Ni, Mn—Co doped High-Voltage LiCoO2 Cathode Material for Lithium Ion Batteries," Chinese Journal of Inorganic Chemistry, 2015, vol. 31, Issue 1, pp. 159-165.

Rodrigues et al., "A novel coprecipitation method towards the synthesis of NiXMnXCo(1-2X)(OH)2 for the preparation of lithium metal oxides," *J Solid State Electrochem*, 2012, vol. 16, pp. 1121-1132.

Cho et al., "LiCoO2 Cathode Material That Does Not Show a Phase Transition from Hexagonal to Monoclinic Phase," 2001, *Journal of The Electrochemical Society*, vol. 148, No. 10, pp. A1110-A1115.

Jung et al., "Enhanced Stability of LiCoO2 Cathodes in Lithium-Ion Batteries Using Surface Modification by Atomic Layer Deposition," 2010, *Journal of The Electrochemical Society*, vol. 157, No. 1, pp. A75-A81.

Koyama et al., "First principles study of dopant solubility and defect chemistry in Li CoO2," *J. Mater. Chem A.*, 2014, vol. 2, pp. 11235-11245.

Arunkumar et al., "Chemical and structural instability of the chemically delithiated (1-z) Li[Li$_{1/3}$Mn$_{2/3}$]O$_2$ (z) Li[Co$_{1-y}$Ni$_y$]O$_2$ (0 ≤ y ≤ 1 and 0 ≤ z ≤ 1) solid solution cathodes," *Journal of Materials Chemistry*, 2008, vol. 18, pp. 190-198.

Sun et al., "The Role of AlF3 Coatings in Improving Electrochemical Cycling of Li-Enriched Nickel-Manganese Oxide Electrodes for Li-Ion Batteries," *Adv. Mater.*, 2012, vol. 24, pp. 1192-1196.

Robertson et al., "Layered Li$_x$Mn$_{1-y}$Co$_y$O$_2$ Intercalation Electrodes—Influence of Ion Exchange on Capacity and Structure upon Cycling," *Chem. Mater.*, 2001, vol. 13, pp. 2380-2386.

Patoux et al., "Layered Manganese Oxide Intergrowth Electrodes for Rechargeable Lithium Batteries. 2. Substitution with Al," *Chem. Mater.*, 2005, vol. 17, pp. 1044-1054.

Myung et al., "Role of Alumina Coating on Li—Ni—Co—Mn—O Particles as Positive Electrode Material for Lithium-Ion Batteries," *Chem. Mater.*, 2005, vol. 17, pp. 3695-3704.

Wang et al., "Synthesis of Li$_2$MnO$_3$-stabilized LiCoO$_2$ cathode material by spray-drying method and its high voltage performance," *Journal of Alloys and Compounds*, 2015, vol. 626, pp. 228-233.

Zeng et al., "Cation ordering in Li[NixMnxCo(1-2x)]O-2-layered cathode materials: A nuclear magnetic resonance (NMR), pair distribution function, X-ray absorption spectroscopy, and electrochemical study," *Chemistry of Materials*, 2007, vol. 19. No. 25, pp. 6277-6289.

Zeng et al., "Investigation of the Structural Changes in Li[NiyMnyCo(1-2y)]O-2 (y=0.05) upon Electrochemical Lithium Deintercalation," *Chemistry of Materials*, 2010, vol. 22, No. 3, pp. 1209-1219.

Saadoune et al., "LiNi0.1Mn0.1Co0.8O2 electrode material: Structural changes upon lithium electrochemical extraction," *Electrochimica Acta*, 2010, vol. 55, No. 18, pp. 5180-5185.

Bentaleb et al., "On the LiNi0.2Mn0.2Co0.6O2 positive electrode material," *Journal of Power Sources*, 2010, vol. 195, No. 5, pp. 1510-1515.

Ben Kamel et al, "Local Structure and electrochemistry of LiNiyMnyCo1-2y)O2 electrode materials for Li-ion batteries," *Ionics*, 2008, vol. 14, No. 2, pp. 89-97.

Stoyanova et al., "High-Frequency Electron Paramagnetic Resonance Analysis of the Oxidation State and Local Structure of Ni and Mn Ions in Ni,Mn-Codoped LiCoO2," *Inorganic Chemistry*, 2010, vol. 49, No. 4, pp. 1932-1941.

Menetrier et al., "The insulator-metal transition upon lithium deintercalation from LiCoO2: electronic properties and Li-7 NMR Study," *Journal of Materials Chemistry*, 1999, vol. 9, No. 5, pp. 1135-1140.

Iddir et al., "Stability of Li- and Mn-Rich Layered-Oxide Cathodes within the First-Charge Voltage Plateau," *Journal of the Electrochemical Society*, 2016, vol. 163, No. 8, pp. A1784-A1789.

Seong-Min Bak et al., "Structural Changes and Thermal Stability of Charged LiNixMnyCozO2 Cathode Materials Studied by Combined In Situ Time-Resolved XRD and Mass Spectroscopy," *ACS Appl. Mater. Interfaces*, 2014, vol. 6, pp. I.22594-22601.

Nam et al. "Ammonia-free coprecipitation synthesis of a Ni—Co—Mn hydroxide precursor for high-performance battery cathode materials," *Green Chemistry*, 2015. vol. 17, pp. 1127.

Xie et al., "An improved continuous co-precipitation method to synthesize LiNi0.80Co0.15Al0.05O2 cathode material," *Journal of Alloys and Compounds*, 2016, vol. 666, pp. 84-87.

Rouse et al., "Electrochemical Studies of Single Crystals of Lithiated Nickel Oxide," *Journal of The Electrochemical Society*, Feb. 1966, vol. 113, No. 2, pp. 184-190.

Jin et al., "Observation of Bulk Superconductivity in Na$_x$CoO$_2$—yH$_2$O and Na$_x$CoO$_2$•yD$_2$O Powder and Single Crystals," Phys Rev Lett, 2008, vol. 91, Issue 21, id. 217001, 4 pages.

Franger et al., "Chemistry and Electrochemistry of Low-Temperature Manganese Oxides as Lithium Intercalation Compounds," *Journal of The Electrochemical Society*, 2000, vol. 147, No. 9, pp. 3226-3230.

(56) References Cited

OTHER PUBLICATIONS

Lu et al., "Layered Li[Ni$_x$CO$_{1-2x}$Mn$_x$]O$_2$ Cathode Materials for Lithium-Ion Batteries," *Electrochemical and Solid-State Letters*, 2001, vol. 4, No. 12, pp. A200-A203.
Shinova et al., "Cationic distribution and electrochemical performance of LiCO$_{1/3}$Ni$_{1/3}$Mn$_{1/3}$O$_2$ electrodes for lithium-ion batteries," 2008, *Solid State Ionics*, vol. 179, pp. 2198-2208.
Qian et al., "Lithium Lanthanum Titanium Oxides: A Fast Ionic Conductive Coating for Lithium-Ion Battery Cathodes," *Chemistry of Materials*, 2012, 24 (14), pp. 2744-2751.
Reddy et al., "Effects of LLTO coating on high temperature cycle life performance of LiMn2O4 cathode material," Abstract #382, 2012, The Electrochemical Society, 2 pages.
Davison et al., "Low Cost, Novel Methods for Fabricating All-Solid-State Lithium Ion Batteries," A Major Qualifying Project Submitted to the Faculty of Worcester Polytechnic Institute, Apr. 23, 2012, 126 pages.
Lee et al., "The Effects of Li—La—Ti—O Coating on the Properties of Li[Ni0.3Co0.4Mn0.3]O2 Cathode Material," Journal of the Korean Institute of Electrical and Electronic Material Engineers, Oct. 2009, vol. 22, No. 10, pp. 890-896.
Lee et al., "The Effect of Coating Thickness on the Electrochemical Properties of a Li—La—Ti—O-coated Li[Ni0.3Co0.4Mn0.3]O2 Cathode," Bull. Korean Chem. Soc., 2010, vol. 31, No. 11, pp. 3233-3237.
Hu et al., "Enhanced electrochemical performance of LiMn2O4 cathode with a Li0.34La0.51TiO3-caoted layer," *RSC Advances*, 2015. vol. 5, pp. 17592-17600.
Fergus et al., "Recent Developments in Cathode Materials for Lithium Ion Batteries," *Journal of Power Sources*, Vo. 195, No. 4, 23010, pp. 939-954.
Gille G. et al., "Cathode Materials for Rechargeable Batteries—Preparation, Structure-Property Relationships and Performance," *Solid State Ionics*, Vo. 148, No. 3-4, 2002, pp. 269-282.
Periasamy et al., "High Voltage and High Capacity Characteristics of LiNi1/3Co1/3Mn1/3O2 Cathodes for Lithium Battery Applications," *Int. J. Electrochecm Soc.*, vol. 2, 2007, pp. 689-699.
Manthiram Lab Highlights, "Passivation of Spinel Cathode Surface through Self-Segregation of Iron," May 7, 2010.
Cerion Power, "Our Power Business," www.cerionenterprises.com/companies_and_applications/power, accessed Sep. 8, 2011.
ETV Motors, "High5ive advanced high-voltage cells," www.etvemotors.com/advanced-battery.htm, accessed Sep. 8, 2011.
Wolfenstine et al., US Army RDECOM, "High Cycle Life Cathode for High Voltage (5V) Lithium Ion Batteries."
Sullivan, "Safe High Voltage Cathode Materials for Pulsed Power Applications," Navy STTR FY2011A—Topic N11A-T035, www.navy.sbir.com/n11_A/navst11-035.htm, accessed Sep. 8, 2011.
Xu, US Army RDECOM, "Electrolyte for Next Generation 5V Li-Ion Batteries."
Ghosh et al., "Block Copolymer Solid Battery Electrolyte with High Li-Ion Transference Number," *Journal of the Electrochemical Society*, 2010, vol. 157, No. 7, pp. A846-A849.
Abu-Lebdeh et al., High-Voltage Electrolytes Based on Adiponitrile for Li-Ion Batteries, *Journal of the Electrochemical Society*, 2009, vol. 156, No. 1, pp. A60-A65.
Jow et al., "High Voltage Electrolytes for Li-ion Batteries," U.S. Research Laboratory, Presentation, May 2011.
Lucht, University of Rhode Island, "Development of Electrolytes for Lithium-ion Batteries," Presentation, May 11, 2001.
Zhang et al, Argonne National Laboratory, Vehicle Technologies Program Annual Merit Review and Peer Evaluation Meeting, "High Voltage Electrolyte for Lithium Batteries," Presentation, Jun. 9-13, 2011.
David Howell, US Department of Energy, "Vehicle Technologies Program," 2011 Annual Merit Review and Peer Evaluation Meeting, Presentation, May 9-13, 2011.
Fey et al., Preparation and electrochemical properties of high-voltage cathode maters, LiMyNi0.5-yMn1.5O4 (M=Fe, Cu, Al, Mg; y=0.0-0.4), *Journal of Power Sources*, 2003, vol. 115, pp. 332-345.

Kawai et al., "High-voltage lithium cathode materials," Journal of Power Sources, 1999, vols. 81-82, abstract only.
Huang et al., "Lithium cobalt phosphate: a high voltage lithium ion cathode material," Valence Technologies.
"Award Details," SBIR/STTR, www.sbir.gov/sbirsearch/detail/233700, accessed Sep. 8, 2011.
Ju et al., "LiCo1-xAlxO2 (0≤x≤0.05) cathode powders prepared from the nanosized Co1—xAlxOy precursor powders," *Materials Chemistry and Physics*, 112 (2008), pp. 536-541.
Wu et al., "Effect of Al3+ and F-Doping on the Irreversible Oxygen Loss from Layered Li[Li0. 17Mn0.58Ni0.25]O2 Cathodes," *Electrochemical and Solid-State Letters*, 2007, vol. 10, No. 6, pp. A151-A154.
Li et al, "Effects of fluorine doping on structure, surface chemistry, and electrochemical performance of LiNi0.8Co0.15Al0.05O2," *Electrochimica Acta*, 2015, vol. 174, pp. 1122-1130.
Cho et al., "Exploring Lithium Deficiency in Layered Oxide Cathode for Li-Ion Battery," *Advanced Sustainable Systems*, 2017, 1700026, 10 pages.
Lee et al., "Surface modification of LiNi0.5Mn1.5O4 cathodes with ZnAl2O4 by a sol-gel method for lithium ion batteries," *Electrochimica Acta*, 2014, vol. 115, pp. 326-331.
Kim et al., "Effect of fluorine on Li[Ni1/3Co1/3Mn1/3]O2-zFz as lithium intercalation material," *Journal of Power Sources*, 2005, vol. 146, pp. 602-605.
Yue et al., "The enhanced electrochemical performance of LiNi0.6Co0.2Mn0.2O2 cathode materials by low temperature fluorine substitution," *Electrochimica Acta*, 2013, vol. 95, pp. 112-118.
Wang et al., "Effect of surface fluorine substitution on high voltage electrochemical performances of layered LiNi0.5Co0.2Mn0.3O2 cathode materials," *Applied Surface Science*, 2016, vol. 371, pp. 172-179.
Tang et al., "Synthesis and characterization of LiFePO4 coating with aluminum doped zinc oxide," *Trans. Nonferrous Met. Soc. China*, 2013, vol. 23, pp. 451-455.
Myung et al., "Functionality of Oxide Coating for Li[Li0.05Ni0.4Co0.15Mn0.4])2 as Positive Electrode Materials for Lithium-Ion Secondary Batteries," *J. Phys. Chem. C*, 2007, vol. 111, pp. 4061-4067.
Liu et al., "Investigation the electrochemical performance of Li1.2Ni0.2Mn0.6O2 cathode material with ZnAl2O4 coating for lithium ion batteries," *Journal of Alloys and Compounds*, 2016, vol. 685, pp. 523-532.
Kim et al., "Improvement of High-Voltage Cycling Behavior of Surface-Modified Li[Ni1/3Co1/3Mn1/3]O2 Cathodes by Fluorine Substitution for Li-Ion Batteries," *J. Electrochem. Soc.*, 2005, vol. 152, issue 9, pp. A1707-A1713.
Amiruddin et al.; "Electrochemical Characterization of Cathode Material (Li[Ni0.8Co0.1Mn0.1]O2 as Core and Li[Ni0.5-0.5xCoxMn0.5-0.5x ]O2 as shell)for Lithium-Ion Batteries"; ECS Meeting Abstracts; Electrochemical Society; No. 240; 2007; one page.
Levasseur et al., "Evidence for structural defects in on-stoichiometric HT-LiCoO2: electrochemical, electronic properties and 7LI NMR studies," *Solid State Ionics*, 128 (2000), pp. 11-24.
Wenbin, Luo, "Effect of Al, Mg and Mn—Mg Doping on the Structure, Electrochemistry and Thermal Stability of LiCoO2 and LiNi1/3Mn1/3Co1/3O2," China Doctoral Dissertations Full-text Database Engineering Technology Part II, Nov. 15, 2010. (Translation provided by MultiLing).
Xinran, Cui, "Preparation and Properties of Al(3+) Doped Lithium-rich Layered Cathode Material Li[Co0.3Li0.23Mn0.47]O2," China Doctoral Dissertations Full-text Database Engineering Technology Part II, Oct. 15, 2012. (Translation provided by MultiLing).
Chen et al., "Role of surface coating on cathode materials for lithium-ion batteries," *Journal of Materials Chemistry*, 2010, 20, 7606-7612.
Choi et al., "$^{27}$Al NMR Chemical Shifts in Oxide Crystals: A First-Principles Study," *J. Phys. Chem. C*, 2009, 113 (9), pp. 3869-3873.
Lee et al., "Solid-state NMR Studies of Al-doped and Al2O3-coated LiCoO2," *Electrochimica Acta*, Nov. 30, 2004, vol. 50, Issues 2-3, pp. 491-494.

(56) References Cited

OTHER PUBLICATIONS

Han et al., "Understanding the Role of Temperature and Cathode Composition on Interface and Bulk: Optimizing Aluminum Oxide Coatings for Li-Ion Cathodes," *ACS Appl. Mater. Interfaces*, 2017, 9 (17), pp. 14769-14778.
Yuping et al.; "Lithium Ion Batteries—Applications and Practices"; Chapter 5 Cobalt Lithium Oxide Cathode Materials; Chemical Industry Press; Jan. 2012; 4 pages.
Deng et al.; "Safety influences of the Al and Ti elements modified LiCoO2 materials on LiCoO2/graphite batteries under the abusive conditions"; Electrochimica Acta; vol. 295; 2019; p. 703-709.
"Cathode"; https://web.archive.org/web/20180309000906/http://lithiumionbattery.org:80/activities/cathode; Li-ion Battery; copyright 2017; accessed Jul. 12, 2023; 4 pages.
U.S. Appl. No. 16/999,307, Final Office Action, dated Jan. 11, 2023.
U.S. Appl. No. 16/999,307, After—Final 2.0 Response to Final Office Action, dated Apr. 11, 2023.
U.S. Appl. No. 16/999,307, Notice of Allowance and Examiner's Reasons for Allowance, dated Apr. 25, 2023.

\* cited by examiner

CATHODE ACTIVE MATERIALS FOR LITHIUM-ION BATTERIES

CROSS-REFERENCE TO RELATED APPLICATIONS

The present application is a division of U.S. patent application Ser. No. 15/804,186, now U.S. Pat. No. 10,141,572, entitled "Cathode Active Materials for Lithium-Ion Batteries," filed on Nov. 6, 2017, which is a continuation of U.S. patent application Ser. No. 15/458,618, now U.S. Pat. No. 10,164,256, entitled "Cathode Active Materials for Lithium-Ion Batteries," filed on Mar. 14, 2017, which claims the benefit under 35 U.S.C. § 119(e) of U.S. Provisional Patent Application Ser. No. 62/307,956, entitled "Surface-Modified Cathode Active Materials for Lithium-Ion Batteries," filed on Mar. 14, 2016, and U.S. Patent Application Ser. No. 62/307,964, entitled "Cathode Active Materials for Lithium-Ion Batteries," filed on Mar. 14, 2016. The content of each application is incorporated herein by reference in its entirety.

U.S. GOVERNMENT LICENSE RIGHTS

This invention was made with U.S. government support under WFO Proposal No. 85F59. This invention was made under a CRADA 1500801 between Apple Inc. and Argonne National Laboratory operated for the United States Department of Energy. The U.S. government has certain rights in the invention.

FIELD

This disclosure relates generally to batteries, and more particularly, to cathode active materials for lithium-ion batteries.

BACKGROUND

A commonly used type of rechargeable battery is a lithium battery, such as a lithium-ion or lithium-polymer battery. As battery-powered devices become increasingly small and more powerful, batteries powering these devices need to store more energy in a smaller volume. Consequently, use of battery-powered devices may be facilitated by mechanisms for improving the volumetric energy densities of batteries in the devices.

Lithium transition metal oxides can be used in cathode active materials for lithium-ion batteries. These compounds can include lithium cobalt oxide or derivatives thereof. These compounds can be in the form of powders.

SUMMARY

In a first aspect, the disclosure is directed to a compound according to Formula (III):

$$Li_\alpha Co_{1-x}M_xAl_yO_\delta \quad (III)$$

wherein M is B, Na, Mn, Ni, Mg, Ti, Ca, V, Cr, Fe, Cu, Zn, Al, Sc, Y, Ga, Zr, Mo, Ru or a combination thereof, $0.95 \leq \alpha \leq 1.10$, $0<x<0.50$, $0\leq y \leq 0.05$, and $1.95 \leq \delta \leq 2.60$.

In some aspects, M is Mn, Ni, or a combination thereof, $0.95 \leq \alpha \leq 1.10$, $0<x<0.50$, $0\leq y \leq 0.05$, and $1.95 \leq \delta \leq 2.60$.

In another aspect, the disclosure is directed to a powder comprising particles. The particles include the compound according to Formula (III).

In another aspect, the disclosure is directed to a powder comprising particles that have a core and a coating. The coating is disposed over at least a portion of the core. The core includes a compound selected from the compound of Formula (I), Formula (IIa), Formula (IIb), and Formula (III):

$$Li_\alpha MO_\delta \quad (I)$$

$$(x)[Li_2M^1O_3]\cdot(1-x)[LiM^2O_2] \quad (IIa)$$

$$(x)[Li_2M^1O_3]\cdot(1-x)[Li_{1-y}M^2O_2] \quad (IIb)$$

$$Li_\alpha Co_{1-x}M_xAl_yO_\delta \quad (III)$$

wherein,
when the compound is Formula (I),
  M is selected from Co, Mn, Ni, and a combination thereof,
  $0.95 \leq \alpha \leq 2$, and
  $1.95 \leq \delta \leq 3$;
when the compound is Formula (IIa),
  $0 \leq x \leq 1$,
  $M^1$ is selected from Ti, Mn, Zr, Mo, Ru and a combination thereof, and
  $M^2$ is selected from B, Na, Mg, Ti, Ca, V, Cr, Mn, Fe, Co, Ni, Cu, Zn, Al, Sc, Y, Ga, Zr, Mo, Ru and a combination thereof;
when the compound is Formula (IIb),
  $0 \leq x \leq 1$,
  $0 \leq y \leq 1$,
  $M^1$ is selected from Ti, Mn, Zr, Mo, Ru and a combination thereof, and
  $M^2$ is selected from B, Na, Mg, Ti, Ca, V, Cr, Mn, Fe, Co, Ni, Cu, Zn, Al, Sc, Y, Ga, Zr, Mo, Ru and a combination thereof; and
when the compound is Formula (III),
  $0.95 \leq \alpha \leq 1.10$,
  M is selected from B, Na, Mn, Ni, Mg, Ti, Ca, V, Cr, Fe, Cu, Zn, Al, Sc, Y, Ga, Zr, Mo, Ru and a combination thereof,
  $0<x<0.50$,
  $0 \leq y \leq 0.05$, and
  $1.95 \leq \delta \leq 2.60$.

In some aspects, the compound is Formula (I),
M is selected from Co, Mn, Ni, and a combination thereof,
$1 \leq \alpha \leq 2$, and
$2 \leq \delta \leq 3$.

In some aspects, the compound is Formula (IIa),
$0 \leq x \leq 1$,
$M^1$ is selected from Ti, Mn, Zr, Mo, Ru and a combination thereof, and
$M^2$ is selected from B, Na, Mg, Ti, Ca, V, Cr, Mn, Fe, Co, Ni, Cu, Zn, Al, Sc, Y, Ga, Zr, Mo, Ru and a combination thereof.

In some aspects, the compound is Formula (IIa), and $0<x\leq 0.10$.

In some aspects, the compound is Formula (IIb),
$0 \leq x \leq 1$,
$0 \leq y \leq 1$,
$M^1$ is selected from Ti, Mn, Zr, Mo, Ru and a combination thereof, and
$M^2$ is selected from B, Na, Mg, Ti, Ca, V, Cr, Mn, Fe, Co, Ni, Cu, Zn, Al, Sc, Y, Ga, Zr, Mo, Ru and a combination thereof.

In some aspects, the compound is Formula (IIb), and $0<x\leq 0.10$.

In some aspects, the compound is Formula (III),
$0.95 \leq \alpha \leq 1.10$,

M is selected from Mn, Ni, and a combination thereof,
$0<x<0.50$,
$0\leq y\leq 0.05$, and
$1.95\leq \delta \leq 2.60$.

The coating comprises an oxide material, a fluoride material, or a combination thereof.

In some aspects, the core includes a compound according to Formula (IIa). In some aspects, the core includes a compound according to Formula (IIb).

In some aspects, the core comprises a compound according to Formula (III). In further variations, $0.001\leq \gamma \leq 0.03$.

In one aspect, the disclosure is directed to a compound represented by Formula (IV):

$$Li_\alpha Co_{1-x}Mn_xO_\delta \qquad (IV)$$

in which $0.95\leq \alpha \leq 1.10$, $0\leq x\leq 0.10$, and $1.90\leq \delta \leq 2.20$.

In a further aspect, $0<x\leq 0.10$.

In a further aspect, the disclosure is directed to a compound represented by Formula (IV), wherein $0.98\leq \alpha \leq 1.01$.

In a further aspect, the disclosure is directed to a compound represented by Formula (IV), wherein $1.00\leq \alpha \leq 1.05$. In a further aspect, $0\leq x\leq 0.10$.

In a further aspect, the disclosure is directed to a compound represented by Formula (IV), wherein $0.95\leq \alpha \leq 1.05$ and $0.02\leq x\leq 0.05$.

In a further aspect, the disclosure is directed to a compound represented by Formula (IV), wherein $1.01\leq \alpha \leq 1.05$ and $0.02\leq x\leq 0.05$.

In a further aspect, the disclosure is directed to a compound represented by Formula (IV), wherein $0.95\leq \alpha \leq 1.05$ and $x=0.04$.

In a further aspect, the disclosure is directed to a compound represented by Formula (IV), wherein $1.01\leq \alpha \leq 1.05$ and $x=0.04$.

In a further aspect, the disclosure is directed to a compound represented by Formula (IV), wherein $0.98\leq \alpha \leq 1.01$ and $x=0.03$.

In a further aspects the compound has the structure of Formula (Va) or Formula (Vb):

$$(x)[Li_2MnO_3]\cdot (1-x)[LiCoO_2] \qquad (Va)$$

$$(x)[Li_2MnO_3]\cdot (1-x)[Li_{(1-y)}Co_{(1-y)}Mn_yO_2] \qquad (Vb)$$

wherein $0\leq x\leq 0.10$, and optionally $0\leq y\leq 0.10$. In some variations, $0\leq y\leq 0.10$.

In some aspects, the disclosure is directed to a powder comprising particles, the particles comprising the compound represented by Formula (IV): $Li_\alpha Co_{1-x}Mn_xO_\delta$. In various aspects, $0.95\leq \alpha \leq 1.10$, $0\leq x\leq 0.10$, and $1.90\leq \delta \leq 2.20$. In various aspects, $0.95\leq \alpha \leq 1.10$, $0<x\leq 0.10$, and $1.90\leq \delta \leq 2.20$. In some embodiments, at least a portion of the particles have a smooth surface. In various instances of these embodiments, at least a portion of the particles have a tap density equal to or greater than 2.2 g/cm³. In various instances of these embodiments, at least a portion of the particles have a smooth surface and a tap density equal to or greater than 2.2 g/cm³.

In another aspect, the disclosure is directed to a cathode active material that includes the powders as described herein.

In a further aspect, the disclosure is directed to a cathode having the cathode active material disposed over a current collector.

In another aspect, the disclosure is directed to a battery cell that includes an anode having an anode current collector and an anode active material disposed over the anode current collector and the cathode.

In another aspect, the disclosure is directed to a portable electronic device including a set of components powered by the battery pack.

In another aspect, the disclosure is directed to a method for making a powder described herein. First, a precursor solution (e.g., an aluminum salt and/or fluoride salt precursor) is prepared by dissolving the precursor in a solvent to form a precursor solution. The precursor solution is added to a particle powder to form a wet-impregnated powder. The wet-impregnated powder is heated to an elevated temperature to form a particle having the composition described herein.

In another aspect, multiple precursors (e.g., aluminum salts and fluoride salts) are dissolved in first and second solvents to form first and second solutions, respectively. First and second solutions are then combined to make a precursor solution, which is then added to particles as described herein.

In another aspect, the disclosure is directed to making the particles by dry blending methods. Particles of a nanocrystalline material are combined with particles comprising the compound of Formula (IV). The nanocrystalline material particles and the particles comprising Formula (IV) are subject to a compressive force, shear force, or a combination thereof. The nanocrystalline material particles bond to the surface of the powder particles. The particles thereby form a coating on the powder particles.

In another aspect, the disclosure is directed to compounds represented by Formula (VII) or Formula (VIII):

$$Li_\alpha Co_{1-x-y}M_yMn_xO_\delta \qquad (VII)$$

$$Li_\alpha Co_{1-x-y}Al_yMn_xO_\delta \qquad (VIII)$$

When the compound is by represented by Formula (VII), in various aspects, M is at least one element selected from B, Na, Mg, Ti, Ca, V, Cr, Fe, Ni, Cu, Zn, Al, Sc, Y, Ga, Zr, Mo and Ru. In some variations, $0.95\leq \alpha \leq 1.30$, $0<x\leq 0.30$, $0\leq y\leq 0.10$, and $1.98\leq \delta \leq 2.04$. In various aspects, the compound is a single-phase compound with an $R\bar{3}m$ crystal structure. In further aspects, $\alpha > 1+x$ and/or $\alpha < 1+x$.

In further aspects, the disclosure is directed to a powder comprising particles. The mean diameter of the particle can be at least at least 5 µm. In some aspects, the mean diameter of the particle can be at least 20 µm. In some aspects, the particle can comprise secondary particles, each of which comprises a plurality of primary particles sintered together. In some variations the at least 30% of the average secondary particle is formed of a single primary particle.

In further aspects, the disclosure is directed to a cathode active material comprising the compounds or powders.

In further aspects, the disclosure is directed to a battery cell comprising an anode, a cathode comprising a cathode active material. In some aspects, the battery cell can have a first-cycle discharge energy greater than or equal to 750 Wh/kg. In some aspects, the battery cell can have an energy retention greater than or equal to 70% after 10 charge-discharge cycles.

In some aspects, the battery cell can have an energy capacity retention is at least 65% after 52 discharge cycles.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims. Thus, the disclosure is not limited to the embodiments shown, but is to be accorded the widest scope consistent with the principles and features disclosed herein.

As used herein, all compositions referenced for cathode active materials represent those of as-prepared materials (i.e., "virgin" materials) unless otherwise indicated. Materials of these compositions have not yet been exposed to additional processes, such as de-lithiation and lithiation during, respectively, charging and discharging of a lithium-ion battery.

Lithium cobalt oxides can be used in cathode active materials for commercial lithium-ion batteries. These compounds often include lithium cobalt oxide or derivatives thereof. The performance of such cathode active materials can be increased by improving its capacity, working voltage, and gravimetric electrode density.

The morphology of particles can also influence the performance of cathode active materials. Particles can include primary and secondary particles. Primary particle and secondary particle size distribution, shape, and porosity can impact the density of lithium cobalt oxide electrodes. Secondary particles are comprised of agglomerates of the smaller, primary particles, which are also often referred to as grains. Control of the secondary particle characteristics of shape and density can be gained.

The performance of batteries can be improved using compounds and particles that provide increased capacity, working voltage, and gravimetric electrode density. These and other needs are addressed by the disclosure herein.

Figure 1:
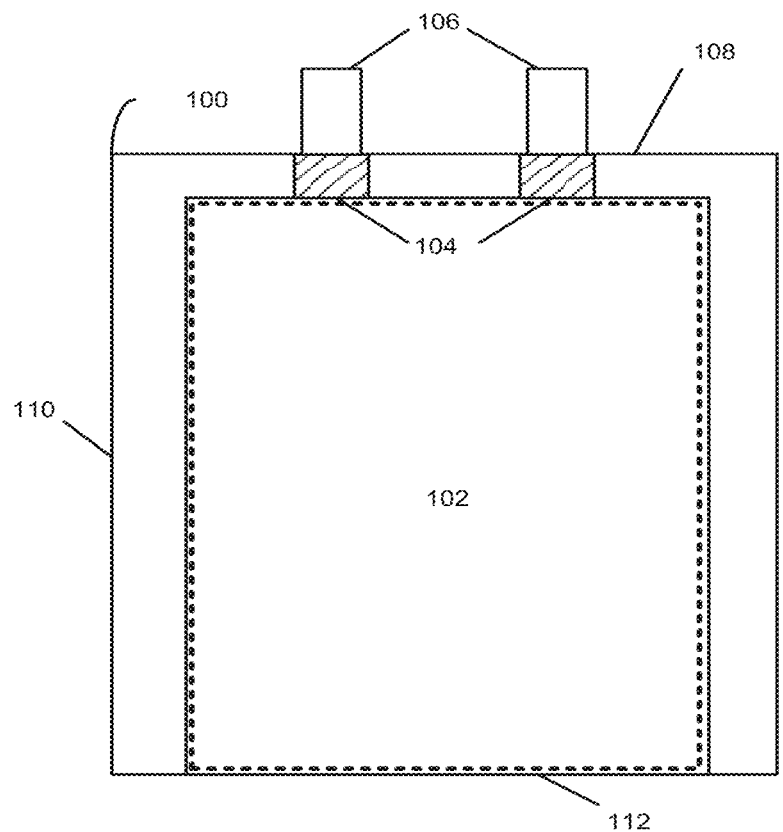
FIG. 1 is a top-down view of a battery cell in accordance with an illustrative embodiment.

FIG. 1 presents a top-down view of a battery cell 100 in accordance with an embodiment. The battery cell 100 may correspond to a lithium-ion or lithium-polymer battery cell that is used to power a device used in a consumer, medical, aerospace, defense, and/or transportation application. The battery cell 100 includes a stack 102 containing a number of layers that include a cathode with a cathode active coating, a separator, and an anode with an anode active coating. More specifically, the stack 102 may include one strip of cathode active material (e.g., aluminum foil coated with a lithium compound) and one strip of anode active material (e.g., copper foil coated with carbon). The stack 102 also includes one strip of separator material (e.g., conducting polymer electrolyte) disposed between the one strip of cathode active material and the one strip of anode active material. The cathode, anode, and separator layers may be left flat in a planar configuration or may be wrapped into a wound configuration (e.g., a "jelly roll").

Battery cells can be enclosed in a flexible pouch. Returning to FIG. 1, during assembly of the battery cell 100, the stack 102 is enclosed in a flexible pouch. The stack 102 may be in a planar or wound configuration, although other configurations are possible. The flexible pouch is formed by folding a flexible sheet along a fold line 112. For example, the flexible sheet may be made of aluminum with a polymer film, such as polypropylene. After the flexible sheet is folded, the flexible sheet can be sealed, for example, by applying heat along a side seal 110 and along a terrace seal 108. The flexible pouch may be less than 120 microns thick to improve the packaging efficiency of the battery cell 100, the density of battery cell 100, or both.

The stack 102 also includes a set of conductive tabs 106 coupled to the cathode and the anode. The conductive tabs 106 may extend through seals in the pouch (for example, formed using sealing tape 104) to provide terminals for the battery cell 100. The conductive tabs 106 may then be used to electrically couple the battery cell 100 with one or more other battery cells to form a battery pack.

Batteries can be combined in a battery pack in any configuration. For example, the battery pack may be formed by coupling the battery cells in a series, parallel, or a series-and-parallel configuration. Such coupled cells may be enclosed in a hard case to complete the battery pack, or may be embedded within an enclosure of a portable electronic device, such as a laptop computer, tablet computer, mobile phone, personal digital assistant (PDA), digital camera, and/or portable media player.

Figure 2:
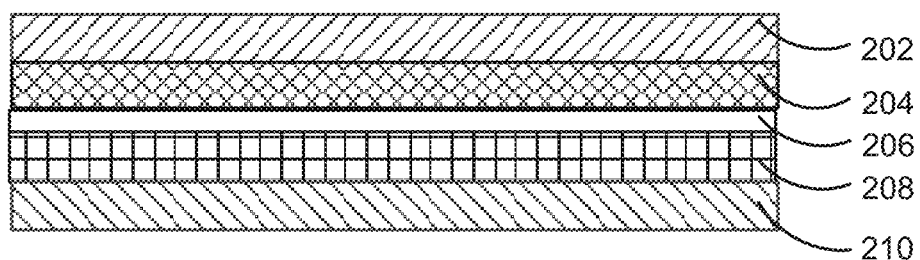
FIG. 2 is a side view of a set of layers for a battery cell in accordance with an illustrative embodiment.

FIG. 2 presents a side view of a set of layers for a battery cell (e.g., the battery cell 100 of FIG. 1) in accordance with the disclosed embodiments. The set of layers may include a cathode current collector 202, a cathode active coating 204, a separator 206, an anode active coating 208, and an anode current collector 210. The cathode current collector 202 and the cathode active coating 204 may form a cathode for the battery cell, and the anode current collector 210 and the anode active coating 208 may form an anode for the battery cell. To create the battery cell, the set of layers may be stacked in a planar configuration, or stacked and then wrapped into a wound configuration.

As mentioned above, the cathode current collector 202 may be aluminum foil, the cathode active coating 204 may be a lithium compound, the anode current collector 210 may be copper foil, the anode active coating 208 may be carbon, and the separator 206 may include a conducting polymer electrolyte.

It will be understood that the cathode active materials described herein can be used in conjunction with any battery cells or components thereof known in the art. For example, in addition to wound battery cells, the layers may be stacked and/or used to form other types of battery cell structures, such as bi-cell structures. All such battery cell structures are known in the art.

Surface-modified and structure-stabilized lithium cobalt oxide materials are disclosed. The materials can be used as cathode active materials in lithium-ion batteries.

In various aspects, the transition-metal oxides are variations of lithium cobalt oxides. In one aspect, the disclosure is directed to compounds of Formula (I):

$$Li_\alpha MO_\delta \qquad (I)$$

wherein M=Co, Mn, Ni, or any combination thereof, $0.95 \leq \alpha \leq 2$, and $2 \leq \delta \leq 3$. In some variations, $1 \leq \alpha \leq 2$. In some variations, $1.20 \leq \alpha$. In some variations, $1.40 \leq \alpha$. In some variations, $1.60 \leq \alpha$. In some variations, $1.80 \leq \alpha$. In some variations, $\alpha \leq 1.8$. In some variations, $\alpha \leq 1.6$. In some variations, $\alpha \leq 1.4$. In some variations, $\alpha \leq 1.2$. In some variations, $\alpha \leq 1.8$. Further, in some variations, $2.2 \leq \delta$. In some variations, $2.4 \leq \delta$. In some variations, $2.6 \leq \delta$. In some variations, $2.8 \leq \delta$. In some variations, $\delta \leq 2.8$. In some variations, $\delta \leq 2.6$. In some variations, $\delta \leq 2.4$. In some variations, $\delta \leq 2.2$. It will be understood that the boundaries of $\alpha$ and $\delta$ can be combined in any variation as above.

In various aspects, the disclosure is directed to compounds of Formula (IIa):

$$(x)[Li_2M^1O_3] \cdot (1-x)[LiM^2O_2] \qquad (IIa)$$

wherein $M^1$ is one or more cations with an average oxidation state of 4+ (i.e., tetravalent), $M^2$ is one or more cations with an average oxidation state of 3+ (i.e., trivalent), and $0 \leq x \leq 1$. In some variations, $M^1$ is selected from Ti, Mn, Zr, Mo, Ru, and a combination thereof. In specific variations, $M^1$ is Mn. In some variations, $M^2$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^2$ is selected from Mg, Ca, V, Cr, Mn, Fe, Co, Ni, Cu, Zn, Al, Sc, Y, Ga, Zr, and a combination thereof. In specific variations, $M^2$ is Co.

It will be appreciated that, in the representation for excess-lithium transition-metal oxides, $M=[M^2]_{1-x}[M^1]_x$, $\alpha=1+x$, and $\delta=2+x$. In some variations, $\alpha \leq 1.2$. In some variations, $\alpha \leq 1.4$. In some variations, $\alpha \leq 1.6$. In some variations, $\alpha \leq 1.8$. In some variations, $1.2 \leq \alpha$. In some variations, $1.4 \leq \alpha$. In some variations, $1.6 \leq \alpha$. In some variations, $1.8 \leq \alpha$. It will be understood that the boundaries of x can be combined in any variation as above. For the embodiments disclosed herein, cobalt is a predominant transition-metal constituent which allows high voltage, and high volumetric energy density for cathode active materials employed in lithium-ion batteries.

In various aspects, the disclosure is directed to compounds of Formula (IIb):

$$(x)[Li_2M^1O_3] \cdot (1-x)[Li_{1-y}M^2O_2] \qquad (IIb)$$

wherein $M^1$ is one or more cations with an average oxidation state of 4+ (i.e., tetravalent), $M^2$ is one or more cations, $0 \leq x \leq 1$, and $0 \leq y \leq 1$. In some variations, $M^1$ is selected from Ti, Mn, Zr, Mo, Ru, and a combination thereof. In specific variations, $M^1$ is Mn. In some variations, $M^2$ is selected from B, Na, Mg, Ti, Ca, V, Cr, Mn, Fe, Co, Ni, Cu, Zn, Al, Sc, Y, Ga, Zr, Ru, Mo and a combination thereof. In some variations, $M^2$ is selected from Mg, Ti, Ca, V, Cr, Mn, Fe, Co, Ni, Cu, Zn, Al, Sc, Y, Ga, Zr, and a combination thereof. In some variations, $M^2$ is selected from Mg, Ca, V, Cr, Mn, Fe, Co, Ni, Cu, Zn, Al, Sc, Y, Ga, Zr, and a combination thereof. In specific variations, $M^2$ is Co and Mn.

It will be appreciated that, in the representation for excess-lithium transition-metal oxides, $M=[M^2]_{1-x}[M^1]_x$, $\alpha=1+x-y+xy$, and $\delta=2+x$. In some variations, $\alpha \leq 0.98$. In some variations, $\alpha \leq 1.0$. In some variations, $\alpha \leq 1.1$. In some variations, $\alpha \leq 1.2$. In some variations, $0.95 \leq \alpha$. In some variations, $1.3 \leq \alpha$. In some variations, $1.6 \leq \alpha$. In some variations, $1.8 \leq \alpha$. It will be understood that the boundaries of a can be combined in any variation as above. For the embodiments disclosed herein, cobalt is a predominant transition-metal constituent which allows high voltage, and high volumetric energy density for cathode active materials employed in lithium-ion batteries.

In some variations, the disclosure is directed to a compound represented by Formula (III):

$$Li_\alpha Co_{1-x}M_xAl_yO_\delta \qquad (III)$$

wherein M is B, Na, Mn, Ni, Mg, Ti, Ca, V, Cr, Fe, Cu, Zn, Al, Sc, Y, Ga, Zr, Mo, Ru or a combination thereof or any combination thereof; $0.95 \leq \alpha \leq 1.10$; $0 < x < 0.50$; $0 \leq y \leq 0.05$; and $1.95 \leq \delta \leq 2.60$. In some variations, M is Mn, Ni, or any combination thereof. In some variations, M is Mn, Ni, or a combination thereof, $0.95 \leq \alpha \leq 1.10$, $0 < x < 0.50$, $0 \leq y \leq 0.05$, and $1.95 \leq \delta \leq 2.60$. In some variations, $0.01 \leq y \leq 0.03$. In some variations, $0.001 \leq y \leq 0.005$. In some variations, $0.002 \leq y \leq 0.004$. In some variations, y is 0.003. In some variations, $0.02 \leq y \leq 0.03$. In such variations of Formula (III) where $y \neq 0$ (i.e., aluminum is present), a distribution of aluminum within the particle may be uniform or may be biased to be proximate to a surface of the particle. Other distributions of aluminum are possible. In some variations, Al is at least 500 ppm. In some variations, Al is at least 750 ppm. In some variations, Al is at least 900 ppm. In some variations, Al is less than or equal to 2000 ppm. In some variations, Al is less than or equal to 1500 ppm. In some variations, Al is less than or equal to 1250 ppm. In some variations, Al is approximately 1000 ppm.

In additional variations of Formula (III), $1.02 \leq \alpha \leq 1.05$ and $0.02 \leq x \leq 0.05$. In further variations of Formula (III), $1.03 \leq \alpha \leq 1.05$ and $x=0.04$. It will be recognized that the components as described above can be in any combination.

The various compounds of Formulae (I), (IIa), (IIb), and (III) can include $Mn^{4+}$. Without wishing to be limited to any theory or mode of action, incorporating $Mn^{4+}$ can improve a stability of oxide under high voltage charging (e.g., 4.5V) and can also help maintain an R$\bar{3}$m crystal structure (i.e., the α-NaFeO$_2$ structure) when transitioning through a 4.1-4.3V region (i.e., during charging and discharging).

In some embodiments, the disclosure is directed to a powder that includes particles. In some aspects, the particles can comprise the compound of Formula (III) and new formula. In some variations, the particles comprise a core comprising a compound of Formula (I), Formula (IIa), Formula (IIb) or Formula (III), and a coating disposed over at least a portion of the core. In further variations, the particles comprise a core comprising a compound of Formula (III), and a coating disposed over at least a portion of the core.

It will be appreciated that the powder may serve as a part or all of a cathode active material. The particles described herein can be used in a cathode active material in a battery. Such cathode active materials can tolerate voltages equal to or higher than conventional materials (i.e., relative to a Li/Li$^+$ redox couple) without capacity fade. Capacity fade degrades battery performance and may result from a structural instability of the cathode active material, a side reaction with electrolyte at high voltage, surface instability, a dissolution of cathode active material into the electrolyte, or some combination thereof.

In variations in which the particles comprise compounds of Formula (III) and contain aluminum, the aluminum can be referred to as a dopant. Such aluminum dopants can be distributed uniformly throughout the particle, or alternatively localized along the surface of the particle.

In further variations, the particle comprises a core and a coating. The coating can be an oxide material, a fluoride material, or a combination thereof. In some variations, the coating may be a layer of material in contact with a surface of the core or a reaction layer formed along the surface of the core. The coating can include an oxide material (e.g., ZrO$_2$, Al$_2$O$_3$, etc.), a fluoride material (e.g., AlF$_3$), or a combination thereof (e.g., AlO$_x$F$_y$). In some embodiments, the oxide material includes at least one element selected from the group consisting of Al, Co, Li, Zr, Mg, Ti, Zn, Mn, B, Si, Ga, and Bi. In these embodiments, the oxide material may include oxoanions such as phosphates (e.g., AlPO$_4$, Co$_3$(PO$_4$)$_2$, LiCoPO$_4$, etc.). In some embodiments, the fluoride material includes at least one element selected from the group consisting of Al, Co, Mn, Ni, Li, Ca, Zr, Mg, Ti, and Na. The coating may include one or more compositions selected from AlF$_3$, Al$_2$O$_3$, AlPO$_4$, Co$_3$(PO$_4$)$_2$, LiCoPO$_4$, and ZrO$_2$.

The coating can be in any amount known in the art. In some variations, amount of coating may be less than or equal to 7 wt. % of the total particle. In some variations, amount of coating may be less than or equal to 5 wt. % of the total particle. In some variations, amount of coating may be less than or equal to 0.8 wt. % of the total particle. In some variations, amount of coating may be less than or equal to 0.6 wt. % of the total particle. In some variations, amount of coating may be less than or equal to 0.4 wt. % of the total particle. In some variations, amount of coating may be less than or equal to 0.3 wt. % of the total particle. In some variations, amount of coating may be less than or equal to 0.2 wt. % of the total particle. In some variations, amount of coating may be less than or equal to 0.1 wt. % of the total particle. In various aspects, the amount can be chosen such that a capacity of the cathode active material is not negatively impacted.

The coating may include multiple layers of coating material. The coating may also be a continuous coating or a discontinuous coating. Non-limiting examples of discontinuous coatings include coatings with voids or cracks and coatings formed of particles with gaps therebetween. Other types of discontinuous coatings are possible.

Powders comprising the particles described herein can be used as a cathode active material in a lithium ion battery. Such cathode active materials can tolerate voltages equal to or higher than conventional materials (i.e., relative to a Li/Li$^+$ redox couple) without capacity fade. Capacity fade degrades battery performance and may result from a structural instability of the cathode active material, a side reaction with electrolyte at high voltage, surface instability, dissolution of cathode active material into the electrolyte, or some combination thereof.

In various aspects, the compounds and/or particles as described herein, when incorporated into a battery as a cathode active material, have lithium ion batteries that can be charged at high voltages without capacity fade. Without wishing to be held to a specific mechanisms or mode of action, the compounds may impede or retard structural deviations from an α-NaFeO$_2$ crystal structure during charging to at higher voltages.

In various aspects, the compounds as described herein, when incorporated into a battery as a cathode active material, have lithium ion batteries to have voltages greater than 4.2V without capacity fade. In further aspects, such batteries have voltages greater than 4.3V. In various aspects, the lithium cobalt oxide materials are directed to voltages greater than 4.4V. In various aspects, the lithium cobalt oxide materials are directed to voltages greater than 4.5V.

Batteries having cathode active materials that include the disclosed particles can show improved the battery performance at high voltages. For example, the particles provide for an increased battery capacity over cycles at high voltage (e.g., 4.5V). In certain variation, the decay rate of the battery is less than 0.7 mAh/g/cycle at a charge potential of 4.5V. In some variations, the decay rate of the battery is less than 0.6 mAh/g/cycle at a charge potential of 4.5V. In some variations, the decay rate of the battery is less than 0.5 mAh/g/cycle at a charge potential of 4.5V.

In some additional variations, batteries that include cathode active materials comprising the disclosed particles lose lower amounts of energy per unit mass per cycle. In some embodiments, such batteries lose less than 4 Wh/kg over per cycle when operated at a potential of 4.5V. The disclosure is further directed to methods of making the disclosed compounds and particles.

In embodiments in which the particle or core comprises compounds of Formula (VI), Al may be introduced via a surface modification process. For example, and without limitation, the particle may be coated with a coating comprising aluminum and subsequently heated. Thermal energy can enable a reaction between the particle and the coating, thereby infusing aluminum into the core (e.g., doping). In another non-limiting example, the particle may be exposed to a solution that comprises aluminum. A chemical reaction between the particle and the solution can create a surface reaction layer comprising aluminum. The particle may be subsequently heated (e.g., to diffuse aluminum from the surface reaction layer into the particle, convert the surface reaction layer into a coating, etc.). In a further non-limiting example, the particle may be contacted with particles that comprise aluminum, such as during milling. Mechanical energy creates compressive forces, shear forces, or a combination thereof, to fuse the aluminum particles to the particle (e.g., bond Al$_2$O$_3$ nanoparticles to the particle). These surface modification processes can allow the core to achieve an aluminum content between $0<\gamma\leq0.03$. Other surface modification processes are possible.

In various embodiments, the performance of batteries including the compounds and/or powders can increase battery capacity and/or reduce the loss of available power in a fully charged battery over time.

The disclosure is further directed to methods of modifying a surface of particles by wet processing or dry processing.

In one aspect, the disclosure is directed to methods of making particles. A precursor solution comprising a first amount of a precursor dissolved in a solvent is prepared. The powders comprises a compound according to Formula (I), (IIa), (IIb)) or (III). The precursor solution is added to the powder to form a wet-impregnated powder. The wet-impregnated powder is heated to an elevated temperature.

In another aspect, the first precursor is dissolved in a first portion of the solvent to form a first solution. The first solution is added to the powder to form a partial wet-impregnated powder. A second precursor is dissolved into a second portion of solvent to form a second solution. The second is added to the partial wet-impregnated powder to produce a wet-impregnated powder. The wet-impregnated powder is then heated at an elevated temperature.

Wet-impregnation involves adding solvent to particles of the powder until the particles exhibit a damp consistency (e.g., paste-like). In various aspects, the amount of solvent can be selected such that, when the precursor solution is added to the powder, the wet-impregnated powder so-produced exhibits a damp consistency. The method additionally includes heating the wet-impregnated powder at an elevated temperature. It will be appreciated that the amount of solvent may be determined by selecting a known amount of the powder and progressively adding solvent until all particles of the powder appear wet, but do not flow (i.e., show a damp consistency). A ratio of solvent to powder (e.g., grams of solvent per grams of the powder) may be scaled as needed to accommodate different amounts of the powder when utilizing the method. A concentration of the at least one precursor may then be selected to apply a desired quantity of material onto the surface of the particles. Representative variations of the method are described in relation to Examples 1, 3, 4, 5, and 6.

In some embodiments, heating the wet-impregnated powder includes drying the wet-impregnated powder. In some embodiments, the at least one precursor includes aluminum (e.g., see Example 1).

In some embodiments, preparing the precursor solution includes dissolving a first precursor into a first portion of solvent to form a first solution and dissolving a second precursor into a second portion of solvent to form a second solution. The first portion of solvent and the second portion of solvent, in total, may correspond to the amount of solvent. In these embodiments, preparing the precursor solution also includes mixing the first solution with the second solution, thereby forming the precursor solution. In some instances, the first precursor includes aluminum and the second precursor includes phosphate (e.g., see Example 3). In other instances, the first precursor includes cobalt and the second precursor includes phosphate (e.g., see Example 4). In still other instances, the first precursor include aluminum and the second precursor includes lithium (e.g., see Example 5).

In some embodiments, preparing the precursor solution includes dissolving the first precursor into the first portion of solvent to form the first solution, dissolving the second precursor into the second portion of solvent to form the second solution, and dissolving a third precursor into a third portion of solvent to form the third solution. The first portion of solvent, the second portion of solvent, and the third portion of solvent, in total, correspond to the amount of solvent. In such embodiments, preparing the precursor solution also includes mixing the first solution, the second solution, and the third solution thereby forming the precursor solution.

In some embodiments, at least one of the first precursor, the second precursor, and the third precursor include lithium. In some embodiments, the first precursor includes cobalt, the second precursor includes lithium, and the third precursor includes phosphate (e.g., see Example 6).

In some embodiments, adding the first solution to the powder includes drying the partial wet-impregnated powder. In some embodiments, heating the wet-impregnated powder includes drying the wet-impregnated powder. In some embodiments, the first precursor includes aluminum and the second precursor include fluorine (e.g., see Example 2).

According to an illustrative embodiment, a method for modifying a surface of particles includes stirring a suspension of particles. The particles include the compound of Formula (III). The method also involves adding one or more precursor to the suspension of particles while stirring. In some embodiments, the method additionally includes filtering the particles after adding the precursor solution. Representative variations of the method are described in relation to Examples 7-9.

In some embodiments, the method includes filtering the particles after adding the at least one precursor and heating the filtered particles to an elevated temperature. In some embodiments, the precursor solution can include aluminum or cobalt (e.g., see Example 8). Non-limiting examples of the metal precursor include an aluminum precursor, e.g., $Al(NO_3)_3$, and a cobalt precursor, e.g., $Co(NO_3)_3$.

According to an illustrative embodiment, a method for modifying a surface of particles in a powder includes blending particles of nanocrystalline material with particles of the powder. The particles of the powder can include a compound according to Formula (I), (IIa), or (III), as described herein. The particles can be combined with the nanocrystalline material and while blending, and/or subjected to compressive forces, shear forces, or a combination thereof. Such forces can induce the nanocrystalline material particles to bond to surfaces of the particles of the powder. The nanocrystalline material particles and the powder particles can be blended in such a ratio that the nanocrystalline material particles form a predetermined amount of coating on the powder particles. Representative variations of the method are described in relation to Examples 10-12. In some embodiments, the nanocrystalline material particles can include an aluminum oxide material, an aluminum fluoride material, or a combination thereof.

In some variations, the disclosure is directed to a compound represented by Formula (IV):

$$Li_\alpha Co_{1-x} Mn_x O_\delta \hspace{2cm} (IV)$$

wherein $0.95\leq\alpha\leq1.10$, $0\leq x\leq0.10$, and $1.90\leq\delta\leq2.20$. In some variations, $0.98\leq\alpha\leq1.01$. In some variations of Formula (IV), $0.98\leq\alpha\leq1.01$ and $x=0.03$. In some variations of Formula (IV), $1.00\leq\alpha\leq1.05$. In some variations, $0<x\leq0.10$. In a further variations, the disclosure is directed to a compound represented by Formula (IV), wherein $0.95\leq\alpha\leq1.05$ and $0.02\leq x\leq0.05$. In a further aspect, the disclosure is directed to a compound represented by Formula (IV), wherein $0.95\leq\alpha\leq1.05$ and $x=0.04$. In some variations, $x=0.03$. In further variations of Formula (IV), $1.01\leq\alpha\leq1.05$ and $0.02\leq x\leq0.05$. In still further variations of Formula (IV), $1.01\leq\alpha\leq1.05$ and $x=0.04$. In some variations of Formula (IV), 1.00<α≤1.10. In other variations of Formula (IV), 1.00<α≤1.05. In a further aspect, the disclosure is directed to a compound represented by Formula (IV), wherein 0.98≤α≤1.01, x=0.03, and δ=2.

It will be appreciated that α represents a molar ratio of lithium content to total transition-metal content (i.e., total content of Co and Mn). In various aspects, increasing lithium content can increase capacity, improve stability, increase gravimetric density of particles comprising the compound, increase particle density, and/or increase particle strength of the cathode active material. In various aspects, decreasing lithium content can increase capacity, improve stability, increase gravimetric density of particles comprising the compound, increase particle density, and/or increase particle strength of the cathode active material.

In some variations, the compound of Formula (IV) may be represented as a solid solution of two phases, i.e., a solid solution of $Li_2MnO_3$ and $LiCoO_2$. In these variations, the compound may be described according to Formula (Va):

$$(x)[Li_2MnO_3]\cdot(1-x)[LiCoO_2] \tag{Va}$$

where Mn is a cation with an average oxidation state of 4+ (i.e., tetravalent) and Co is a cation with an average oxidation state of 3+ (i.e., trivalent). A more compact notation for Formula (Va) is given below:

$$Li_{1+x}Co_{1-x}Mn_xO_{2+x} \tag{VI}$$

In Formula (VI), x describes including both Mn and Co. Due to differing valences between Mn and Co, such inclusion of Mn may influence lithium content and oxygen content of the compound.

In Formula (IV), the composition of 'x' can be 0≤x≤0.10. In some variations, 0<x≤0.10. In such variations, the lithium content can be from 1 to 1.10 in Formula (VI), and the oxygen content can be from 2 to 2.10. However, the compounds disclosed herein have lithium contents and oxygen contents that may vary independently of x. For example, and without limitation, the lithium and oxygen contents may vary from stoichiometric values due to synthesis conditions deliberately selected by those skilled in the art. As such, subscripts in Formulas (V) and (VI) are not intended as limiting on Formula (IV), i.e., α is not necessarily equal to 1+x, and δ is not necessarily equal 2+x. It will be appreciated that the lithium content and the oxygen content of compounds represented by Formula (IV) can be under-stoichiometric or over-stoichiometric relative to the stoichiometric values of Formula (VI).

In some variations, the compound of Formula (IV) may be represented as a solid solution of two phases, i.e., a solid solution of $Li_2MnO_3$ and $LiCoO_2$. In these variations, the compound may be described according to Formula (Vb):

$$(x)[Li_2MnO_3]\cdot(1-x)[Li_{(1-y)}Co_{(1-y)}Mn_yO_2] \tag{Vb}$$

where Mn is a cation with an average oxidation state of 4+ (i.e., tetravalent) and Co is a cation with an average oxidation state of 3+ (i.e., trivalent).

The disclosure is further directed to powders comprising compounds described herein. In various aspects, the disclosure is directed to a powder that includes particles comprising $Li_\alpha Co_{1-x}Mn_xO_\delta$ where 0.95≤α≤1.10, 0≤x≤0.10, and 1.90≤δ≤2.20. In some variations, 0<y≤0.10. The powder may serve as part or all of a cathode active material (i.e., the cathode active material includes the powder). In some embodiments, 0.98≤α≤1.01 and x=0.03. In some embodiments, 1.00≤α≤1.05. In further embodiments, 1.01≤α≤1.05 and 0.02≤x≤0.05. In still further embodiments, 1.01≤α≤1.05 and x=0.04. In some embodiments, 1.00<α≤1.10. In other embodiments, 1.00<α≤1.05.

In some variations, the compound of Formula (IV) may be represented as a solid solution of two phases, i.e., a solid solution of $Li_2MnO_3$ and $LiCoO_2$. In these variations, the compound may be described according to Formula (Va) or Formula (Vb), where Mn is a cation with an average oxidation state of 4+ (i.e., tetravalent) and Co is a cation with an average oxidation state of 3+ (i.e., trivalent).

Alternatively, a more compact notation is depicted as Formula (Vc):

$$Li_{1+x-y-xy}Co_{(1-x)\cdot(1-y)}Mn_{(x+y-x\cdot y)}O_{2+x} \tag{Vc}$$

In Formula (Vc), x can describe both Mn and Co. Without wishing to be held to a particular mechanism or mode of action, because of differing valences between Mn and Co, inclusion of Mn may influence lithium content and oxygen content of the compound.

In Formula (Vc), the combination of 'x' and 'y' at least zero and less than or equal to 0.10. In some variations, the combination of 'x' and 'y' can be greater than zero and less than or equal to 0.10. In such variations, the lithium content can be any range described herein for other Formulae. In some variations, Li can be from 0.9 to 1.10. In some variations, oxygen content can be from 2 to 2.10. It will be recognized that, as with all Formulae presented herein, that the compounds disclosed herein have lithium contents and oxygen contents that may vary independently of x and y.

The compounds and powders can be in a cathode active material for lithium ion batteries, as described herein. These cathode active materials assist energy storage by releasing and storing lithium ions during, respectively, charging and discharging of a lithium-ion battery.

Without wishing to be limited to a specific mechanism or mode of action, the characteristics of the powder can provide improved battery performance when the powder is used as a cathode active material. Powders comprising the compounds described herein have increased tap densities over previously known compounds. Batteries comprising these powders as a cathode active material have an increased volumetric energy density.

In some instances, batteries having such cathode active materials have a specific capacity greater than 130 mAh/g. In some instances, the specific capacity is greater than 140 mAh/g. In some instances, the specific capacity is greater than 150 mAh/g. In some instances, the specific capacity is greater than 160 mAh/g. In some instances, the specific capacity is greater than 170 mAh/g.

Increasing an initial lithium content in the cathode active materials (e.g., an as-prepared lithium content) can increase the volumetric energy density and/or cycle life.

The cathode active material can exhibit a high tap density and/or improved particle strength. In some instances, the cathode active material can exhibit a tap density equal to or greater than 2.1 g/cm³. In some instances, the cathode active material can exhibit a tap density equal to or greater than 2.2 g/cm³. In some instances, the cathode active material can exhibit a tap density equal to or greater than 2.3 g/cm³. In some instances, the cathode active material can exhibit a tap density greater than or equal to 2.4 g/cm³.

In some variations, the disclosure is directed to a cathode active material for lithium-ion batteries that includes a lithium cobalt oxide having a tetravalent metal of $Mn^{4+}$. In these materials, the trivalent Co ion, $Co^{3+}$, can serve as host to supply the capacity. Without wishing to be limited to any theory or mode of action, incorporating $Mn^{4+}$ can improve a stability of lithium cobalt oxide under high voltage charging and can also help maintain an R$\bar{3}$m crystal structure when transitioning through a 4.1-4.6 V region (i.e., during charging and discharging).

In some instances, the voltage charge can be equal to or greater than 4.4 V. In some instances, the voltage charge can be equal to or greater than 4.5 V. In some instances, the voltage charge can be equal to or greater than 4.6 V.

A degree of Mn can influence an amount of additional lithium desired for the cathode active material. For example, and without limitation, a composition of lithium cobalt oxide having 92% Co and 8% Mn may correspond to a lithium content of 6 to 10 mole percent in excess of unity. In general, however, ranges for the lithium content may vary based on the degree of manganese substitution, and as shown in relation to FIG. 13, may be determined by those skilled in the art using empirical data.

Figure 13:
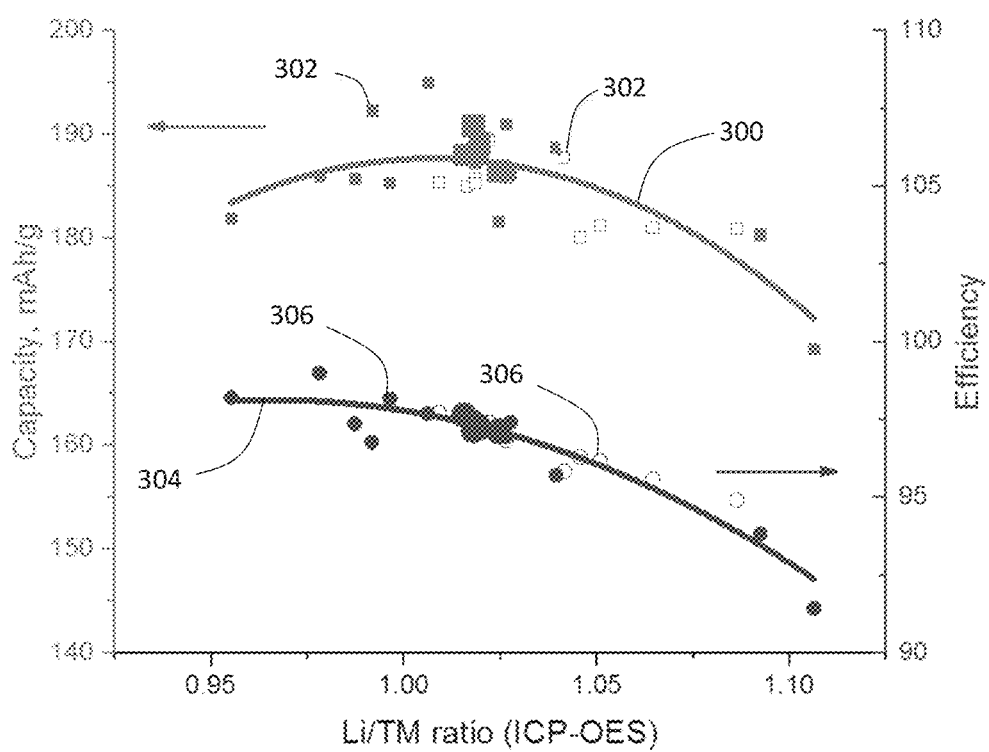
FIG. 13 is a plot of data representing an influence of molar ratio on a capacity and efficiency of a cathode active material comprising $Li_\alpha Co_{0.96}Mn_{0.04}O_\delta$, according to an illustrative embodiment.

FIG. 13 presents a plot of data representing an influence of molar ratio on a capacity (i.e., a first-cycle discharge capacity) and efficiency of a cathode active material comprising $Li_\alpha Co_{0.96}Mn_{0.04}O_\delta$ (i.e., x=0.04), according to an illustrative embodiment. The molar ratio, indicated on the abscissa, corresponds to $\alpha$, the molar ratio of lithium content to total transition-metal content (i.e., described as the "Li/TM ratio" in FIG. 13). To determine the molar ratio, the cathode active material was characterized chemically using inductively-coupled plasma optical emission spectroscopy (ICP-OES), as known to those skilled in the art. The capacity and efficiency are indicated, respectively, on the left-side and right-side ordinates.

With further reference to FIG. 13, a first curve 300 representing a change in capacity with the molar ratio is fitted to a first set of data points 302. A second curve 304 representing a change in efficiency with the molar ratio is fitted to a second set of data points 306. For this particular composition (i.e., x=0.04), the first curve 300 exhibits a maximum in a range corresponding to $0.98 \leq \alpha \leq 1.05$. However, it will be appreciated that limits of the range may change in response to changes in x, which represents an amount of Mn in the cathode material. In general, those skilled in the art may alter $\alpha$ and x to achieve a desired combination of capacity and efficiency.

In certain variations, the compounds described herein can allow for excess lithium storage. In FIG. 13, increasing lithium (i.e., $0.98 < \alpha \leq 1.05$) is demonstrated to increase the capacity of the cathode material relative to unity (i.e., $\alpha$=1.00). This increased capacity allows those skilled in the art to match a particular (increased) capacity to a desired efficiency. Such increased capacity is unexpected. In various aspects, additional lithium can normally expected to function as a contaminant in the cathode material, degrading its performance. Indeed, when the excess of lithium exceeds a threshold value (e.g., exceeds $\alpha \sim 1.05$ in FIG. 13), both capacity and efficiency decrease.

Figure 14:
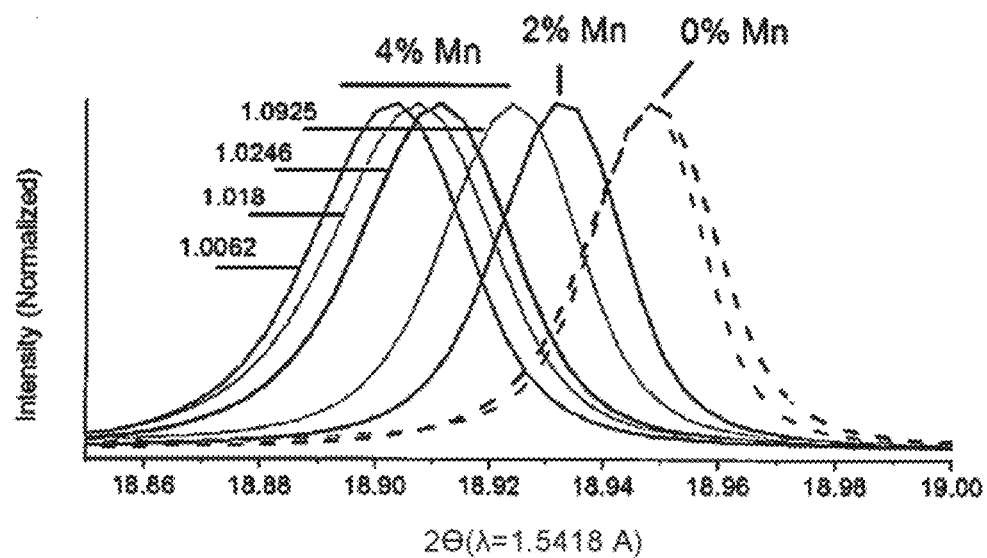
FIG. 14 is a plot of data representing an influence of molar ratio, represented by $\alpha$, and Mn content, represented by x, on a c-axis lattice parameter of $Li_\alpha Co_{0.96}Mn_{0.04}O_\delta$, according to an illustrative embodiment.

In various aspects, the compounds described herein provide for increased capacity and stability of the cathode active material over known compounds. FIG. 14 presents a plot of data representing an influence of the molar ratio, represented by $\alpha$, and Mn content, represented by x, on a c-axis lattice parameter of the compound of Formula (IV), i.e., $Li_\alpha Co_{0.96}Mn_{0.04}O_\delta$, according to an illustrative embodiment. Oxygen in the composition may correspond to $\delta$=2, although variations from this stoichiometry are possible (i.e., within $1.90 \leq \delta \leq 2.20$). The data are generated using techniques of X-ray diffraction, as known by those skilled in the art. The (003) peak in the R$\bar{3}$m diffraction pattern for $LiCoO_2$ characteristically shifts according x and $\alpha$. For a given x (e.g., 0.04 or 4 mole percent), the c-lattice contracts with increasing $\alpha$ (i.e., as $\alpha$ increases from 1.0062 to 1.0925). Without wishing to be limited to any theory or mode of action, it is believed that excess Li moves into a transition metal layer of $Li_\alpha Co_{0.96}Mn_{0.04}O_\delta$ due to the presence of $Mn^{4+}$. This displacement increases the lithium capacity and stability of the material.

Figure 15:
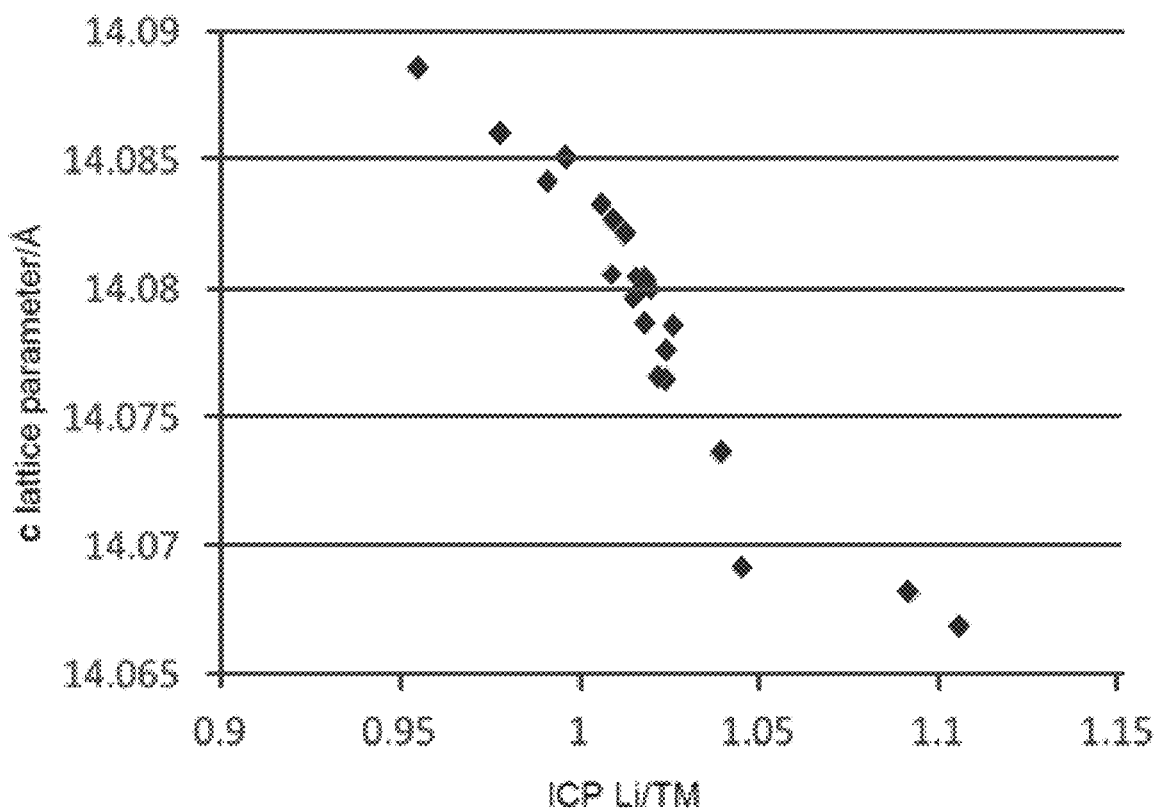
FIG. 15 is a plot of data representing a change in the c-axis lattice parameter with molar ratio for $Li_\alpha Co_{0.96}Mn_{0.04}O_2$, according to an illustrative embodiment.

FIG. 15 presents a plot of data representing a change in the c-axis lattice parameter with molar ratio for $Li_\alpha Co_{0.96}Mn_{0.04}O_\delta$, according to an illustrative embodiment. (The molar ratio, $\alpha$, is indicated on the abscissa as "ICP Li/TM"). Oxygen in the composition may correspond to $\delta$=2, although variations from this stoichiometry are possible (i.e., within $1.90 \leq \delta \leq 2.20$). To determine $\alpha$, the cathode active material was characterized chemically using ICP-OES, as known to those skilled in the art. The change in the c-axis lattice parameter follows a sigmoidal curve. The sigmoidal curve tends to become asymptotic at extremes of $\alpha$ (i.e., the lowest and highest values of $\alpha$ shown in FIG. 15).

The disclosure is further directed to methods of producing a powder comprising $Li_\alpha Co_{1-x}Mn_x O_\delta$. The method includes the steps of mixing a lithium source with precursor particles to produce a reactant, and then heating the reactant to a high temperature.

Precursors of the lithium-ion cathode materials can be calcined to obtain the positive electrode material. However, it can be difficult to control the particle sintering process to produce high density particles and at the same time produce a high capacity material. State of the art procedures add a variable amount of extra lithium of up to 10 wt % due to its high evaporation rate at high temperatures.

The precursor particles comprise a transition-metal hydroxide comprising Co and Mn. Non-limiting examples of the lithium source include lithium hydroxide (i.e., LiOH) and lithium carbonate (i.e., $Li_2CO_3$). However, other lithium sources are possible.

The method also includes heating the reactant to a temperature equal to or greater than 800° C. In these methods, $0 \leq x \leq 0.10$ and $1.90 \leq \delta \leq 2.20$. In some variations, $0 < x \leq 0.10$. The ratio of the lithium source to the precursor particles is selected such that $0.95 \leq \alpha \leq 1.10$. This ratio may be equal to or greater than the molar ratio, $\alpha$, due to evaporative losses of lithium during heating. In some embodiments, the temperature is between 800-1200° C.

In some aspects, the temperature of heating is from about 800 to about 1000° C. In other aspects, the temperature of heating is from about 1000 to about 1100° C. In other aspects, the temperature of heating is from about 1100 to about 1200° C. In still other aspects, the temperature of heating is from about 900 to about 1000° C. In still yet other aspects, the temperature of heating is from about 800 to about 900° C. Without wishing to be limited to any mechanism or mode of action, temperatures in the aforementioned ranges allow particles of powder to exhibit gravimetric density and strength sufficient for lithium-ion battery applications. These ranges also correspond to improved capacities and first-cycle efficiencies. Again, without wishing to be limited to any mechanism or mode of action, it will be appreciated that high gravimetric densities allow increased energy densities for the cathode active material. Particle strength can improve efficient handling during battery manufacturing and for cycle stability during battery operation.

Figure 16:
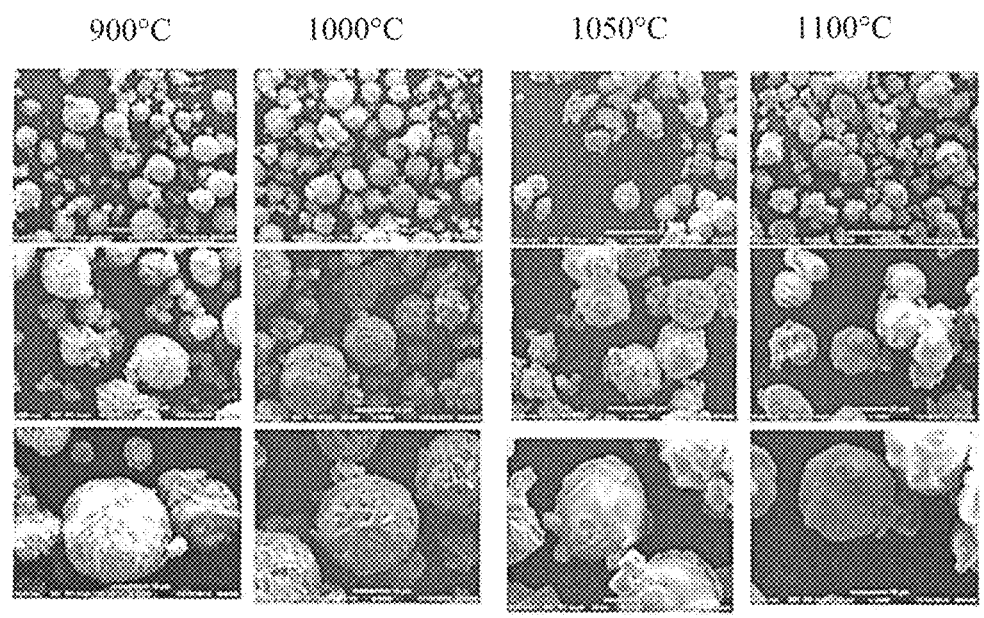
FIG. 16 is a series of scanning electron micrographs of powder prepared at 900° C., 1000° C., 1050° C., and 1100° C., according to an illustrative embodiment.

In various aspects, the molar ratio (i.e., $\alpha$), the temperature, and corresponding heating periods can control particle sintering and densification. FIG. 16 presents a series of scanning electron micrographs of powder prepared at 900° C., 1000° C., 1050° C., and 1100° C., according to an illustrative embodiment. The temperature increases from left to right and a magnification increases from top to bottom. A composition of the powder particles corresponds to α=1.04 and x=0.04. At 900° C. and 1000° C., particles of the powder retain a plate-like structure of the precursor particles. The powder exhibits a tap density of 2.0 and 2.1 g/cm³, respectively. At 1050° C. and 1100° C., however, a morphology of individual particles in the powder has changed to smooth (i.e., a smooth surface). This smooth morphology suggests a partial melting during. The corresponding tap density increases to 2.3-2.4 g/cm³. These powders show greater strength because the grains (i.e., the primary particles) have grown and are better bonded together. Moreover, the grains have decreased in number and fewer grain boundaries are present therein.

In these methods, additional lithium content controls a degree of sintering of the precursor particles. Such additional lithium content also controls a capacity of the powder, when included as a cathode active material. It will be understood that sufficient lithium should be present to react with and sinter the precursor particles, but not risk over-sintering the precursor particles. Over-sintering can produce a solid mass. Even if a solid mass can be avoided, excessive lithium may lower capacity and efficiency of the cathode active material.

Figure 17:
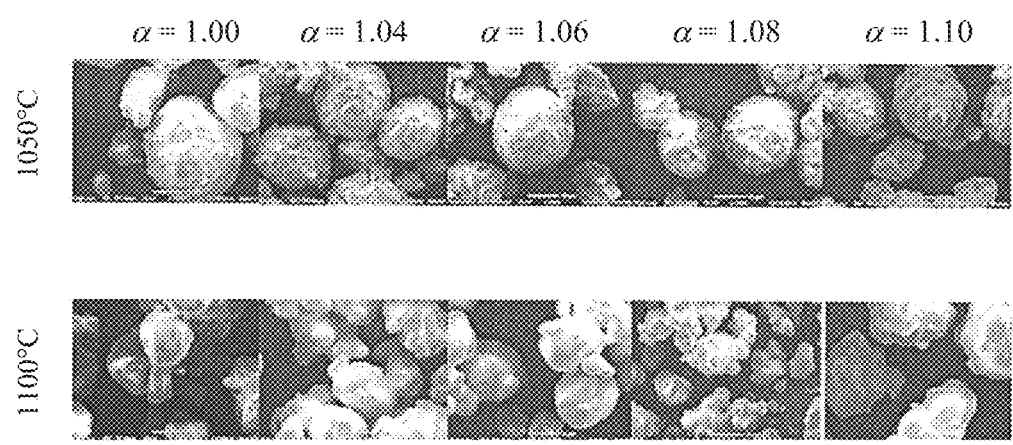
FIG. 17 is a series of scanning electron micrographs showing an influence of temperature and molar ratio, $\alpha$, on particle morphology, according to an illustrative embodiment.

The particle density and strength increases with increasing molar ratio (i.e., α). FIG. 17 presents a series of scanning electron micrographs showing an influence of temperature and molar ratio (α) on particle morphology, according to an illustrative embodiment. A composition of the powder (i.e., particles therein) corresponds to x=0.04 with a increasing progressively from 1.00, to 1.04, to 1.06, to 1.08, and to 1.10 (i.e., from left to right in FIG. 17). Two temperatures are presented, i.e., 1050° C. and 1100° C. Oxygen in the composition may correspond to δ=2, although variations from this stoichiometry are possible (i.e., within 1.90≤δ≤2.20).

The heating temperature can have an effect on the surface morphology and increased tap density of the powder. In the embodiment depicted in FIG. 17, at 1050° C. and a values less than 1.02 the secondary particles are free-flowing after calcination. However, primary grains are not well bonded for strength. At higher molar ratios, however, individual grains fused together better. At 1100° C., the secondary particles had smooth surfaces and well-bonded grains. As the molar ratio is increased (i.e., at 1100° C.), the secondary particles begin to bond together, forming a rigid sintered mass of particles. This rigid sintered mass may be broken apart by grinding.

In some embodiments, 1.00≤α≤1.05. In other embodiments of the method, 1.00<α≤1.10. In further embodiments, 1.00<α≤1.05.

In some embodiments, 1.01≤α≤1.05 and 0.02≤x≤0.05. In further embodiments, 1.01≤α≤1.05 and x=0.04.

Figure 18:
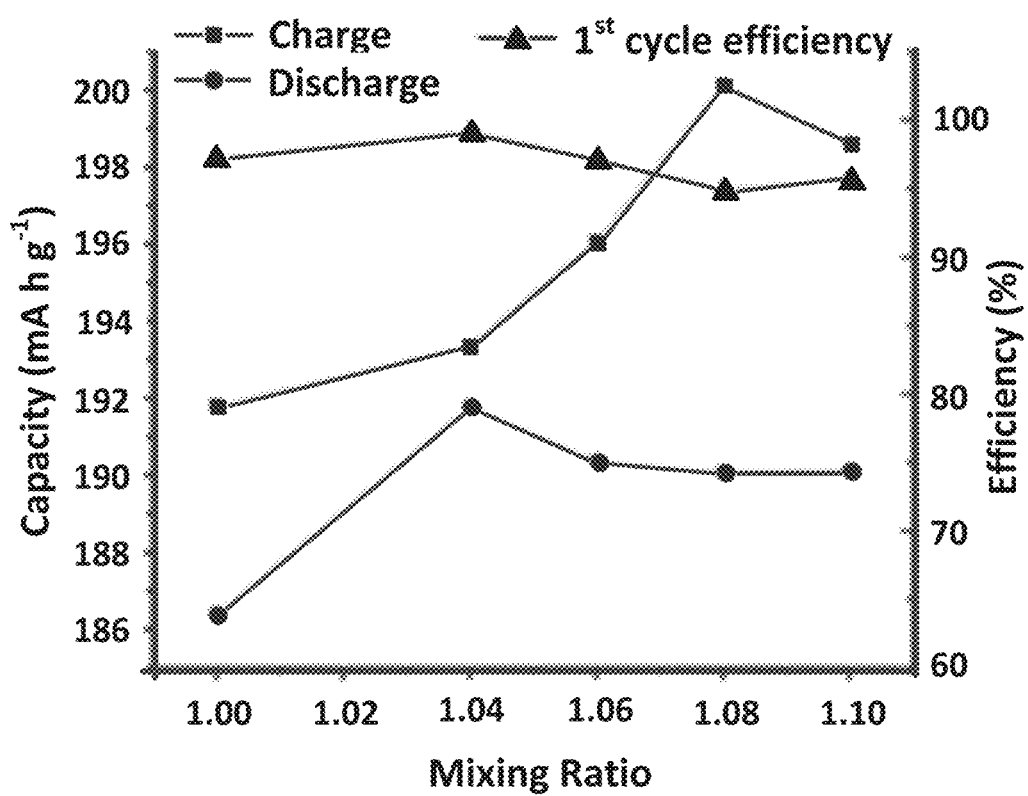
FIG. 18 is a plot of data representing an influence of mixing ratio on a capacity and an efficiency of a cathode active material comprising $Li_\alpha Co_{0.96}Mn_{0.04}O_\delta$, according to an illustrative embodiment.

FIG. 18 presents a plot of data representing an influence of mixing ratio on a capacity and an efficiency of a cathode active material comprising $Li_\alpha Co_{0.96}Mn_{0.04}O_\delta$, according to an illustrative embodiment. The mixing ratio corresponds to the ratio of lithium source mixed the precursor particles. The cathode active material includes the powder depicted in FIG. 17 and calcined at 1050° C. Oxygen in the composition may correspond to δ=2 although variations from this stoichiometry are possible (i.e., within 1.90≤δ≤2.20).

In FIG. 18, the abscissa shows an increase of the mixing ratio from 1.00 to 1.10. The cathode active material has a maximum discharge capacity of 192 mAh/g (i.e., during discharge from 4.5 V to 2.75 V) at a mixing ratio of 1.04, which corresponds to α=1.01 as measured by ICP-OES. High discharge values of ~190 mAh/g for mixing ratios of 1.06, 1.08, and 1.10 (i.e., α=1.02, 1.03, and 1.04, respectively by ICP-OES) can also be obtained.

In some variations, the disclosure is directed to a compound represented by Formula (VII):

$$Li_\alpha Co_{1-x-y}M_y Mn_x O_\delta \quad (VII)$$

wherein 0.95≤α≤1.30, 0<x≤0.30, 0≤y≤0.10, and 1.98≤δ≤2.04, and M is at least one element selected from the group consisting of B, Na, Mg, Ti, Ca, V, Cr, Fe, Co, Ni, Cu, Zn, Al, Sc, Y, Ga, Zr, Ru, and Mo. The compound of Formula (VII) is single phase. The compound can have a trigonal R$\bar{3}$m crystal structure. In further variations, 0.98≤α≤1.16 and 0<x≤0.16. In some variations 0.98≤α≤1.16, 0<x≤0.16, 0<y≤0.05, 1.98≤δ≤2.04.

In some variations, the disclosure is directed to a compound represented by Formula (VIII):

$$Li_\alpha Co_{1-x-y}Al_y Mn_x O_\delta \quad (VIII)$$

wherein 0.95≤α≤1.30, 0<x≤0.30, 0≤y≤0.10, and 1.98≤δ≤2.04. In some variations, 0.96≤α≤1.04, 0<x≤0.10, 0≤y≤0.10, and 1.98≤δ≤2.04. In some variations, the compounds represented by Formula (VIII) have 0.98≤α≤1.01, 0.02≤x≤0.04, 0≤y≤0.03, and 1.98≤δ≤2.04. The compound of Formula (VIII) is a single phase. The compound can have trigonal R$\bar{3}$m crystal structure.

In some instances, the compounds represented by Formulas (VII) and (VIII) have α>1+x. In other instances, α≤1+x. As such, α in Formulas (VII) and (VIII) can deviate from α=1+x, which may be associated with a solid-solution between $Li_2MnO_3$ and $(1-x)LiCo_{1-y}M_y O_2$. This solid solution can be represented by $xLi_2MnO_3 \cdot (1-x)LiCo_{1-y}M_y O_2$, and $xLi_2MnO_3 \cdot (1-x)Li1-yCo_{1-y}M_y O_2$, or in compact notation, $Li_{1+x}Co_{1-x-y+xy}M_{(1-x)*y}Mn_x O_{2+x}$ or $Li_{1+x-y+xy}Co_{1-x-y+xy}M_{(1-x)*y}Mn_x O_{2+x}$ As described, the various compounds do not include a second phase, such as a second phase having a different crystal structure. It will be appreciated that $Li_2MnO_3$ is a "rock salt" phase having a monoclinic C2/m crystal structure. Thus, cathode active materials based on the solid solution between $Li_2MnO_3$ and $LiCo_{1-y}M_y O_2$ have portions of "rock salt" phase that exhibit the monoclinic C2/m crystal structure. This "rock salt" phase occurs in addition to any phases associated with $LiCo_{1-y}M_y O_2$, making the solid solution bi-phasic (or multi-phasic). In contrast, the cathode active materials represented by Formulas (VII) & (VIII), and variations thereof, are single phase and have only a trigonal R$\bar{3}$m crystal structure.

Without wishing to be held to any particular mechanism or mode of action, manganese is incorporated into the compounds of Formulas (VII) and (VIII) to stabilize its R$\bar{3}$m crystal structure, although other constituents of M may also contribute to stabilization. The compounds include a sub-lattice of Co in their R$\bar{3}$m crystal structures in which Mn is uniformly distributed. Alternatively, in some variations, clusters of manganese (e.g., pairs, triplets, etc.) occur in the sub-lattice of Co that are uniformly distributed therein. Clustering can be detected, for example, by nuclear magnetic resonance (NMR) as described herein. The presence of Mn in the compounds may limit phase transitions from the R$\bar{3}$m crystal structure during battery operation (e.g., charging, discharging, etc.). The presence of Mn may also improve an oxidative stability of the compound at higher voltages (e.g., voltages equal to or greater than 4.0V).

In some variations, x corresponds to a degree that Mn substitutes for Co. The degree of Mn substitution can correlate to the stability of compounds when used in cathode active materials. In various aspects, the substitution of Mn for Co can be greater than or equal to a lower substitution limit. Alternatively, the substitution of Mn for Co can be equal to or less than a substitution limit.

In some variations, x is at least 0.001. In some variations, x is at least 0.01. In some variations, x is at least 0.02. In some variations, x is at least 0.03. In some variations, x is at least 0.04. In some variations, x is at least 0.05. In some variations, x is at least 0.06. In some variations, x is at least 0.07. In some variations, x is at least 0.08. In some variations, x is at least 0.09. In some variations, x is at least 0.10. In some variations, x is at least 0.12. In some variations, x is at least 0.14. In some variations, x is at least 0.16. In some variations, x is at least 0.18. In some variations, x is at least 0.20. In some variations, x is at least 0.22. In some variations, x is at least 0.24. In some variations, x is at least 0.26. In some variations, x is at least 0.28.

In some variations, x is less than or equal to an upper substitution limit. In some variations, x is less than or equal to 0.30. In some variations, x is less than or equal to 0.28. In some variations, x is less than or equal to 0.26. In some variations, x is less than or equal to 0.24. In some variations, x is less than or equal to 0.22. In some variations, x is less than or equal to 0.20. In some variations, x is less than or equal to 0.18. In some variations, x is less than or equal to 0.16. In some variations, x is less than or equal to 0.14. In some variations, x is less than or equal to 0.12. In some variations, x is less than or equal to 0.10. In some variations, x is less than or equal to 0.09. In some variations, x is less than or equal to 0.08. In some variations, x is less than or equal to 0.07. In some variations, x is less than or equal to 0.06. In some variations, x is less than or equal to 0.05. In some variations, x is less than or equal to 0.04. In some variations, x is less than or equal to 0.03.

It will be understood that the lower and upper substitution limits may be combined in any variation as above to define a range for x, in any combination. For example, and without limitation, x may range from 0.001 to 0.01. x may range from 0.02 to 0.05 (i.e., $0.02 \leq x \leq 0.07$). In another non-limiting example, x may range from 0.24 to 0.28 (i.e., $0.06 \leq x \leq 0.10$). In still yet another non-limiting example, x may range from 0.24 to 0.28 (i.e., $0.2.2 \leq x \leq 0.28$). Other combinations of the upper and lower limits are possible.

Figure 29:
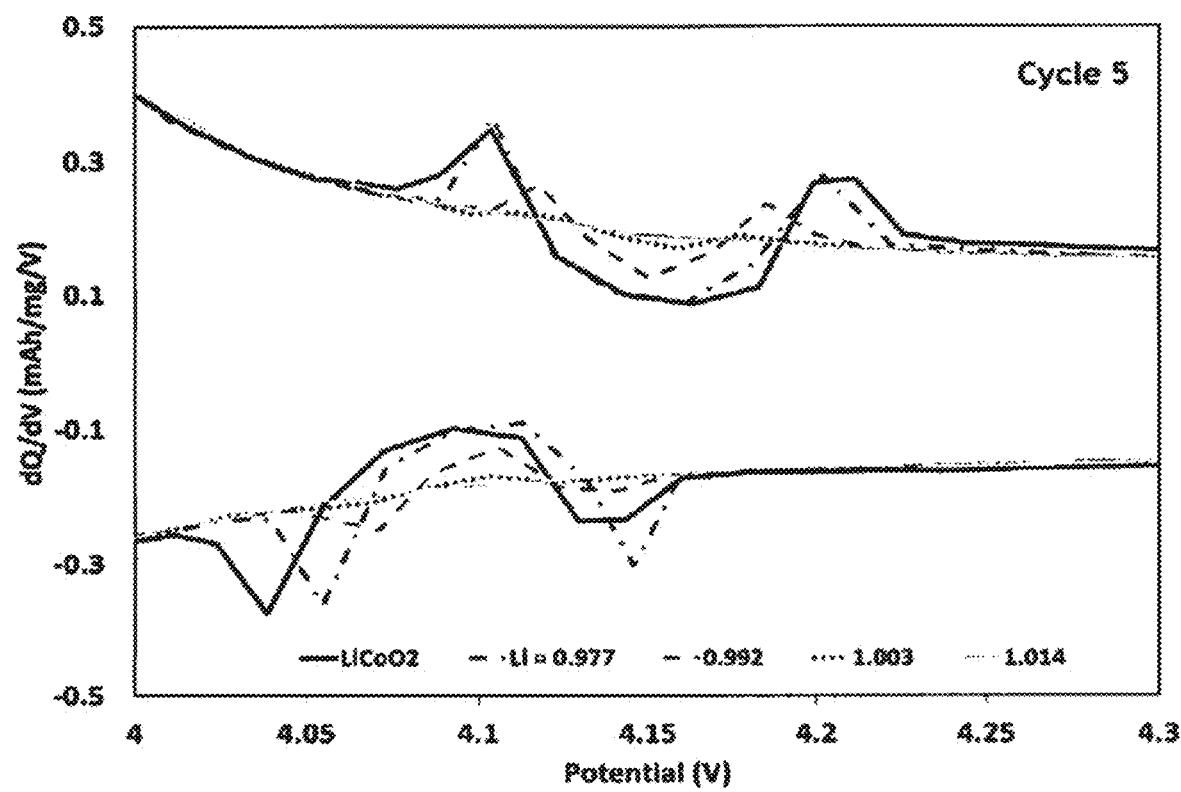
FIG. 29 is a plot of differential capacity curves for cathode active materials comprising $Li_{0.977}Co_{0.97}Al_yMn_{0.03}O_\delta$, $Li_{0.992}Co_{0.97}Al_yMn_{0.03}O_\delta$, $Li_{1.003}Co_{0.97}Al_yMn_{0.03}O_\delta$, and $Li_{1.014}Co_{0.97}Al_yMn_{0.03}O_\delta$, according to an illustrative embodiment.
Figure 30:
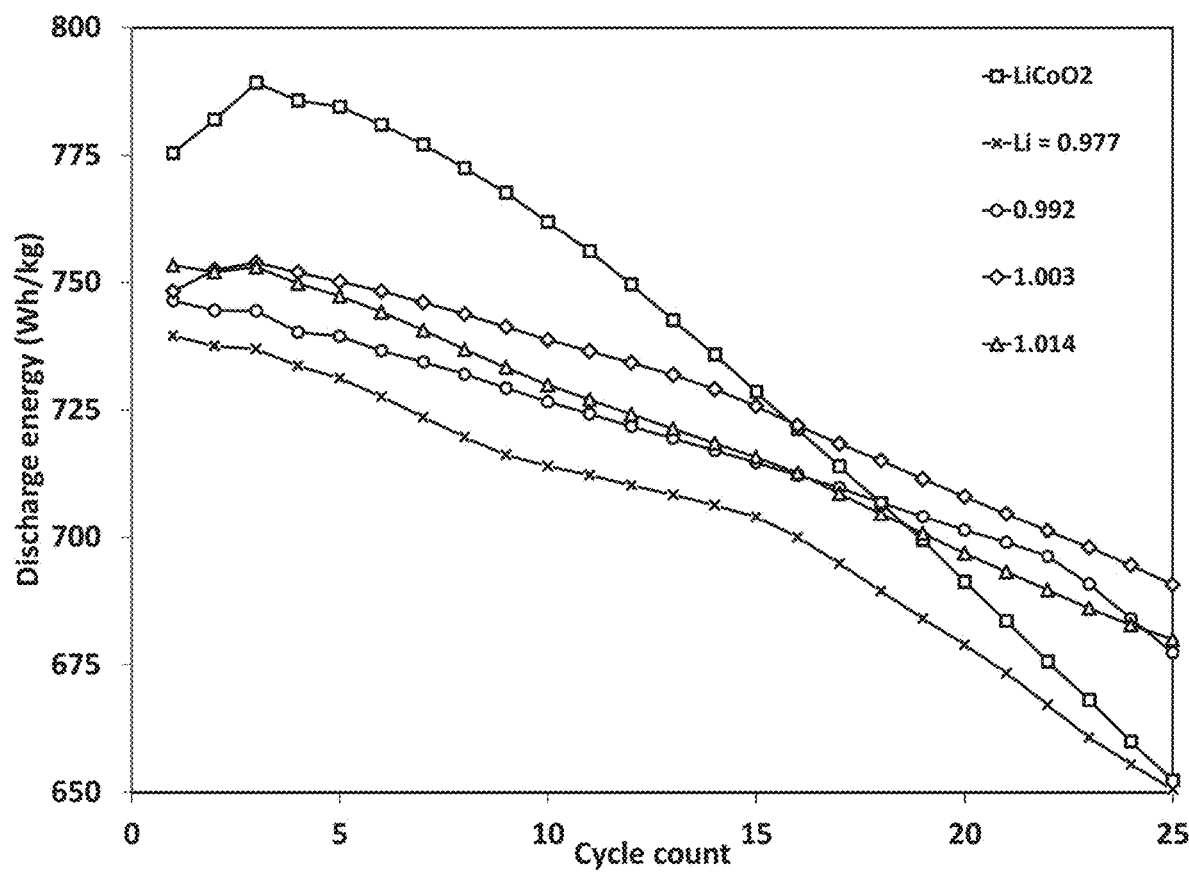
FIG. 30 is a plot of discharge energy versus cycle count for cathode active materials comprising $Li_{0.992}Co_{0.97}Mn_{0.03}O_\delta$, $Li_{1.003}Co_{0.97}Mn_{0.03}O_\delta$, and $Li_{1.014}Co_{0.97}Mn_{0.03}O_\delta$, according to an illustrative embodiment.

Furthermore, without wishing to be held to any particular mechanism or mode of action, a content of lithium may be selected in the compounds of Formulas (VII) and (VIII) to stabilize its $R\bar{3}m$ crystal structure and improve battery performance. The content of lithium may selectively complement a degree of substitution for Co (i.e., via Mn, M, or Al substitutions). For example, and without limitation, α may be selected to be about 1+x. Relative to α=1 this selection may improve stability of the $R\bar{3}m$ crystal structure during lithiation and de-lithiation (see FIG. 29). In another non-limiting example, α may be selected to be greater than 1+x to accommodate substitutes in addition to Mn (i.e., M and y). These substitutes may allow the compounds to have improved discharge energies (see FIG. 33). In still yet another example, the lithium content may be selected according to α<1+x to enhance battery performance. As shown by FIG. 30, $Li_{1.003}Co_{0.097}Mn_{0.03}O_2$ maintains higher discharge energy after repeated cycling than $Li_{1.014}Co_{0.97}Mn_{0.03}O_2$, even though the latter has a higher value for α. In some variations, $0.98 \leq Li/Me \leq 1.01$ It will be appreciated that α corresponds to a ratio of Li to Co and its substitutes (i.e., with reference to Formula (VII), M and Mn, and with reference to Formula (VIII), M, Mn, and Al). With respect to Formula (VII), the ratio can be depicted as $[Li]/[Co_{1-x-y}M_yMn_x]$. With respect to Formula (VII), the ratio can be depicted as $[Li]/[Co_{1-x-y}Al_yMn_x]$. For compounds with y=0, α corresponds to a ratio of Li to Co and Mn, i.e., $[Li]/[Co_{1-x}Mn_x]$. This latter ratio can be referred as the lithium to transition metal ratio (i.e., Li/TM).

In some variations, the compounds remain single phase and have the trigonal $R\bar{3}m$ crystal structure. In some variations, α can be equal to greater than a lower limit. In some variations, α is at least 0.95. In some variations, α is at least 0.98. In some variations, α is at least 1.00. In some variations, α is greater than 1.00. In some variations, α is at least 1.02. In some variations, α is at least 1.04. In some variations, α is at least 1.06. In some variations, α is at least 1.08. In some variations, α is at least 1.10. In some variations, α is at least 1.12. In some variations, α is at least 1.14. In some variations, α is at least 1.16. In some variations, α is at least 1.20. In some variations, α is at least 1.22. In some variations, α is at least 1.24. In some variations, α is at least 1.26. In some variations, α is at least L28.

Similarly, α can be less than or equal to a lower limit. In some variations, α is less than or equal to 1.30. In some variations, α is less than or equal to 1.28. In some variations, α is less than or equal to 1.26. In some variations, α is less than or equal to 1.24. In some variations, α is less than or equal to 1.22. In some variations, α is less than or equal to 1.20. In some variations, α is less than or equal to 1.16. In some variations, α is less than or equal to 1.14. In some variations, α is less than or equal to, 1.12. In some variations, α is less than or equal to 1.10. In some variations, α is less than or equal to 1.08. In some variations, α is less than or equal to 1.06. In some variations, α is less than or equal to 1.04. In some variations, α is less than or equal to 1.02. In some variations, α is less than or equal to 1.00. In some variations, α is less than 1.00. In some variations, α is less than or equal to 0.98. In these variations, the compounds also remain single phase and have the trigonal $R\bar{3}m$ crystal structure.

It will be understood that the lower and upper limits of α may be combined in any variation as above to define a range. For example, and without limitation, a may range from 0.95 to 1.00 (i.e., $0.95 \leq \alpha \leq 1.00$). In another non-limiting example, α may range from 1.00 to 1.06 (i.e., $1.00 \leq \alpha \leq 1.08$). In still yet another non-limiting example, α may range from 1.22 to 1.28 (i.e., $1.22 \leq \alpha \leq 1.28$). Other combinations of the upper and lower limits are possible.

It will also be understood that the lower and upper specification limits for x and the lower and upper limits for α may be combined in any variation as above to define combinations of ranges for x and α. For example, and without limitation, $x \geq 0.03$ and $0.98 \leq \alpha \leq 1.10$. In another non-limiting example, $0.02 \leq x \leq 0.10$ and $0.95 \leq \alpha \leq 1.12$. In still yet another non-limiting example, $0.04 \leq x \leq 0.12$ and $0.95 \leq \alpha \leq 1.16$. Other combinations of ranges are possible.

In some variations, α approaches 1+x. In these variations, a may approach 1+x within a tolerance not greater than 5%. The tolerance may correspond to $(1-t)*(1+x) \leq \alpha \leq (1+x)*(1+t)$ where $t \leq 0.05$. In some variations, the tolerance is less than or equal to ±5.0%. In some instances, the tolerance is less than or equal to ±14.5%. In some instances, the tolerance is less than or equal to ±4.0%. In some instances, the tolerance is less than or equal to ±3.5%. In some instances, the tolerance is less than or equal to ±3.0%. In some instances, the tolerance is less than or equal to ±2.5%. In some instances, the tolerance is less than or equal to ±2.0%. In some instances, the tolerance is less than or equal to ±1.5%. In some instances, the tolerance is less than or equal to ±1.0%.

In some instances, the tolerance is at least ±1.0%. In some instances, the tolerance is at least ±0.5%. In some instances, the tolerance is at least ±1.0%. In some instances, the tolerance is at least ±1.5%. %. In some instances, the tolerance is at least ±2.0%. In some instances, the tolerance is at least ±2.5%. In some variations, the tolerance is at least ±3.0%. In some instances, the tolerance is at least ±3.5%. In some instances, the tolerance is at least ±4.0%. In some instances, the tolerance is at least ±4.5%.

It will be understood that, when $\alpha$ approaches 1+x, the corresponding compounds maintain a single-phase character and do not have inclusions of $Li_2MnO_3$ therein. Moreover, the compounds can exhibit an improved resistance to phase transitions during charging and discharging, as well as improved discharge energies. Non-limiting examples of such compounds include $Li_{1.050}Co_{0.96}Mn_{0.04}O_2$, $Li_{1.074}Co_{0.96}Mn_{0.04}O_2$, $Li_{1.197}Co_{0.78}Mn_{0.22}O_2$, and $Li_{1.247}Co_{0.72}Mn_{0.28}O_2$.

In some variations, the compound is selected from among $Li_{1.050}Co_{0.96}Mn_{0.04}O_2$, $Li_{1.074}Co_{0.96}Mn_{0.04}O_2$, $Li_{1.081}Co_{0.96}Mn_{0.04}O_2$, $Li_{1.089}Co_{0.96}Mn_{0.04}O_2$, $Li_{1.050}Co_{0.93}Mn_{0.07}O_2$, $Li_{1.065}Co_{0.90}Mn_{0.10}O_2$, $Li_{1.100}Co_{0.90}Mn_{0.10}O_2$, $Li_{1.110}Co_{0.90}Mn_{0.10}O_2$, $Li_{1.158}Co_{0.90}Mn_{0.10}O_2$, $Li_{0.975}Co_{0.84}Mn_{0.16}O_2$, $Li_{1.050}Co_{0.84}Mn_{0.16}O_2$, $Li_{1.114}Co_{0.84}Mn_{0.16}O_2$ $Li_{1.197}Co_{0.78}Mn_{0.22}O_2$, $Li_{1.190}Co_{0.72}Mn_{0.28}O_2$, and $Li_{1.247}Co_{0.72}Mn_{0.28}O_2$. In these compounds, manganese substitutes for cobalt without inducing the formation of $Li_2MnO_3$, i.e., the compounds are single phase and have the trigonal R3̄m crystal structure.

In some variations, the compound is $Li_{0.991}Mn_{0.03}Co_{0.97}O_2$. In some variations, the compound is $Li_{0.985}Mn_{0.03}Co_{0.97}O_2$.

The disclosure is further directed to powders comprising compounds described herein. In various aspects, the disclosure is directed to a powder that includes particles comprising any compound identified above. The powder may serve as part or all of a cathode active material (i.e., the cathode active material includes the powder).

The compounds and powders can be in a cathode active material for lithium ion batteries, as described herein. These cathode active materials assist energy storage by releasing and storing lithium ions during, respectively, charging and discharging of a lithium-ion battery.

Without wishing to be limited to a particular mechanism or mode of action, the compounds can improve volumetric energy density, energy retention, and/or cyclability of cathode active materials during charge and discharge of battery cells. The compounds can improve the thermal stability of the cathode active materials.

In some variations, the particles have a mean particle diameter greater than or equal to a first lower limit. In some variations, the particle has a mean diameter of at least 5 μm. In some variations, the particle has a mean diameter of at least 10 μm. In some variations, the particle has a mean diameter of at least 15 μm. In some variations, the particle has a mean diameter of at least 20 μm. In some variations, the particle has a mean diameter of at least 25 μm.

In some variations, the particles have a mean particle diameter less than or equal to a first upper limit. In some variations, the particle has a mean diameter of less than or equal to 30 μm. In some variations, the particle has a mean diameter of less than or equal to 25 μm. In some variations, the particle has a mean diameter of less than or equal to 20 μm. In some variations, the particle has a mean diameter of less than or equal to 15 μm. In some variations, the particle has a mean diameter of less than or equal to 10 μm. In some variations, the particle has a mean diameter of less than or equal to 5 μm.

It will be understood that the first lower and upper limits may be combined in any variation as above to define a first range for the mean particle diameter. For example, and without limitation, the mean particle diameter may range from 10 mm to 20 μm. In another non-limiting example, the mean particle diameter may range from 20 mm to 25 μm. Other ranges are possible. The particles having the aforementioned mean particle diameters, whether characterized by the first lower limit, the first upper limit, or both (i.e., the first range), may be processed according to a co-precipitation method.

In some variations, the particles have a mean particle diameter greater than or equal to a second lower limit. In some variations, the particle has a mean diameter of at least 200 nm. In some variations, the particle has a mean diameter of at least 300 nm. In some variations, the particle has a mean diameter of at least 400 nm. In some variations, the particle has a mean diameter of at least 500 nm. In some variations, the particle has a mean diameter of at least 600 nm. In some variations, the particle has a mean diameter of at least 700 nm.

In some variations, the particles have a mean particle diameter less than or equal to a second upper limit. In some variations, the particle has a mean diameter of less than or equal to 800 nm. In some variations, the particle has a mean diameter of less than or equal to 700 nm. In some variations, the particle has a mean diameter of less than or equal to 600 nm. In some variations, the particle has a mean diameter of less than or equal to 500 nm. In some variations, the particle has a mean diameter of less than or equal to 400 nm. In some variations, the particle has a mean diameter of less than or equal to 300 nm.

It will be understood that the second lower and upper limits may be combined in any variation as above to define a second range for the mean particle diameter. For example, and without limitation, the mean particle diameter may range from 300 nm to 500 nm. In another non-limiting example, the mean particle diameter may range from 400 nm to 800 nm. Other ranges are possible. The particles having the aforementioned mean particle diameters, whether characterized by the second lower limit, the second upper limit, or both (i.e., the second range), may be processed according to a sol-gel method.

In some variations, the particles are secondary particles are formed of agglomerated primary particles. The agglomerated primary particles may be sintered together. In some instances, the secondary particles have a mean particle diameter greater than or equal to a lower limit. Non-limiting examples of the lower limit include 15 μm, 20 μm, and 25 μm. In some instances, the secondary particles have a mean particle diameter less than or equal to an upper limit. Non-limiting examples of the upper limit include 30 μm, 25 μm, and 20 μm. It will be understood that the lower and upper limits may be combined in any variation as above to define a range for the mean particle diameter. For example, and without limitation, the mean particle diameter may range from 15 μm to 20 μm. In another non-limiting example, the mean particle diameter may range from 20 μm to 25 μm. Other ranges are possible.

In some variations, a single primary particle occupies a percentage of a volume occupied by a corresponding secondary particle. In some instances, the percentage is greater or equal to a lower limit. In some variations, a single primary particle occupies at least 30% of a volume occupied by a corresponding secondary particle. In some variations, a single primary particle occupies at least 35% of a volume occupied by a corresponding secondary particle. In some variations, a single primary particle occupies at least 40% of a volume occupied by a corresponding secondary particle. In some variations, a single primary particle occupies at least 45% of a volume occupied by a corresponding secondary particle. In some variations, a single primary particle occupies at least 50% of a volume occupied by a corresponding secondary particle. In some variations, a single primary particle occupies at least 55% of a volume occupied by a corresponding secondary particle. In some variations, a single primary particle occupies at least 60 of a volume occupied by a corresponding secondary particle. In some variations, a single primary particle occupies at least 65% of a volume occupied by a corresponding secondary particle.

In some variations, a single primary particle occupies less than or equal to 70% of a volume occupied by a corresponding secondary particle. In some variations, a single primary particle occupies less than or equal to 65% of a volume occupied by a corresponding secondary particle. In some variations, a single primary particle occupies less than or equal to 60% of a volume occupied by a corresponding secondary particle. In some variations, a single primary particle occupies less than or equal to 55% of a volume occupied by a corresponding secondary particle. In some variations, a single primary particle occupies less than or equal to 50% of a volume occupied by a corresponding secondary particle. In some variations, a single primary particle occupies less than or equal to 45% of a volume occupied by a corresponding secondary particle. In some variations, a single primary particle occupies less than or equal to 40% of a volume occupied by a corresponding secondary particle. In some variations, a single primary particle occupies less than or equal to 35% of a volume occupied by a corresponding secondary particle.

It will be understood that the lower and upper limits may be combined in any variation as above to define a range for the percentage. For example, and without limitation, the percentage may range from 30-50%. However, other ranges are possible.

As described herein, the larger particle sizes, and percentage of secondary particles occupied by a singled primary particle, can be formed by using higher sintering temperatures. Without wishing to be held to a particular mechanism or mode of action, in some instances the particles do not fracture as readily, and thereby can provide increased stability than conventional particles.

Including Mn and/or Al in the compound in place of Co, altering the amount of Li, and/or including an $Al_2O_3$ coating can reduce, or reduce the likelihood of, a destabilizing phase transition. Without wishing to be limited to a particular mechanism or mode of action, the additional elements also give greater oxidative stability to the compounds at higher battery upper cut-off voltages. In some variations, the compounds, particles, and/or cathode active materials can have increased stability for at least 4.4V vs. $Li^0/Li^+$.

In some variations, the particles have increased particle strength. The increased particle strength results in increased energy retention when the particles are used in a cathode active material.

In some variations, increased amount of manganese in cathode active materials provides for improved battery stability. In some variations, the increased amount of Mn increases the onset temperature of decomposition. In some variations, increased amounts of Mn can result in reduced amount of heat release at a decomposition temperature of the compound.

In some variations, the cathode active materials have a first-cycle discharge energy of at least 700 Wh/kg. In some variations, the cathode active materials have a first-cycle discharge energy of at least 725 Wh/kg. In some variations, the cathode active materials have a first-cycle discharge energy of at least 750 Wh/kg. In some variations, the cathode active materials have a first-cycle discharge energy of at least 775 Wh/kg. In some variations, the cathode active materials have a first-cycle discharge energy of at least 800 Wh/kg. In some variations, the cathode active materials have a first-cycle discharge energy of at, least, 825 Wh/kg. In some variations, the cathode active materials have a first-cycle discharge energy of at least 850 Wh/kg. In some variations, the cathode active materials have a first-cycle discharge energy of at least 875 Wh/kg.

In some variations, the cathode active materials have a first-cycle discharge capacity of at least 180 mAh/g. In some variations, the cathode active materials have a first-cycle discharge capacity of at least 185 mAh/g. In some variations, the cathode active materials have a first-cycle discharge capacity of at least 190 mAh/g. In some variations, the cathode active materials have a first-cycle discharge capacity of at least 195 mAh/g. In some variations, the cathode active materials have a first-cycle discharge capacity of at least 200 mAh/g. In some variations, the cathode active materials have a first-cycle discharge capacity of at least 205 mAh/g. In some variations, the cathode active materials have a first-cycle discharge capacity of at least 210 mAh/g. In some variations, the cathode active materials have a first-cycle discharge capacity of at least 215 mAh/g.

In some variations, the cathode active materials have an energy capacity retention of at least 65% after 52 charge-discharge cycles. In some variations, the cathode active materials have an energy capacity retention of at least 67% after 52 charge-discharge cycles. In some variations, the cathode active materials have an energy capacity retention of at least, 69% after 52 charge-discharge cycles. In some variations, the cathode active materials have an energy capacity retention of at least 71% after 52 charge-discharge cycles. In some variations, the cathode active materials have an energy capacity retention of at least 73% after 52 charge-discharge cycles. In some variations, the cathode active materials have an energy capacity retention of at least 75% after 52 charge-discharge cycles. In some variations, the cathode active materials have an energy capacity retention of at least 77% after 52 charge-discharge cycles. In some variations, the cathode active materials have an energy capacity retention of at least 79% after 52 charge-discharge cycles. In some variations, the cathode active materials have an energy capacity retention of at least 81% after 52 charge-discharge cycles. In some variations, the cathode active materials have an energy, capacity retention of at least 83% after 52 charge-discharge cycles.

The compounds, powders, and cathode active materials can be used in batteries as described herein. The materials can be used in electronic devices. An electronic device herein can refer to any electronic device known in the art, including a portable electronic device. For example, the electronic device can be a telephone, such as a cell phone, and a land-line phone, or any communication device, such as a smart phone, including, for example an iPhone®, an electronic email sending/receiving device. The electronic device can also be an entertainment device, including a portable DVD player, conventional DVD player, Blue-Ray disk player, video game console, music player, such as a portable music player (e.g., iPod®), etc. The electronic device can be a part of a display, such as a digital display, a TV monitor, an electronic-book reader, a portable web-browser (e.g., iPad®), watch (e.g., AppleWatch), or a computer monitor. The electronic device can also be a part of a device that provides control, such as controlling the streaming of images, videos, sounds (e.g., Apple TV®), or it can be a remote control for an electronic device. Moreover, the electronic device can be a part of a computer or its accessories, such as the hard drive tower housing or casing, laptop housing, laptop keyboard, laptop track pad, desktop keyboard, mouse, and speaker. The battery and battery packs can also be applied to a device such as a watch or a clock. The components powered by a battery or battery pack can include, but are not limited to, microprocessors, computer readable storage media, in-put and/or out-put devices such as a keyboard, track pad, touch-screen, mouse, speaker, and the like.

EXAMPLES

The following examples are for illustration purposes only. It will be apparent to those skilled in the art that many modifications, both to materials and methods, may be practiced without departing from the scope of the disclosure.

Example 1—Wet Impregnation to Form an $Al_2O_3$ Coating

De-ionized water (Millipore ultra-pure water, 18 MΩ·cm) was added drop-wise to 10 g of base powder (i.e., 10 g of $Li_{1.04}Co_{0.96}Mn_{0.04}O_{2.04}$ base powder) while stirring. When the powder was wetted yet still loose, the stirring was stopped. (The addition of de-ionized water was stopped before the powder formed a watery or sticky mass.) A ratio, R, was then calculated that equaled an amount (either weight or volume) of added water divided by an amount of base powder. The amount of water needed to wet the powder to a suitable dampness depends on the surface area of the base powder used. In general, higher surface areas require more water.

Next, a quantity (e.g., weight) of base powder was selected. An amount of aluminum salt precursor (e.g., aluminum nitrate nonahydrate) was determined that would correspond to a desired level of $Al_2O_3$ coating on the desired quantity base powder (e.g., 0.1 wt. %). An amount of de-ionized water was then calculated using the ratio (i.e., multiplying R times the weight of the base powder). TABLE 1 presents types and quantities of base powder, solvent (i.e., de-ionized water), and aluminum salt precursor.

The quantities given in TABLE 1 were then measured, including the de-ionized water whose amount was predetermined. Aluminum nitrate nonahydrate was dissolved in the de-ionized water to form a clear solution. Drops of the clear solution were added to the base powder in a glass container under stirring. Once the clear solution was consumed, the base powder was stirred continuously for a few minutes to ensure well-mixing. A wetted, loose powder was formed.

The wetted, loose powder was dried in an oven overnight at 80° C. The dried powder was then transferred to an $Al_2O_3$ crucible and heat-treated at 120° C. for 2 hours. This heat treatment was followed by a subsequent heat treatment at 500° C. for 4 hours in stagnant air. The heat-treated powder was passed through 325-mesh sieve. Occasionally, light grinding with mortar and pestle was needed to break up agglomerated portions of the heated-treated powder.

TABLE 1

Materials for 0.1 wt. % $Al_2O_3$ Coating on 10 g $Li_{1.04}Co_{0.96}Mn_{0.04}O_2$

| Material | Reagent/Material | Quantity Used |
| --- | --- | --- |
| Base powder | $Li_{1.04}Co_{0.96}Mn_{0.04}O_2$ | 10 g |
| Solvent (for dissolving coating precursor) | De-ionized water | ~0.9-1 ml or g |
| Coating Precursor | $Al(NO_3)_3 \cdot 9H_2O$ | 0.075 g |

Example 2—Wet Impregnation to Form an $AlF_3$ Coating

A ratio, R, was determined according to procedures described in relation to Example 1.

Next, a quantity (e.g., weight) of base powder was selected. An amount of aluminum salt precursor (e.g., aluminum nitrate nonahydrate) and fluoride salt precursor (e.g., ammonium fluoride) was determined that would correspond to a level of $AlF_3$ coating on the desired quantity base powder (e.g., 0.1 wt. %). To ensure complete reaction, the amount of fluoride salt precursor was doubled relative to a stoichiometric amount of fluoride in $AlF_3$ (i.e., a mole ratio of Al to F was selected to be 1:6). A needed amount of de-ionized water was then calculated using the ratio (i.e., multiplying R times the weight of the base powder).

Aluminum nitrate nonahydrate was dissolved in a first portion of the de-ionized water to form a first clear solution. Ammonium fluoride was dissolved in a second portion of de-ionized water to form a second clear solution. The base powder was transferred to a glass container and drops of the first clear solution were added quickly therein (i.e., to "flood" the base powder). The base powder was stirred for 2 minutes and the dried at 105° C. to yield a powder cake.

The powder cake was broken up into a loose powder (e.g., with a mortar and pestle) and then transferred into a fresh glass container. The fresh glass container was gently tapped to pack the loose powder therein. The second clear solution was quickly added to the packed powder while stirring (i.e., similar to the first clear solution). This mixture was stirred for 2 minutes before drying at 105° C. The dried powder was transferred to an alumina saggar for heat treatment for 2 hours at 120° C. in flowing nitrogen. The heat-treated powder was then heated at 400° C. for 5 hours, resulting in a heat-treated powder cake. The heat-treated powder cake readily broke apart and was lightly ground and sieved through a 325 mesh.

Example 3—Wet Impregnation to Form an $AlPO_4$ Coating

A predetermined amount of base powder (i.e., $Li_{1.04}Co_{0.96}Mn_{0.04}O_2$) was weighed out in a glass container. An amount of aluminum and phosphate precursor needed for a desired amount of $AlPO_4$ coating (e.g., 5 wt. %) was calculated based on the weighed amount of base powder. The aluminum precursor used included various aluminum salts such as aluminum nitrate, aluminum acetate, or other aluminum salt soluble in water or alcohol. The phosphate precursor used was either ammonium dihydrogen phosphate ($NH_4H_2PO_4$), diammonium hydrogen phosphate [$(NH_4)_2HPO_4$], or a combination of both. A mole ratio of Al to P was kept between 0.9 and 1.1. The aluminum precursor and phosphate precursor were dissolved separately in a small amount of water or alcohol to form solutions. The two solutions were then mixed together. The pH of the mixed solution was adjusted by varying a ratio of the ammonium phosphate salts to prevent precipitation. The mixed solution was added drop-wise onto the base powder while stirring with a glass rod or spatula. The volume of solution was such that the base powder was incipiently wet and well mixed (i.e., exhibited a damp consistency). After drying at 50-80° C., the dried base powder was heat-treated at 700° C. for 5 h in stagnant air.

Example 4—Wet Impregnation to Form a $Co_3(PO_4)_2$ Coating

A predetermined amount of base powder (i.e., $Li_{1.04}Co_{0.96}Mn_{0.04}O_2$) was weighed out in a glass container. An amount of cobalt and phosphate precursor needed for a desired amount of $Co_3(PO_4)_2$ coating (e.g., 5 wt. %) was calculated based on the weighed amount of base powder. The cobalt precursor used included various cobalt salts such as cobalt nitrate, cobalt acetate, or other cobalt salt soluble in water or alcohol. The phosphate precursor used was either ammonium dihydrogen phosphate ($NH_4H_2PO_4$), diammonium hydrogen phosphate [$(NH_4)_2HPO_4$], or a combination of both. A mole ratio of Co to P was kept between 1.4 and 1.6. The cobalt precursor and the phosphate precursor were dissolved separately in a small amount of water or alcohol to form solutions. The two solutions were then mixed together. A pH of the mixed solution was adjusted by varying a ratio of the ammonium phosphate salts to prevent precipitation. The mixed solution was added drop-wise onto the base powder while stirring with a glass rod or spatula. The volume of solution added was such that the base powder was incipiently wet and well mixed (i.e., exhibited a damp consistency). After drying at 50-80° C., the dried base powder was then heat-treated at 700° C. for 5 h in stagnant air.

Example 5—Wet Impregnation to Form a Li—$Al_2O_3$ Coating

A predetermined amount of base powder (i.e., $Li_{1.04}Co_{0.96}Mn_{0.04}O_2$) was weighed out into a glass beaker. An amount of aluminum precursor needed for the desired amount of coating (e.g., 0.5 wt. %) was calculated based on the weighed amount of base powder. The aluminum precursor included various aluminum salts such as aluminum nitrate, aluminum acetate, or other aluminum salts soluble in water or alcohol. The aluminum precursor was dissolved in a small amount of water or alcohol to form a first clear solution. A desired amount of lithium precursor was calculated using a molar ratio of Li to Al between 0.25 and 1.05. The lithium precursor used was lithium hydroxide, lithium nitrate, lithium acetate, or other lithium salts soluble in water or alcohol. The desired amount of lithium precursor was dissolved in a small amount of water or alcohol to form a second clear solution. The first and second clear solutions were mixed together. This mixed solution was then added drop-wise to the base powder while stirring. The volume of solution added was such that the base powder became incipiently wet but not watery (i.e., exhibited a damp consistency). After drying at 50-80° C., the dried base powder was then heat-treated at 500° C. for 4 h in stagnant air. The pH of the first clear solution (i.e., the aluminum solution) can also be varied to improve coating properties such as coating density and uniformity.

Example 6—Wet Impregnation to Form a Li—$Co_3(PO_4)_2$ Coating

A predetermined amount of base powder (i.e., $Li_{1.04}Co_{0.96}Mn_{0.04}O_2$) was weighed out into a glass beaker. An amount of cobalt, phosphate, and lithium precursors needed for a desired amount of coating (e.g., 0.5 wt. %) was calculated based on the weighed amount of base powder. The cobalt precursor included various cobalt salts such as cobalt nitrate, cobalt acetate, or other cobalt salts soluble in water or alcohol. The phosphate precursor used was either ammonium dihydrogen phosphate ($NH_4H_2PO_4$), diammonium hydrogen phosphate [$(NH_4)_2HPO_4$], lithium phosphates, or combinations of such. A mole ratio of Co to P is kept between 1.4 and 1.6. A desired amount of lithium precursor was calculated using a molar ratio of Li to Co between 0.3 and 1.05. The lithium precursor used was lithium hydroxide, lithium nitrate, lithium acetate, or other lithium salts soluble in water or alcohol. The cobalt, phosphate and lithium precursors were dissolved separately in a small amount of water or alcohol to form corresponding clear solutions. The three solutions were then mixed together. This mixed solution was then added drop-wise to the base powder while stirring. The volume of solution added was such that the base powder became incipiently wet but not watery (i.e., exhibited a damp consistency). After drying at 50-80° C., the dried base powder was heat-treated to 700° C. for 5 h in stagnant air.

Example 7—Suspension Processing to Form an $Al_2O_3$ Coating

An aqueous solution of $Al(NO_3)_3$ was mixed with a suspension of base powder ($Li_{1.02}Co_{0.96}Mn_{0.04}O_2$) and then pumped into a stirred-tank reactor. While stirring, an ammonia solution was used to hold a reaction pH value at 9.3 using a feedback pump. The suspension was stirred for 2 h, filtered, dried, and calcined at 400° C. for 5 h in air.

Example 8—Suspension Processing to Form a $Co_3(PO_4)_2$ Coating

A first aqueous solution of $Co(NO_3)_3$ and a second aqueous solution of ammonium dihydrogen solution were pumped into a suspension of base powder ($Li_{1.02}Co_{0.96}Mn_{0.04}O_2$) in a stirred-tank reactor. The combined volume was stirred for 2 h, filtered, and dried. The dried powder was calcined at 700° C. for 5 h in air.

Example 9—Suspension Processing to Form an $AlPO_4$ Coating

A first aqueous solution of $Al(NO_3)_3$ and a second solution of ammonium dihydrogen phosphate were pumped into a suspension of base powder ($Li_{1.02}Co_{0.96}Mn_{0.04}O_2$) in a stirred-tank reactor. The combined volume was stirred for 2 h, filtered, and dried. The dried powder was calcined at 700° C. for 5 h in air.

Example 10—Dry Processing to Form an $Al_2O_3$ Coating

A predetermined amount of base powder ($Li_{1.02}Co_{0.96}Mn_{0.04}O_2$) was weighed out and poured into a dry coater (Nobilta, NOB-130, Hosokawa Micron Ltd). Next, nanocrystalline $Al_2O_3$ powder was weighed out according to a desired amount of coating on the predetermined base powder (e.g., 0.5 wt. %). The weighed nanocrystalline $Al_2O_3$ powder was poured into the dry coater. The dry coater included a high speed rotary mixer that bonds, via a mechanofusion process, particles of the nanocrystalline $Al_2O_3$ powder to particles in the base powder (i.e., along a surface thereof). For a 0.5 wt. % coating, 2.5 g of nanocrystalline $Al_2O_3$ powder was mixed thoroughly with 500 g of base powder. The speed was controlled at 4000 rpm. After 5 min, an $Al_2O_3$-coated base powder was formed.

Example 11—Dry Processing to Form an $AlF_3$ Coating

A predetermined amount of base powder ($Li_{1.02}Co_{0.96}Mn_{0.04}O_2$) was weighed out and poured into a dry coater (Nobilta, NOB-130, Hosokawa Micron Ltd). Next, nanocrystalline $AlF_3$ powder was weighed out according to a desired amount of coating on the predetermined base powder (e.g., 0.1 wt. %). The weighed nanocrystalline $AlF_3$ powder was poured into the dry coater. For a 0.1 wt. % coating, 0.5 g of $AlF_3$ was mixed thoroughly with 500 g of base powder. The speed was controlled at 4000 rpm. After 5 min, an $AlF_3$-coated base powder was formed.

Example 12—Dry Processing to Form a Coating of $Al_2O_3$ and $AlF_3$

A predetermined amount of base powder ($Li_{1.02}Co_{0.96}Mn_{0.04}O_2$) was weighed out and poured into a dry coater (Nobilta, NOB-130, Hosokawa Micron Ltd). Next, nanocrystalline $Al_2O_3$ powder and nanocrystalline $AlF_3$ powder were weighed out according to a desired amount of coating on the predetermined base powder (e.g., 0.1 wt. %). The weighed nanocrystalline powders were poured into the dry coater. For a 0.1 wt. % coating, 0.25 g of $Al_2O_3$ and 0.05 g of $AlF_3$ were mixed thoroughly with 500 g of base powder. The speed was controlled at 4000 rpm. After 5 min, a base powder coated with $Al_2O_3$ and $AlF_3$ was formed.

Example 13—Powder Characterization

The morphology, composition, and electrochemical performance of certain coated powders were evaluated with scanning electron microscopy (SEM), inductively-coupled plasma optical emission spectroscopy (ICP-OES), and a Maccor tester.

Figure 3A:
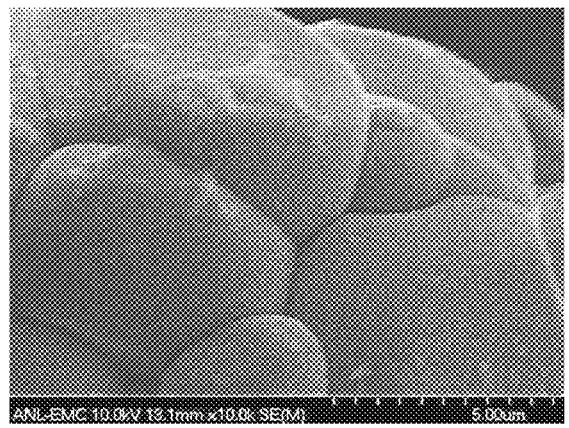
FIGS. 3A-3C are a series of scanning electron micrographs showing, respectively, a base powder, a 0.1 wt. % $AlF_3$-coated base powder, and a 0.1 wt. % $Al_2O_3$-coated base powder, according to an illustrative embodiment.
Figure 3B:
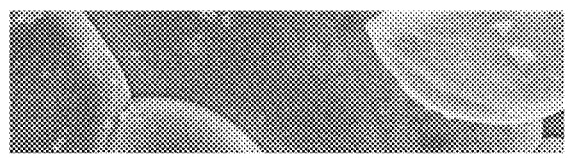
Figure 3C:
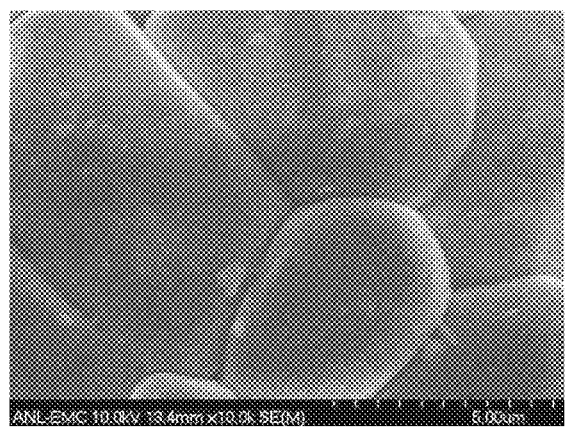

FIGS. 3A-3C present a series of scanning electron micrographs showing, respectively, a base powder, a 0.1 wt. % $AlF_3$-coated base powder, and a 0.1 wt. % $Al_2O_3$-coated base powder, according to an illustrative embodiment. The base powder corresponds to particles comprising $Li_{1.02}Co_{0.96}Mn_{0.04}O_2$. Only a subtle difference is shown for the powders before and after wet impregnation. Compared to an uncoated powder, i.e., FIG. 3A, surfaces of the coated powders appear furry and rough as indicated by stains or bumps, i.e., FIGS. 3B and 3C.

Quantities of $Al_2O_3$ and $AlF_3$ coated on base powder samples were determined with ICP-OES. TABLES 2 and 3 show the results for, respectively, $Al_2O_3$ and $AlF_3$ wet-impregnated base powders. A comparison of target coating levels with measured values indicates that the measured values match very well with their corresponding target values for coating levels ≥0.2 wt. %.

TABLE 2

ICP-OES results of $Al_2O_3$-coated and uncoated base powders

| Sample No. | Target Al2O3, wt % | Measured Al2O3 | Li/(Co + Mn + Ni) Value | ± | Mn/(Co + Mn + Ni) Value | ± | Al/(Co + Mn + Ni) Value | ± | Co/(Co + Mn + Ni) Value | ± |
|---|---|---|---|---|---|---|---|---|---|---|
| XW189a | 0.05 | 0.0775 | 0.989 | 0.002 | 0.0396 | 0.0001 | 0.0018 | 0.0001 | 0.96 | 3E-04 |
| XW189b | 0.1 | 0.1323 | 0.988 | 0.002 | 0.0396 | 0.0001 | 0.0028 | 0.0002 | 0.96 | 3E-04 |
| XW189c | 0.5 | 0.5083 | 0.988 | 0.002 | 0.0396 | 9E-05 | 0.0102 | 0.0006 | 0.959 | 4E-04 |
| XW190a | 0.5 | 0.4648 | 0.987 | 0.002 | 0.0395 | 8E-05 | 0.0095 | 0.0008 | 0.959 | 6E-04 |
| Uncoated HW168 | 0 |  | 1.008 | 0.002 | 0.0397 | 0.0001 | 0.003 | 0.0002 | 0.96 | 3E-04 |

TABLE 3

ICP-OES results of $AlF_3$-coated and uncoated base powders

| Sample No. | Target coagting, wt % | Measured AlF3, wt % | Li/(Co + Mn + Ni) Value | ± | Mn/(Co + Mn + Ni) Value | ± | Al/(Co + Mn + Ni) Value | ± | Co/(Co + Mn + Ni) Value | ± |
|---|---|---|---|---|---|---|---|---|---|---|
| CL130a | 0.05 | 0.103 | 0.9877 | 0.002 | 0.03955 | 0.00012 | 0.90145 | 0.00911 | 0.9597 | 0.0003 |
| CL129b | 0.1 | 0.156 | 0.9871 | 0.002 | 0.03956 | 0.00012 | 0.00205 | 0.00016 | 0.9601 | 0.0003 |
| CL125 | 0.2 | 0.224 | 0.9867 | 0.0021 | 0.03953 | 0.00008 | 0.00307 | 0.00025 | 0.9595 | 0.0006 |
| CL129a | 0.2 | 0.221 | 0.9853 | 0.0021 | 0.03951 | 0.00008 | 0.00304 | 0.00025 | 0.9595 | 0.0006 |
| Uncoated HW168 | 0 |  | 1.0083 | 0.0021 | 0.03965 | 0.00012 | 0.00301 | 0.00023 | 0.9596 | 0.0003 |

Example 14

Electrochemical tests were conducted on 2032 coin half-cells having a cathode active material loading of approximately 15 mg/cm$^2$. An electrolyte used by the 2032 coin half-cells included 1.2 M LiPF$_6$ in an EC:EMC solvent of 3:7 ratio by weight. The cells were placed on a Maccor Series 2000 tester and cycled in galvanostatic mode at room temperature with the voltage windows of 4.5V to 2.75V. A series of electrochemical tests of formation, rate, and cycling were conducted under each voltage window. During formation testing, a constant current (0.2 C) was applied to the cell during the charge process, followed by a constant voltage charge until the current was equal to or less than 0.05 C. Then, the cells were discharged at constant current (0.2 C) until the end of discharge. Charging and discharging of the cells were repeated three times. During rate testing, the charging rate was fixed to 0.7 C for all the rate tests, and then followed by constant voltage charge until the current was equal to or less than 0.05 C. Five different discharge rates of 0.1 C, 0.2 C, 0.5 C, 1 C, and 2 C were applied until the cells were completely discharged. Three cycles were conducted for each rate. Finally, 50 cycles were conducted to investigate cycle life. The same charging conditions as those of the rate test were applied. The discharge rate was fixed to 0.5 C for all the cycles.

Here we present the cycle data for the base powder $Li_{1.04}Co_{0.96}Mn_{0.04}O_2$ and the two highest performing coated samples ($Li_{1.04}Co_{0.96}Mn_{0.04}O_2$—$Al_2O_3$ 0.05 wt % and $Li_{1.04}Co_{0.96}Mn_{0.04}O_2$—$AlF_3$ 0.1 wt %).

Figure 4:
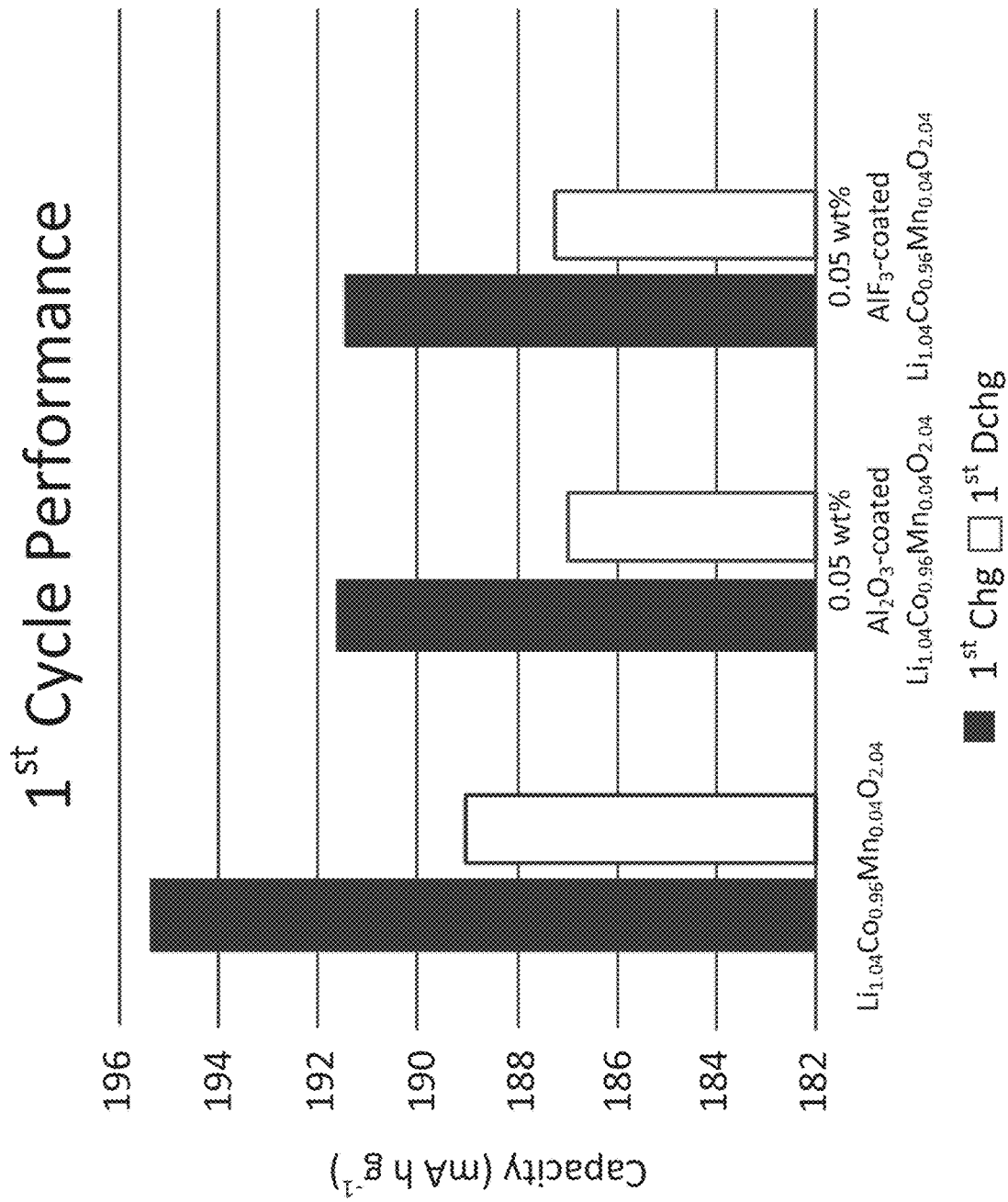
FIG. 4 is a plot of data representing a performance of three coin half cells, each incorporating a single cathode active material, during a first cycle of charging and discharging, according to an illustrative embodiment.

FIG. 4 presents a plot of data representing a performance of three coin half-cells, each incorporating a single cathode active material, during a first cycle of charging and discharging, according to an illustrative embodiment. The single cathode active material for each of three coin half-cells corresponds to, respectively, the base powder $Li_{1.04}Co_{0.96}Mn_{0.04}O_2$ (i.e. "HW168"), 0.05 wt. % $Al_2O_3$-coated $Li_{1.04}Co_{0.96}Mn_{0.04}O_2$, (i.e., "HW168-$Al_2O_3$ 0.05 wt. %) and 0.1 wt. % $AlF_3$-coated $Li_{1.04}Co_{0.96}Mn_{0.04}O_2$ (i.e., "HW168-$AlF_3$ 0.1 wt. %). The performance of the three coin half-cells is characterized by two bars: A leftmost bar indicates a first cycle charge capacity and a rightmost bar indicates a first cycle discharge capacity.

In FIG. 4, the presence of coatings in the cathode active material slightly reduces the first cycle charge capacity and discharge capacity as both the $Al_2O_3$— and $AlF_3$-coated variants show a 4 mAh/g reduced capacity relative to the uncoated variant. This value is higher than what was expected for such small amount of coating. Such reduction in capacity may be attributed to the loss of lithium during the coating process, as indicated by the ICP-OES data in TABLES 3 and 4. However, the performance shown by FIG. 4, which is an initial performance, is not representative of coin half-cell performance in subsequent charge and discharge cycles.

Figure 5:
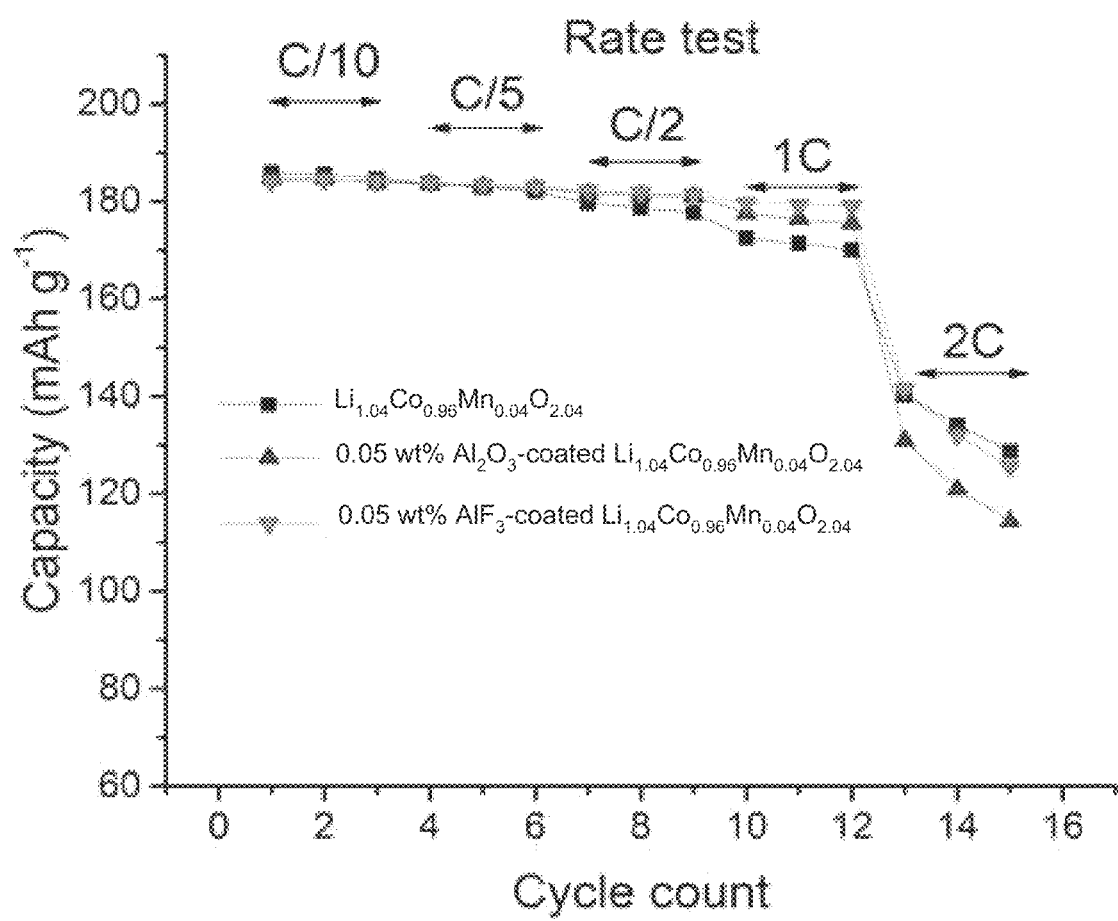
FIG. 5 is a plot of data representing a change in capacity, over extended cycling under rate testing, of the four coin half-cells of FIG. 4, according to an illustrative embodiment.
Figure 6:
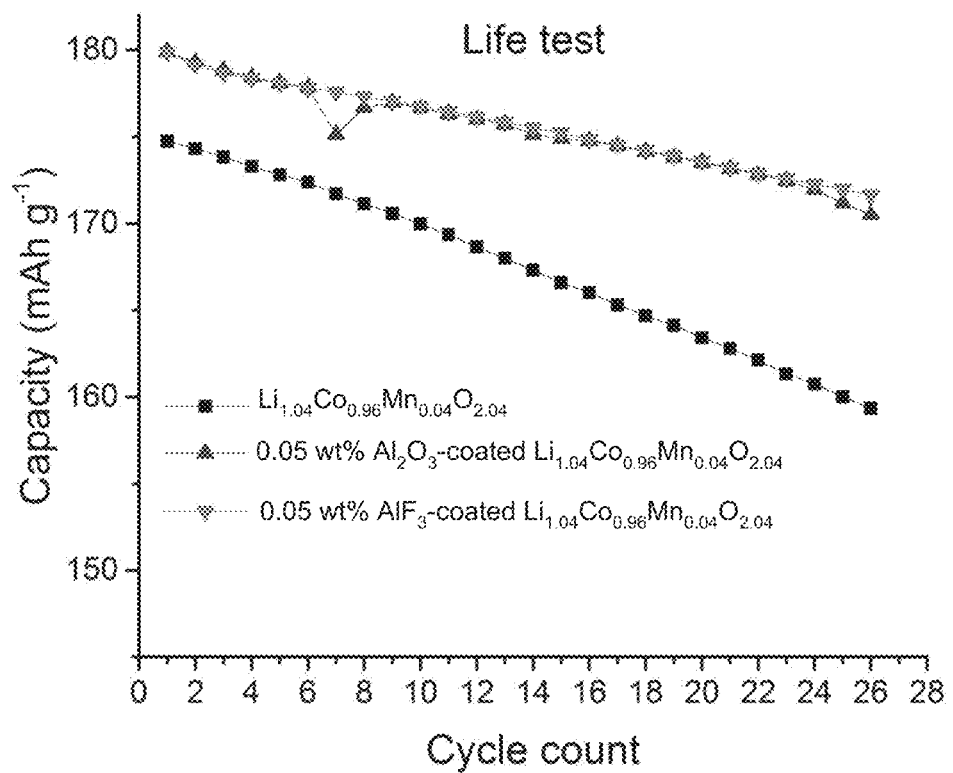
FIG. 6 is a plot of data representing a change in capacity, over extended cycling under life testing, of the four coin half-cells of FIG. 4, according to an illustrative embodiment.
Figure 7:
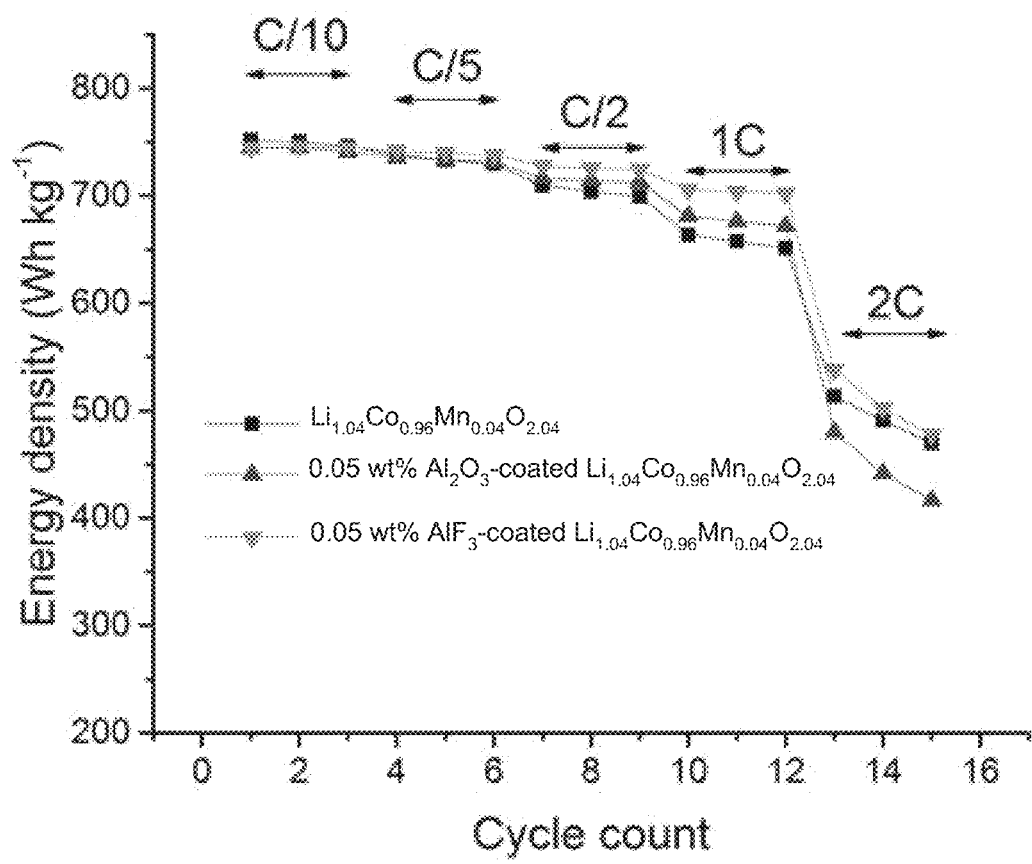
FIG. 7 is a plot of data representing a change in energy density, over extended cycling under rate testing, of the four coin half-cells of FIG. 4, according to an illustrative embodiment.
Figure 26:
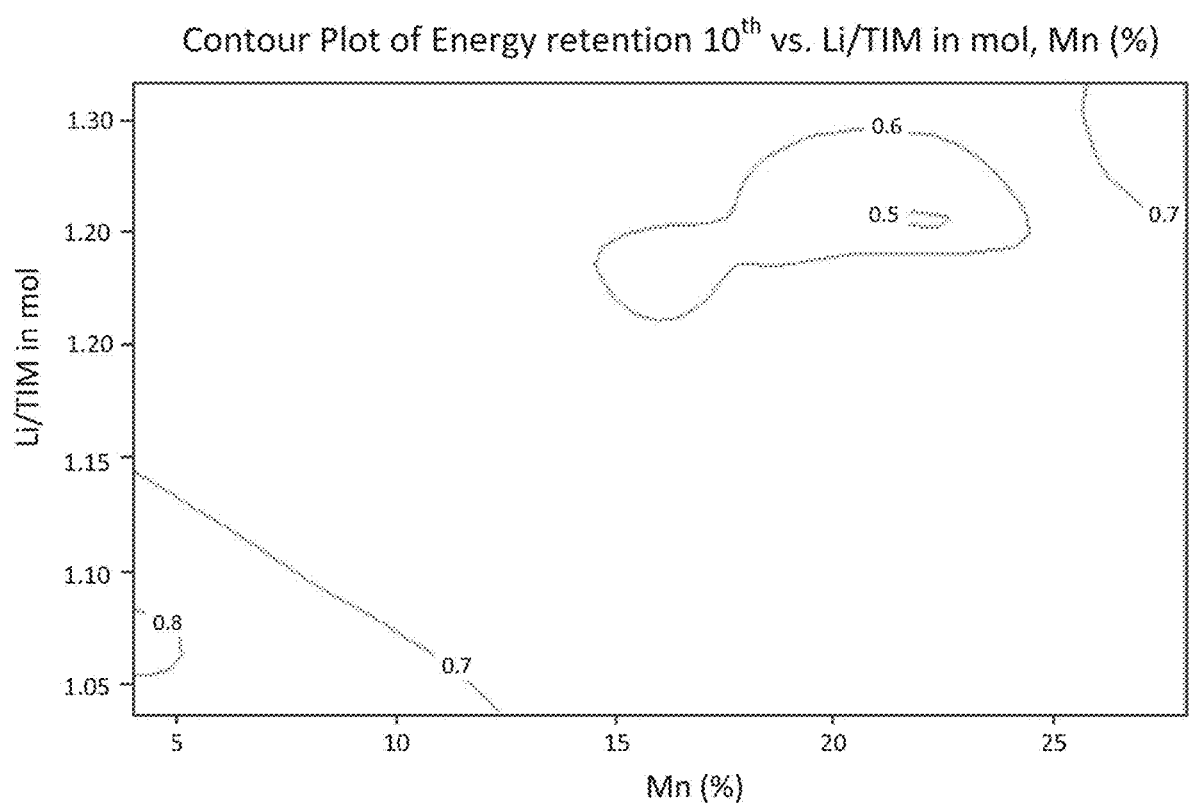
FIG. 26 is a contour plot of discharge energy density that vanes with Mn substitution, $Co_{1-x}Mn_x$, and lithium ratio, $[Li]/[Co_{1-x}Mn_x]$, according to an illustrative embodiment.

FIGS. 5 and 6 present a plot of data representing a change in capacity, over extended cycling, of the three coin half-cells of FIG. 4, according to an illustrative embodiment. FIGS. 7 and 26 present a plot of data representing a change in energy density, over extended cycling, of the three coin half-cells of FIG. 4, according to an illustrative embodiment. FIGS. 5 and 7 correspond to rate testing and FIGS. 6 and 8 correspond to life testing.

FIG. 5 shows that, up to a 1 C rate, the presence of coatings did not affect the performance of coin half-cells incorporating $Li_{1.04}Co_{0.96}Mn_{0.04}O_2$, $Al_2O_3$-coated $Li_{1.04}Co_{0.96}Mn_{0.04}O_2$, and $AlF_3$-coated $Li_{1.04}Co_{0.96}Mn_{0.04}O_2$. Their capacities are similar up to a 1 C rate (i.e., for C/10, C/5, C/2, and 1 C). The coin half-cell corresponding to $Al_2O_3$-coated $Li_{1.04}Co_{0.96}Mn_{0.04}O_2$ showed a reduced (relative) performance at a 2 C rate.

Coating benefits are more clearly highlighted in FIG. 6, which presents life testing. Coin half-cells corresponding to coated $Li_{1.04}Co_{0.96}Mn_{0.04}O_2$ variants show improved capacities relative to uncoated $Li_{1.04}Co_{0.96}Mn_{0.04}O_2$. the coin half-cells associated with coated $Li_{1.04}Co_{0.96}Mn_{0.04}O_2$ lose only 4-5 mAh/g.

The coin half-cell incorporating uncoated $Li_{1.04}Co_{0.96}Mn_{0.04}O_2$ started with lower capacity, i.e., relative to those incorporating coated $Li_{1.04}Co_{0.96}Mn_{0.04}O_2$, because this cell half-cell was already cycled 19 times after the aging and the rate tests. Such pre-aging resulted in quicker degradation than those not pre-aged (i.e., those utilizing coated $Li_{1.04}Co_{0.96}Mn_{0.04}O_2$). More than 15 mAh/g of capacity was lost over a 26 life cycle test.

Figure 8:
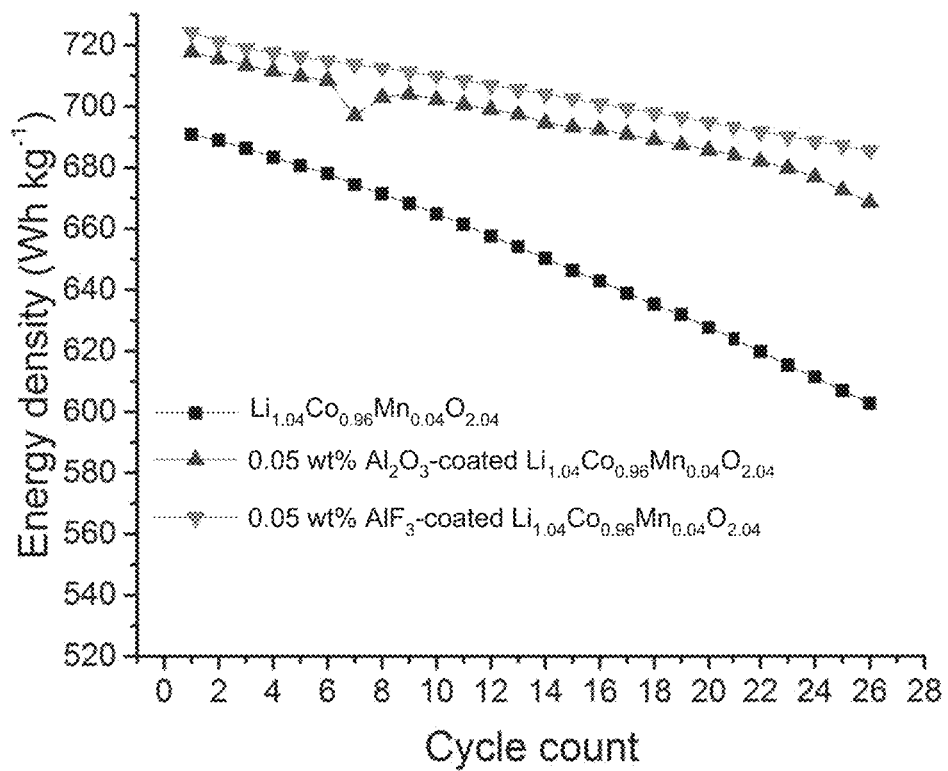
FIG. 8 is a plot of data representing a change in energy density, over extended cycling under life testing, of the four coin half-cells of FIG. 4, according to an illustrative embodiment.

A similar trend was observed in FIGS. 7 and 8 for energy density as described in relation to FIGS. 5 and 6. However, the coin half-cell associated with uncoated $Li_{1.04}Co_{0.96}Mn_{0.04}O_2$ starts at a lower energy density than those the two coated sample (FIGS. 7 and 8). The $AlF_3$-coated samples maintain a higher energy density than the $Al_2O_3$-coated sample.

Figure 9:
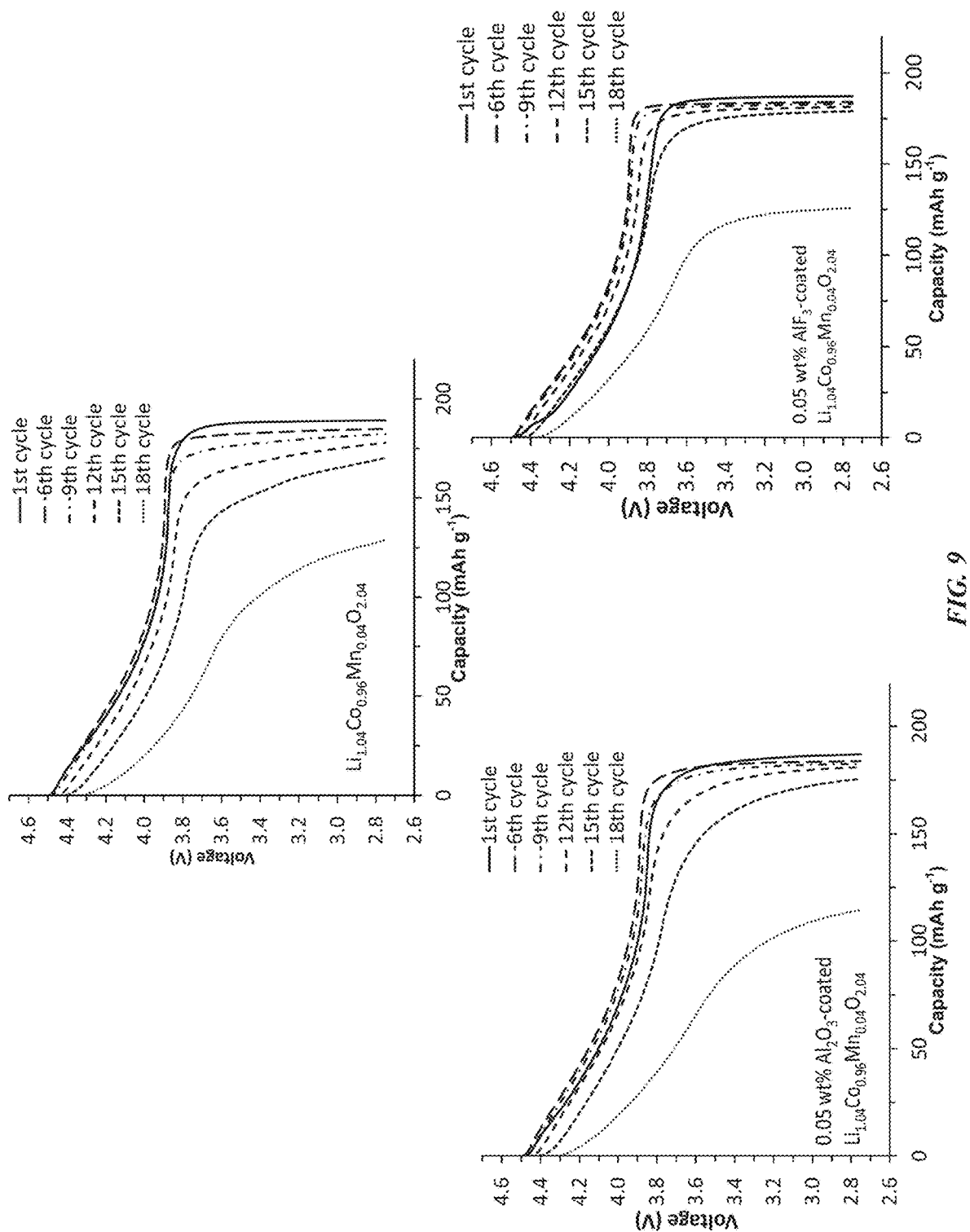
FIG. 9 is a plot of data corresponding to charge-discharge profiles for each the four coin half-cells of FIG. 4 under rate testing.
Figure 10:
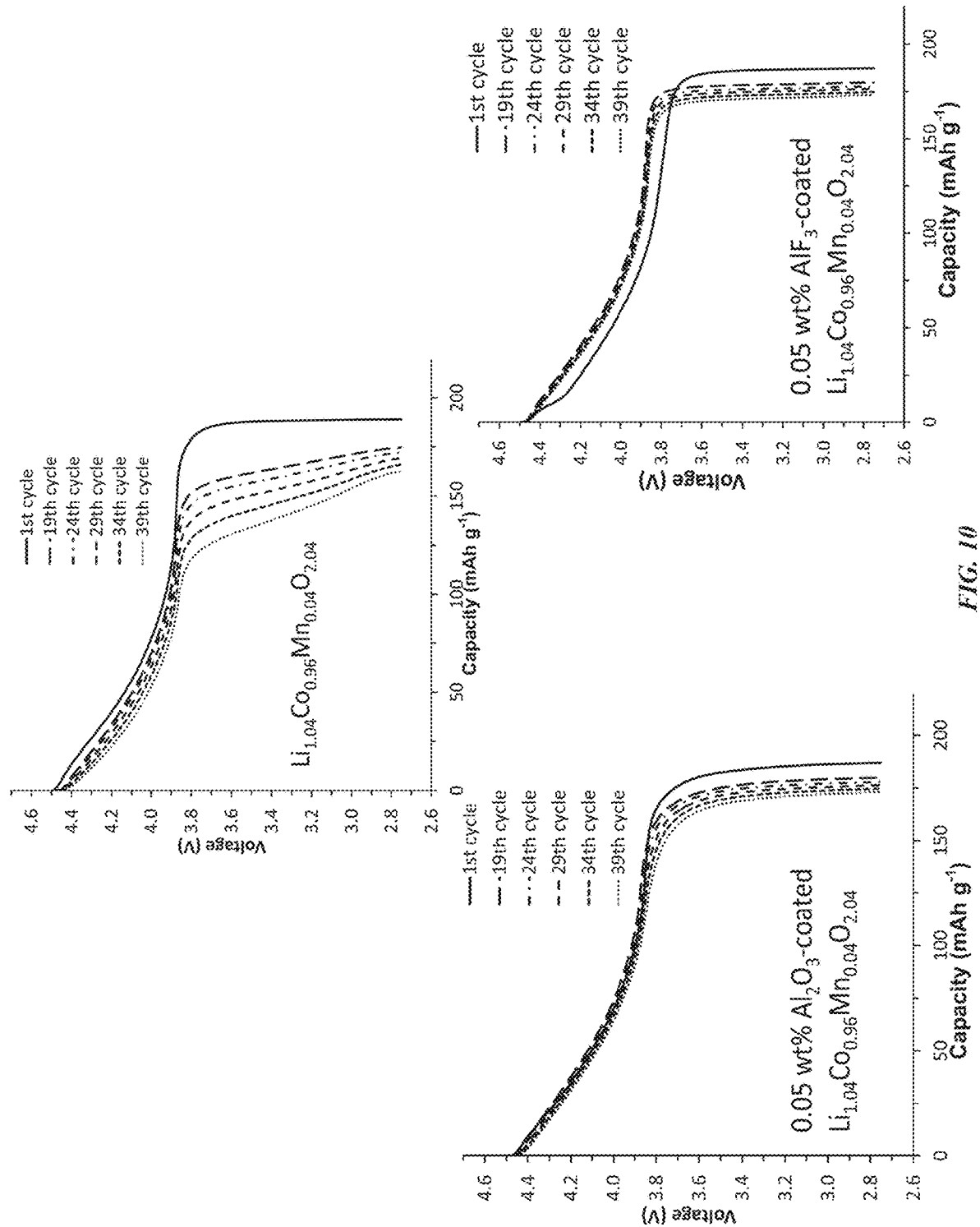
FIG. 10 is a plot of data corresponding to charge-discharge profiles for each the four coin half-cells of FIG. 4 under life testing.

FIGS. 9 and 10 present plots of data representing to charge-discharge profiles for each the three coin half-cells of FIG. 4. FIG. 9 presents rate testing and FIG. 10 presents life testing. These profiles demonstrate an advantage of the coatings disclosed herein. The shape of curves was more preserved for coin half-cells incorporating $Al_2O_3$— and $AlF_3$-coated $Li_{1.04}Co_{0.96}Mn_{0.04}O_2$ than those base powder $Li_{1.04}Co_{0.96}Mn_{0.04}O_2$. Indeed, the variant corresponding to uncoated $Li_{1.04}Co_{0.96}Mn_{0.04}O_2$ shows the fastest decay in capacity with increasing cycle number.

Figure 11:
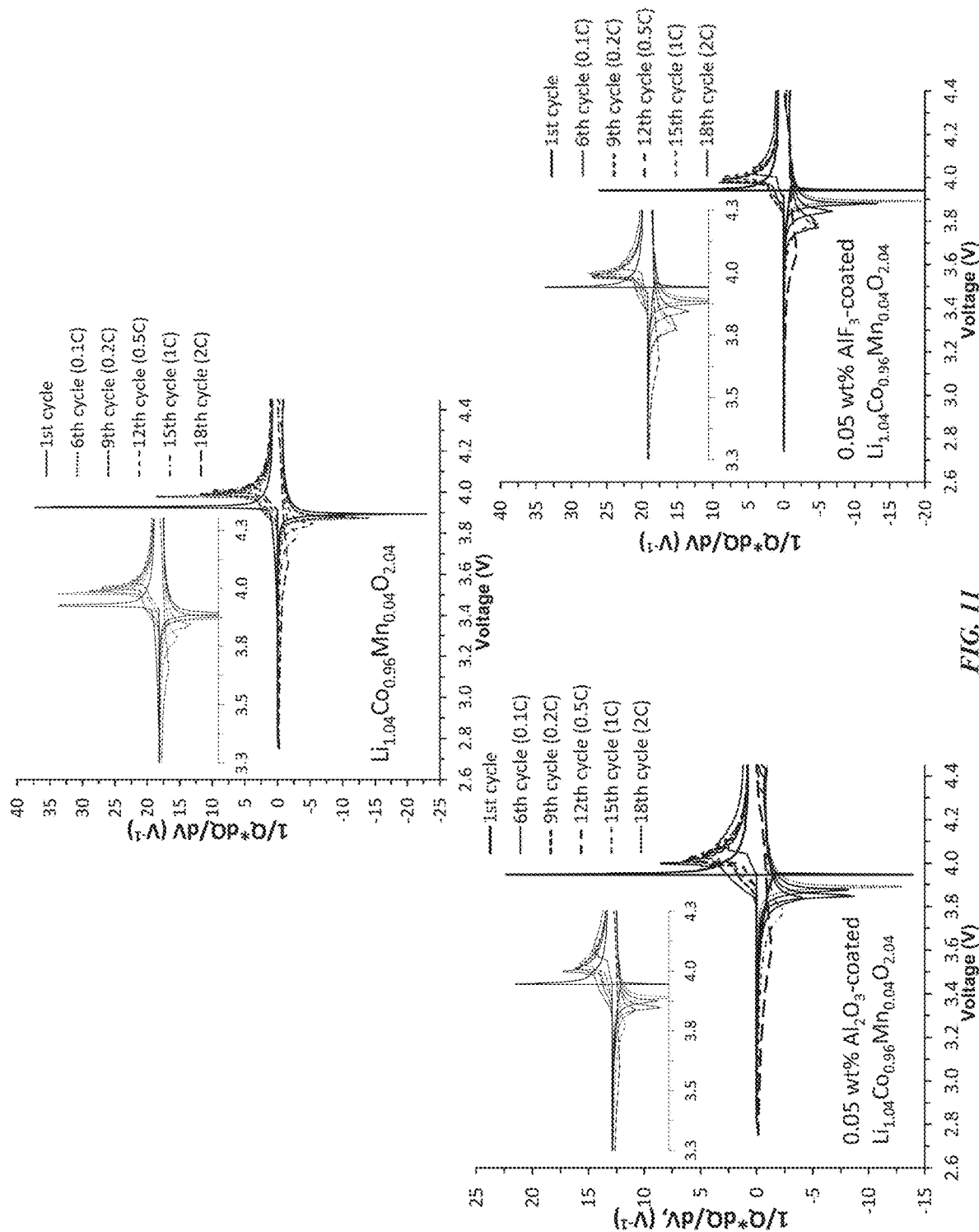
FIG. 11 is a plot of data representing dQ/dV profiles for each the four coin half-cells of FIG. 4 under rate testing.
Figure 12:
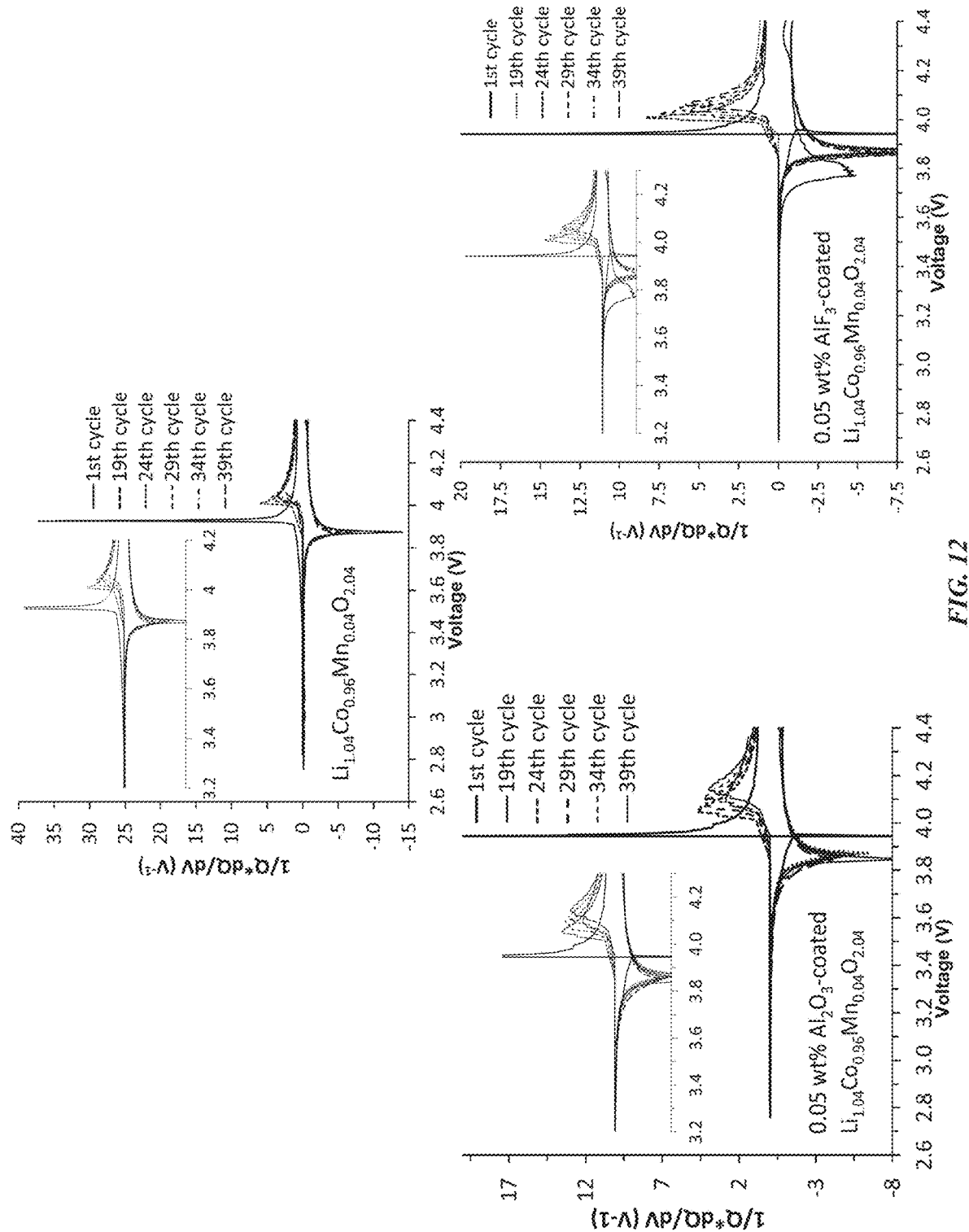
FIG. 12 is a plot of data representing dQ/dV profiles for each the four coin half-cells of FIG. 4 under life testing.

FIGS. 11 and 12 present plots of data representing dQ/dV profiles for each the three coin half-cells of FIG. 4. FIG. 11 presents rate testing and FIG. 12 presents life testing. Curves in each profile were plotted every 5 cycles for both rate and life tests. A reduction peak at approximately 3.85V characterizes a structural stability of the cathode active material in each coin half-cell during progressive cycling.

A degradation of the cathode active material (i.e., structural instability) is reflected by shifting and broadening of the reduction peak toward lower voltages. During rate testing, the coin half-cell corresponding to base powder $Li_{1.04}Co_{0.96}Mn_{0.04}O_2$ showed the highest degradation with a relatively fast shift away from 3.85V and a large peak broadening. In contrast, the coin half-cells corresponding to its coated variants showed slower shifts and weaker broadening. Peak shifting and broadening are less evident during rate testing than life testing. This behavior results from lower amounts of lithium ions being cycled back and forth as a charge/discharge rate progressively increases. During the life test, the coin half-cell incorporating baseline $LiCoO_2$ showed further degradation while those incorporating $Li_{1.04}Co_{0.96}Mn_{0.04}O_2$ and its coated variants showed almost no degradation.

Example 15—Cathode Active Materials by Co-Precipitation Methods

A 3.5-liter stirred tank reactor was filled with distilled water and heated to 60° C. A flow of nitrogen gas was introduced into the tank reactor while stirring the distilled water at a rate of 1100 rpm. Separately, manganese and cobalt sulfate were dissolved in distilled water to produce a first aqueous solution having a total concentration of 2.0M and a predetermined molar ratio (i.e., [Mn]:[Co]). The ratio included representative examples, such as [Mn]:[Co]=0.00:1.00, 0.04:0.96, 0.07:0.93, 0.10:0.90, 0.16:0.84, and 0.28:0.72. The first aqueous solution was continuously dripped into distilled water of the tank reactor at a flow rate of 100 ml/h to produce a combined aqueous solution. The pH of the combined aqueous solution was fixed at 11.5 by adding a second aqueous solution of sodium hydroxide and ammonia using a pH controller coupled to a pump. Over a 300 hour run-time, particles nucleated and grew in the combined aqueous solution, thereby forming final precursor particles. The final precursor particles were washed, filtered, and dried at 175° C. for 12 h.

The final precursor particles were used to form cathode active materials of composition $LiMn_xCo_{1-x}O_2$ where x and 1−x correspond to the predetermined molar ratio, i.e., [Mn]:[Co]=[x]:[1−x]. A solid-state reaction was carried out with $Li_2CO_3$ powder and powders of the final precursor particles. The molar ratio of $Li_2CO_3$ and the final precursor particles with was varied to yield cathode active materials having variations in ratios of [Li]:[$Mn_xCo_{1-x}$] (i.e., ratios of lithium to total transition-metal content). The $Li_2CO_3$ powder and powders of the final precursor particles were blended in an orbital mixer to produce a mixed powder. Following blending, the mixed powder was transferred to an alumina tray and heated in flowing air at 700° C. for 10 hours. The ramp rate of the furnace was 5° C. per minute. After heating at 700° C., the mixed powder, now reacted, was allowed to cool in the furnace to ambient temperature via natural heat losses. The resulting intermediate powder was ground by mortar and pestle, sieved, and re-fired at 1050° C. in flowing air for 15 hours. The ramp rate was 5° C. per minute, and after firing, the resulting sintered powder was allowed to cool in the furnace to ambient temperature via natural heat losses. The sintered powder was broken up, ground by mortar and pestle, and sieved to produce a cathode active material. Samples of the cathode active materials were characterized by powder X-ray diffraction using a Bruker D8 (see FIGS. 20 and 21).

Representative examples of cathode active materials prepared by the above-described co-precipitation method include $Li_{0.987}Co_{0.96}Mn_{0.04}O_2$, $Li_{1.050}Co_{0.96}Mn_{0.04}O_2$, $Li_{1.074}Co_{0.96}Mn_{0.04}O_2$, $Li_{1.081}Co_{0.96}Mn_{0.04}O_2$, $Li_{1.089}Co_{0.96}Mn_{0.04}O_2$, $Li_{0.981}Co_{0.93}Mn_{0.07}O_2$, $Li_{1.050}Co_{0.93}Mn_{0.07}O_2$, $Li_{0.984}Co_{0.90}Mn_{0.10}O_2$, $Li_{1.065}Co_{0.90}Mn_{0.10}O_2$, $Li_{1.100}Co_{0.90}Mn_{0.10}O_2$, $Li_{1.110}Co_{0.90}Mn_{0.10}O_2$, $Li_{1.158}Co_{0.90}Mn_{0.10}O_2$, $Li_{0.975}Co_{0.84}Mn_{0.16}O_2$, $Li_{1.050}Co_{0.84}Mn_{0.16}O_2$, $Li_{1.114}Co_{0.84}Mn_{0.16}O_2$, $Li_{0.994}Co_{0.78}Mn_{0.22}O_2$, $Li_{1.000}Co_{0.78}Mn_{0.22}O_2$, $Li_{1.197}Co_{0.78}Mn_{0.22}O_2$, $Li_{0.973}Co_{0.72}Mn_{0.28}O_2$, $Li_{1.087}Co_{0.72}Mn_{0.28}O_2$, $Li_{1.190}Co_{0.72}Mn_{0.28}O_2$, and $Li_{1.247}Co_{0.72}Mn_{0.28}O_2$.

Figure 19:
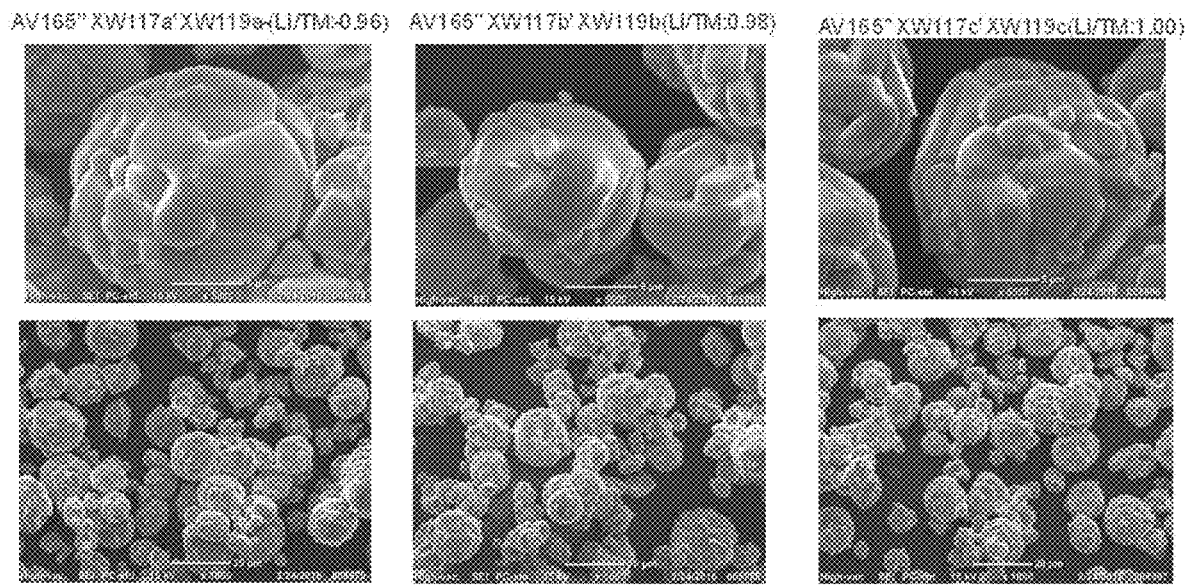
FIG. 19 is a series of scanning electron micrographs of cathode active materials comprising $Li_\alpha Co_{1-x}Mn_xO_\delta$ and prepared according to a co-precipitation method, according to an illustrative embodiment.

FIG. 19 presents scanning electron micrographs of cathode active materials prepared according to the co-precipitation method described above. The micrographs indicate secondary particles formed of densely-sintered primary particles. Such densely-sintered secondary particles are typical for cathode active materials prepared by the co-precipitation method. The compositions of the cathode active materials correspond to $Li_{0.96}Co_{0.93}Mn_{0.07}O_2$, $Li_{0.98}Co_{0.93}Mn_{0.07}O_2$, and $Li_{1.00}Co_{0.93}Mn_{0.07}O_2$.

Figure 20:
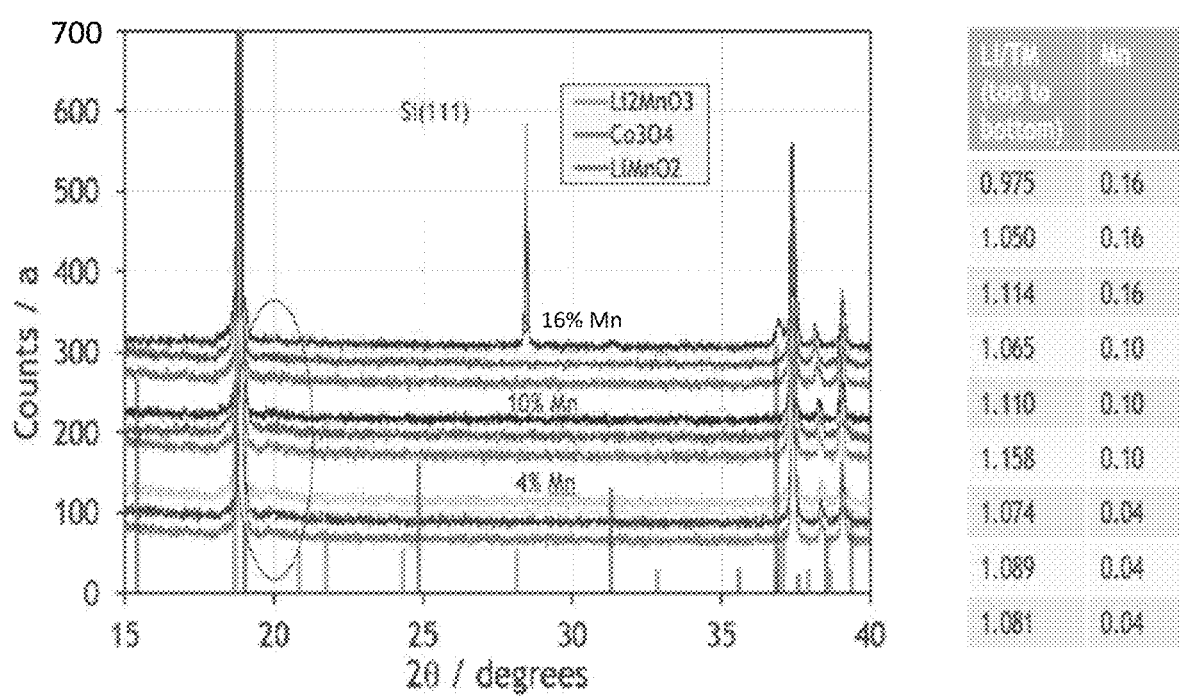
FIG. 20 is a plot of x-ray diffraction patterns of cathode active materials prepared according to a co-precipitation method and comprising $Li_\alpha Co_{0.96}Mn_{0.04}O_\delta$, $Li_\alpha Co_{0.90}Mn_{0.10}O_\delta$, and $Li_\alpha Co_{0.84}Mn_{0.16}O_\delta$ with varying values of $\alpha$, according to an illustrative embodiment.

FIG. 20 presents X-ray powder diffraction patterns for cathode active materials represented by compositions of $Li_{1.074}Co_{0.96}Mn_{0.04}O_2$, $Li_{1.081}Co_{0.96}Mn_{0.04}O_2$, $Li_{1.089}Co_{0.96}Mn_{0.04}O_2$, $Li_{1.065}Co_{0.90}Mn_{0.10}O_2$, $Li_{1.110}Co_{0.90}Mn_{0.10}O_2$, $Li_{1.158}Co_{0.90}Mn_{0.10}O_2$, $Li_{0.975}Co_{0.84}Mn_{0.16}O_2$, $Li_{1.050}Co_{0.84}Mn_{0.16}O_2$, and $Li_{1.114}Co_{0.84}Mn_{0.16}O_2$. These cathode active materials were prepared according to the co-precipitation method described above. In FIG. 20, groups of diffraction patterns are arranged from bottom to top that correspond, respectively, to increasing manganese content, i.e., from 0.04 to 0.10 to 0.16. Within each group, however, the lithium to transition-metal ratio (i.e., [Li]/[$Mn_xCo_{1-x}$]) decreases in three increments from bottom to top. Reference bars indicating the peaks expected for $Li_2MnO_3 Co_3O_4$, and $LiMnO_2$, are shown in pink, grey, and blue colors, respectively.

The cathode active materials in FIG. 20 are mostly single phase. The absence of peaks in the vicinity of 2θ=20° indicates the absence of $Li_2MnO_3$ in the cathode active materials. Moreover, despite increasing substitution of Mn for Co, the crystal structure of each cathode active material, as represented by space group, remains at $R\bar{3}m$. However, for low values of [Li]/[$Mn_xCo_{1-x}$], i.e., $Li_{0.975}Co_{0.84}Mn_{0.16}O_2$, metal-oxide phases of $M_3O_4$ stoichiometry emerge (e.g., $CO_3O_4$.).

Figure 21:
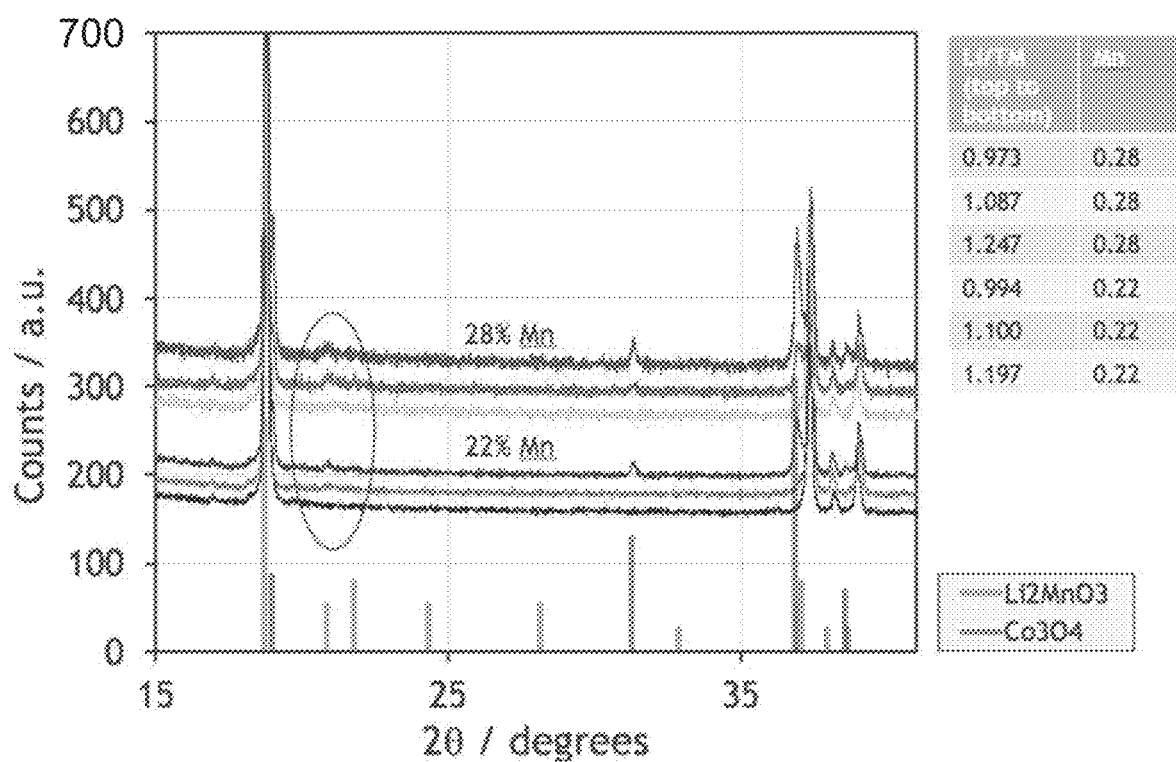
FIG. 21 is a plot of x-ray diffraction patterns of cathode active materials prepared according to a co-precipitation method and comprising $Li_\alpha Co_{0.78}Mn_{0.22}O_\delta$ and $Li_\alpha Co_{0.72}Mn_{0.28}O_\delta$ with varying values of $\alpha$, according to an illustrative embodiment.

FIG. 21 presents X-ray powder diffraction patterns for cathode active materials represented by compositions of $Li_{0.994}Co_{0.78}Mn_{0.22}O_2$, $Li_{1.100}Co_{0.78}Mn_{0.22}O_2$, $Li_{1.197}Co_{0.78}Mn_{0.22}O_2$, $Li_{0.973}CO_{0.72}Mn_{0.28}O_2$, $Li_{1.087}Co_{0.72}Mn_{0.28}O_2$, $Li_{1.19}Co_{0.72}Mn_{0.28}O_2$, and $Li_{1.247}Co_{0.72}Mn_{0.28}O_2$. These cathode active materials were prepared according to the co-precipitation method described above. In FIG. 3, groups of diffraction patterns are arranged from bottom to top that correspond, respectively, to increasing manganese content, i.e., 0.22 and 0.26. Within each group, however, the lithium to transition-metal ratio (i.e., [Li]/[$Mn_xCo_{1-x}$]) decreases in three increments from bottom to top. Reference bars indicating the peaks expected for $Li_2MnO_3$ and $Co_3O_4$ are shown.

In FIG. 21, the substitution of Mn for Co is higher in than that in FIG. 20. However, the crystal structure of each cathode active material, as represented by space group, is $R\bar{3}m$. Diffraction patterns for $Li_{0.994}Co_{0.78}Mn_{0.22}O_2$, $Li_{1.10}Co_{0.78}Mn_{0.22}O_2$, $Li_{0.973}Co_{0.72}Mn_{0.28}O_2$, and $Li_{1.087}Co_{0.72}Mn_{0.28}O_2$ show peaks in the vicinity of 2θ=20°. Such peaks indicate the presence of small proportions of $Li_2MnO_3$ in these cathode active materials. However, the peaks are not present in cathode active materials represented by compositions with values of [Li]/F[$Mn_xCo_{1-x}$] approaching 1+x, i.e., $Li_{1.197}Co_{0.78} Mn_{0.22}O_2$ and $Li_{1.247}Co_{0.72} Mn_{0.28}O_2$. These latter cathode active materials are single phase. The metric 1+x corresponds to an ideal solid-solution stoichiometry for $xLi_2MnO_3 \cdot (1-x)LiCoO_2$ (i.e., $Li_{1+x}Co_{1-x}Mn_xO_{2+x}$).

Example 16—Cathode Active Materials by Sol-Gel Methods

A first aqueous solution of manganese acetate and cobalt acetate was prepared at a predetermined molar ratio (i.e., [Mn]:[Co]) and a total of 2 mol. As described below, the predetermined ratio included representative examples such as [M]:[Co]=0.10:0.90, 0.16:0.84, 0.22:0.78, and 0.28:0.72. A second aqueous solution of 1.0 M citric acid was added to the first aqueous solution and mixed via magnetic stirring to produce a combined solution. The combined solution was heated to 80° C. to form a gel, which was subsequently kept at 80° C. for 6 hours. The gel was then transferred into a box furnace and calcined at 350° C. for 4 hours. After cooling, the resulting cake was ground by mortar and pestle, sieved, and re-fired at 900° C. in flowing air for 12 hours. The ramp rate was 5° C. per minute, and after firing, the resulting cathode active material was allowed to cool in the furnace to ambient temperature via natural heat losses. Samples of the cathode active materials were characterized by powder X-ray diffraction using a Bruker D8 (see FIG. 23).

Representative examples of cathode active materials produced by the above-described sol-gel method include $Li_{1.131}Co_{0.90}Mn_{0.10}O_2$, $Li_{1.198}CO_{0.84}Mn_{0.16}O_2$, $Li_{1.241}Co_{0.78}Mn_{0.22}O_2$, and $Li_{1.301}CO_{0.72}Mn_{0.28}O_2$.

Figure 22:
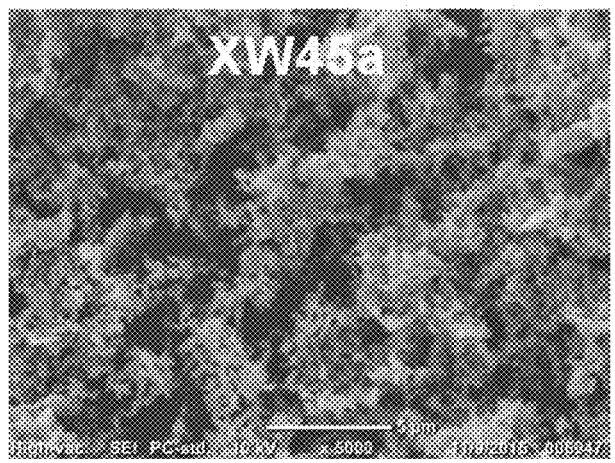
FIG. 22 is a series of scanning electron micrographs of cathode active materials comprising $Li_\alpha Co_{1-x}Mn_xO_\delta$ and prepared according to a sol-gel method, according to an illustrative embodiment.
Figure 22:
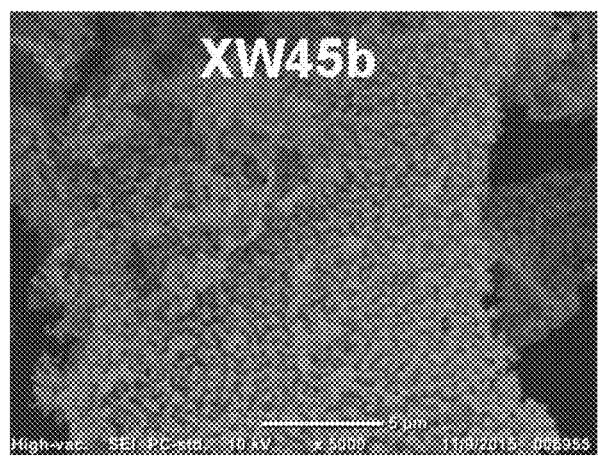

FIG. 22 presents scanning electron micrographs of cathode active materials prepared according to the sol-gel method described above. The micrographs indicate sheet-like agglomerations of fine particles having dimensions less than 1 μm. Such fine particle morphology is typical for cathode active materials prepared by the sol-gel method. The compositions of the cathode active materials correspond to $Li_{1.1}Co_{0.1}Al_{0.01}Mg_{0.01}Mn0_{.89}O_2$ and is $Li_{1.28}Co_{0.258}Al_{0.02}Mg_{0.02}Co_{0.68}O_2$.

Figure 23:
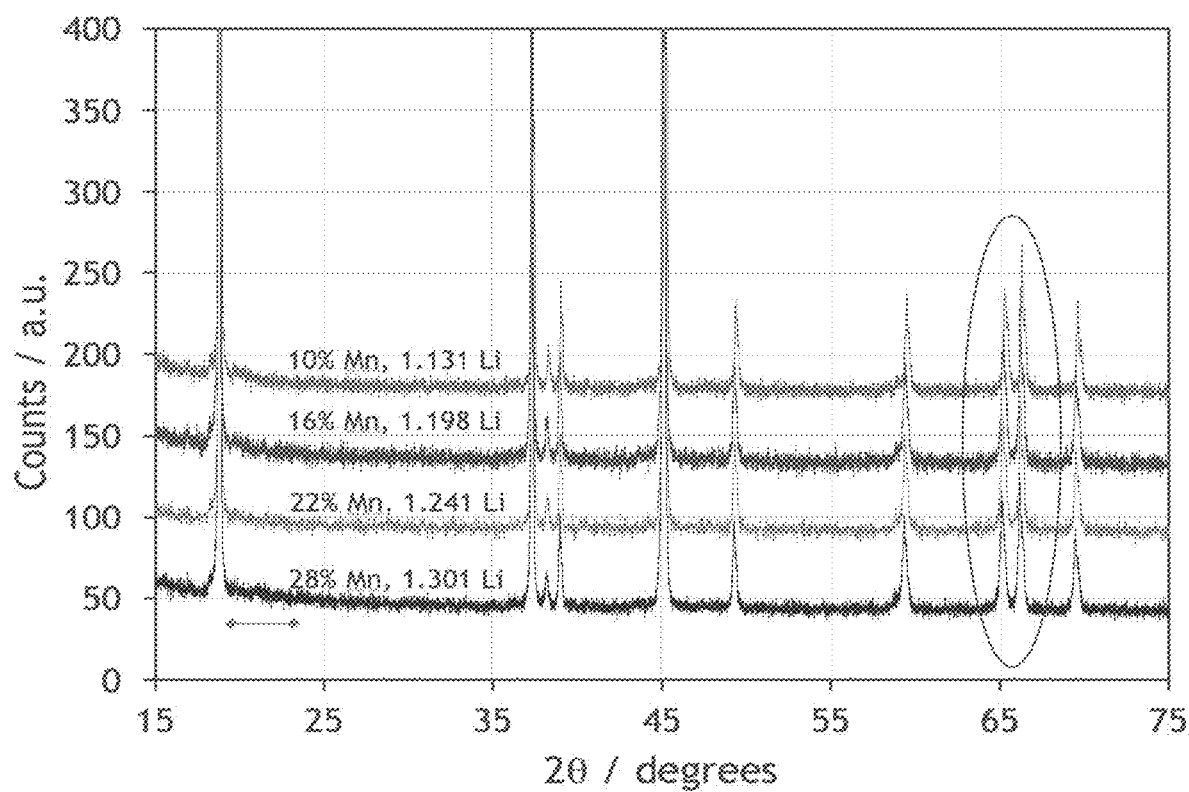
FIG. 23 is a plot of x-ray diffraction patterns of cathode active materials prepared according to a sol-gel method and comprising $Li_{1.131}Co_{0.90}Mn_{0.10}O_2$, $Li_{1.198}Co_{0.84}Mn_{0.16}O_2$, $Li_{1.241}Co_{0.78}Mn_{0.22}O_2$, and $Li_{1.301}Co_{0.72}Mn_{0.28}O_2$, according to an illustrative embodiment.

FIG. 23 presents X-ray powder diffraction patterns for cathode active materials represented by compositions of $Li_{1.131}Co_{0.90}Mn_{0.10}O_2$, $Li_{1.198}Co_{0.84}Mn_{0.16}O_2$, $Li_{1.241}Co_{0.78}Mn_{0.22}O_2$, and $Li_{1.301}CO_{0.72}Mn_{0.28}O_2$. These cathode active materials were prepared according to the sol-gel method described above. The cathode active materials are single-phase. The crystal structure of each cathode active material, as represented by space group, is R$\bar{3}$m. The absence of peaks in the vicinity of 2θ=20° indicates the absence of $Li_2MnO_3$ in these cathode active materials. Moreover, peak splitting in the vicinity of 2θ=65° indicates a well-crystallized layered structure.

Example 17—Battery Performance

Figure 24:
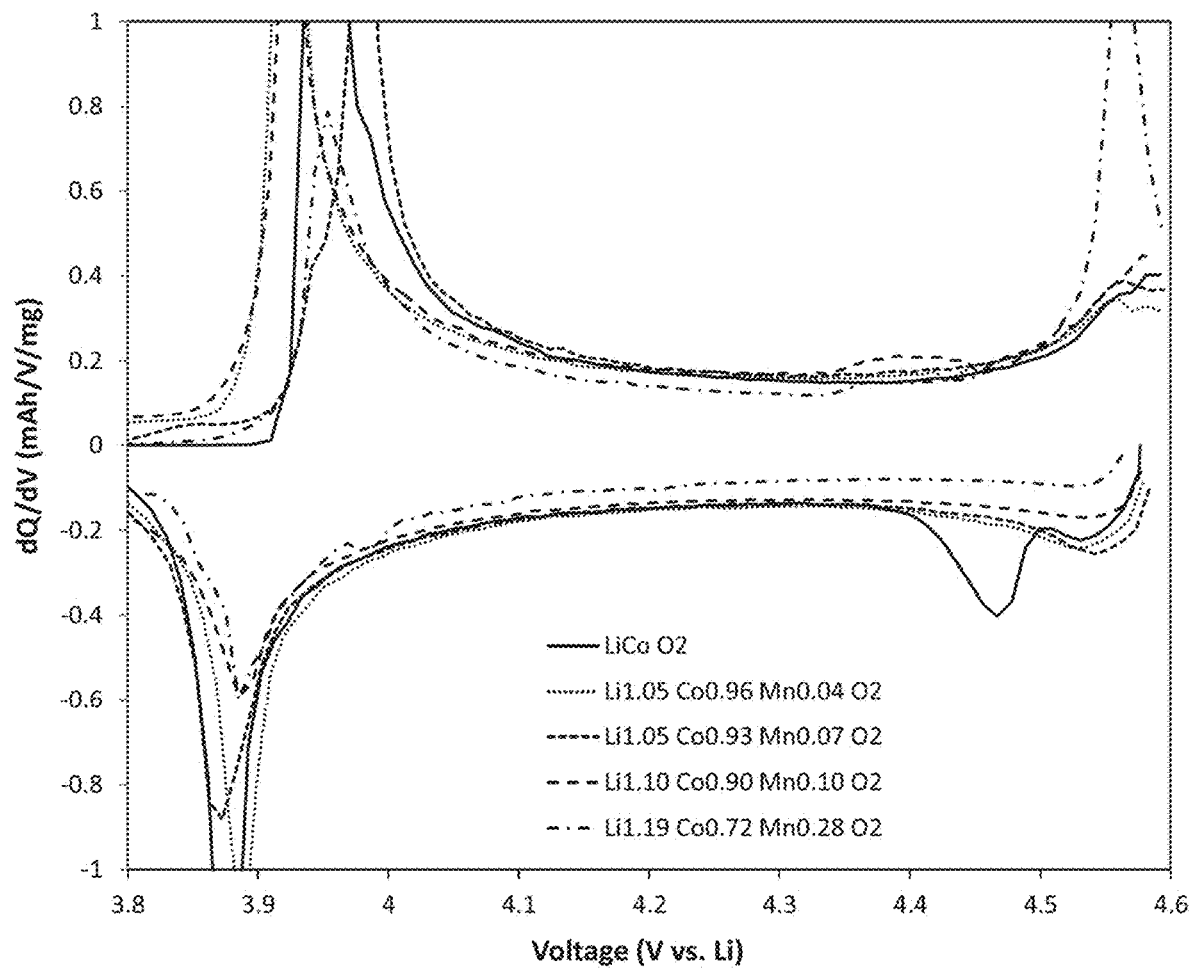
FIG. 24 is a plot of differential capacity curves for cathode active materials comprising $LiCoO_2$, $Li_{1.05}Co_{0.96}Mn_{0.04}O_2$, $Li_{1.05}Co_{0.93}Mn_{0.07}O_2$, $Li_{1.110}Co_{0.09}Mn_{0.10}O_2$, and $Li_{1.19}Co_{0.72}Mn_{0.28}O_2$, according to an illustrative embodiment.

FIG. 24 presents differential capacity curves for cathode active materials represented by compositions of $LiCoO_2$, $Li_{1.05}Co_{0.96}Mn_{0.04}O_2$, $Li_{1.05}CO_{0.93}Mn_{0.07}O_2$, $Li_{1.110}Co_{0.90}Mn_{0.10}O_2$, and $Li_{1.19}Co_{0.72}Mn_{0.28}O_2$. These cathode active materials were prepared according to the co-precipitation method described above. Measurements of differential capacity were taken of 2032 coin half-cells during a first-cycle charge and discharge at a rate of C/5. In FIG. 24, the ordinate indicates magnitudes of dQ/dV and the abscissa indicates magnitudes of electrochemical potential, or voltage. An irreversible phase transition peak occurs for $LiCoO_2$ at a potential of about 4.45 V. However, after substituting Co with Mn, the phase transition shifted to a potential of about 4.55V with reduced peak intensity. Such behavior indicates that substitutions for Co (e.g., Mn substituting for Co) can produce cathode active materials of high voltage stability.

Figure 25:
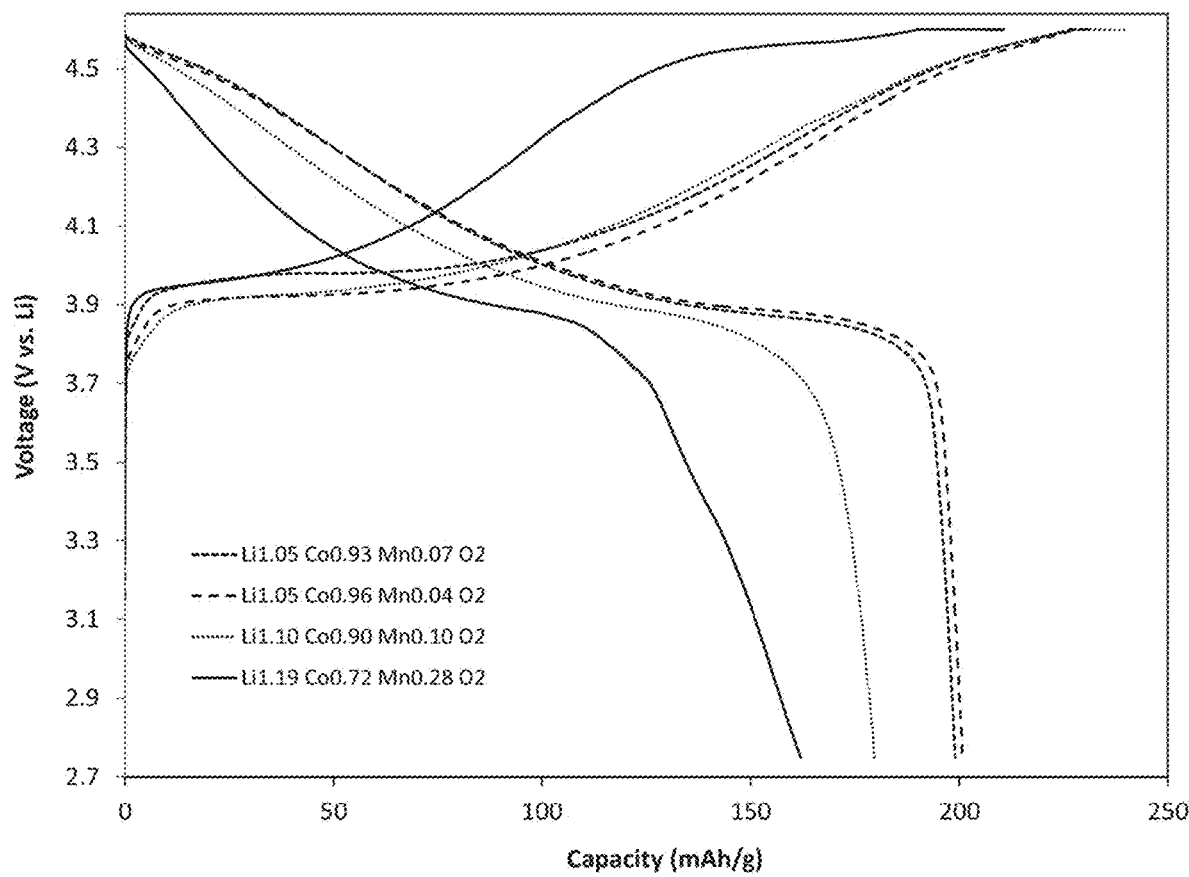
FIG. 25 is a plot of voltage profile curves for cathode active materials comprising $Li_{1.05}CO_{0.96}Mn_{0.04}O_2$, $Li_{1.05}Co_{0.93}Mn_{0.07}O_2$, $Li_{1.110}Co_{0.90}Mn_{0.10}O_2$, and $Li_{1.19}Co_{0.72}Mn_{0.28}O_2$, according to an illustrative embodiment.

FIG. 25 presents voltage profile curves for cathode active materials represented by compositions of $Li_{1.05}Co_{0.96}Mn_{0.04}O_2$, $Li_{1.05}CO_{0.93}Mn_{0.07}O_2$, $Li_{1.110}Co_{0.90}Mn_{0.10}O_2$, and $Li_{1.19}Co_{0.72}Mn_{0.28}O_2$. These cathode active materials were prepared according to the co-precipitation method described above and then packaged into 2032 coin half-cells. The voltage profile corresponds to a first charge-discharge cycle at a C/10 charge-discharge rate in the voltage window of 2.75-4.6V. In FIG. 25, the ordinate indicates magnitudes of electrochemical potential (i.e., V) for the coin half cells, and the abscissa indicates magnitudes of storage capacity (i.e., mAh/g). For all compositions, high specific capacities (i.e., >150 mAh/g) and high average voltages (i.e., >3.7V) are achieved. For cathode active materials of $Li_{1.19}Co_{0.72}Mn_{0.28}O_2$, a plateau at approximately 4.5V in the first charging curve indicates an activation process for a $Li_2MnO_3$-like phase present in the material.

Example 18—Tuning of Battery Performance

It will be appreciated that factors such as substitution for Co (e.g., $Co_{1-x-y}M_yMn_x$) and ratios of lithium to Co and its substitutes (i.e., [Li]/[$Co_{1-x-y}M_yMn_x$]) influence the phases present in cathode active materials. As evidenced by FIGS. 20-21 and 23, such factors may be selected to produce cathode active materials of single phase (e.g., R$\bar{3}$m crystal structure). Moreover, as evidenced by FIGS. 24 and 25, such factors may also be selected to improve battery performance (e.g., increase voltage stability).

FIG. 26 presents a contour plot of discharge energy density that varies with substitution (i.e., $Co_{1-x}Mn_x$) and lithium ratio (i.e., [Li]/[$Co_{1-x}Mn_x$]). The discharge energy density corresponds to measurements from 2032 coin half-cells during at first cycle and taken at a charge-discharge rate of C/10. The contour plot was generated from a combination of sample measurements and predictive modeling. The 2032 coin half-cells used cathode active materials prepared according to the sol-gel method described above, where 0≤x≤0.28. In FIG. 26, two regions are present that indicate high energy density (i.e., >700 Wh/kg): [1] a first region for Mn content up to about 12% (i.e., x≤0.12.) and a ratio up to about 1.15 (i.e., [Li]/[$Co_{1-x}Mn_x$]≤1.15), and [2] a second region for Mn content higher than about 25% (i.e., x>0.25) and a ratio higher than about 1.25 (i.e., [Li]/[$Co_{1-x}Mn_x$]>1.25).

Figure 27:
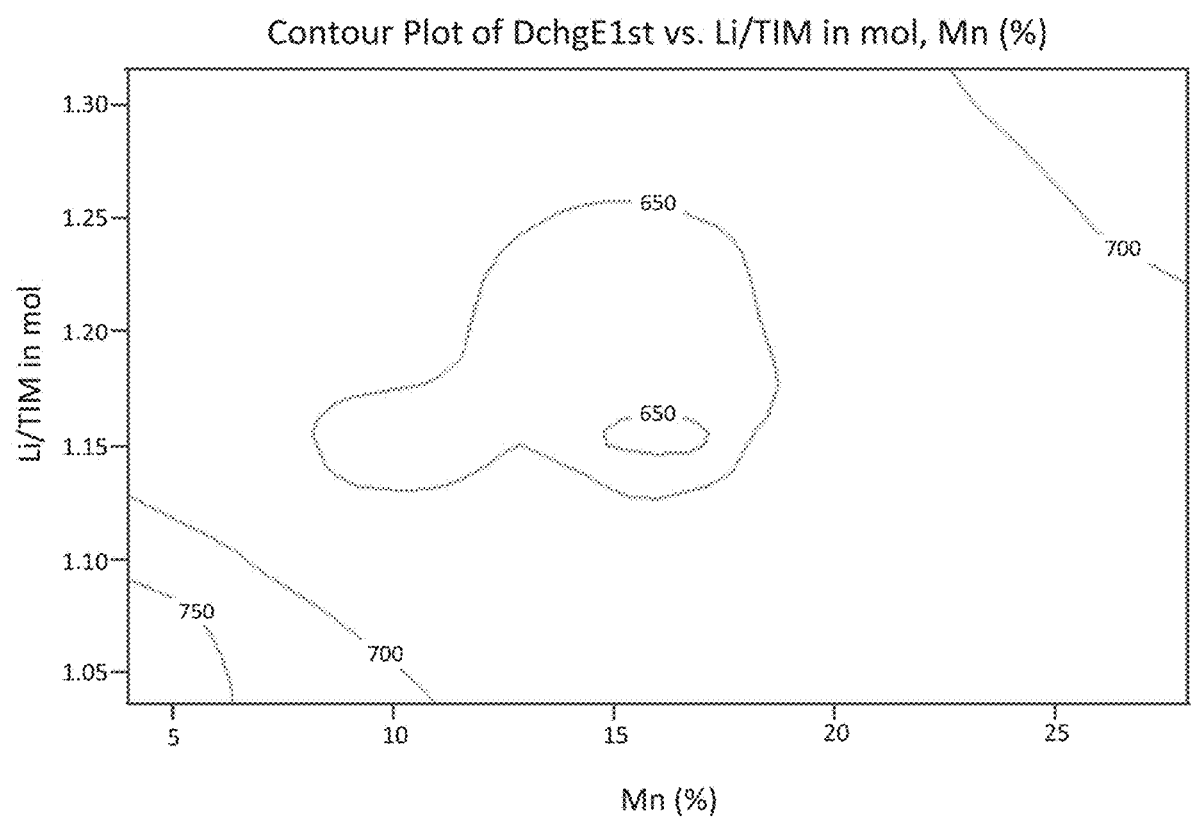
FIG. 27 a contour plot of energy retention that varies with Mn substitution, $Co_{1-x}Mn_x$, and lithium ratio, $[Li]/[Co_{1-x}Mn_x]$ according to an illustrative embodiment.

FIG. 27 presents a contour plot of energy retention that varies with substitution (i.e., $Co_{1-x}Mn_x$) and lithium ratio (i.e., [Li]/[$Co_{1-x}Mn_x$]). The energy retention corresponds to measurements from 2032 coin half-cells after 10 cycles and taken at a charge-discharge rate of C/3. The contour plot was generated from a combination of sample measurements and predictive modeling. The 2032 coin half-cells used cathode active materials prepared according to the sol-gel method described above, where 0≤x≤0.28. Similar to FIG. 26, two regions are present in FIG. 27 that indicate high energy density (i.e., >700): [1] a first region for Mn content up to about 12% (i.e., x≤0.12) and a ratio up to about 1.15 (i.e., [Li]/[$Co_{1-x}Mn_x$]≤1.15), and [2] a second region for Mn content higher than about 25% (i.e., x>0.25) and a ratio higher than about 1.25 (i.e., [Li]/[$Co_{1-x}Mn_x$]>1.25).

Example 19

Figure 28:
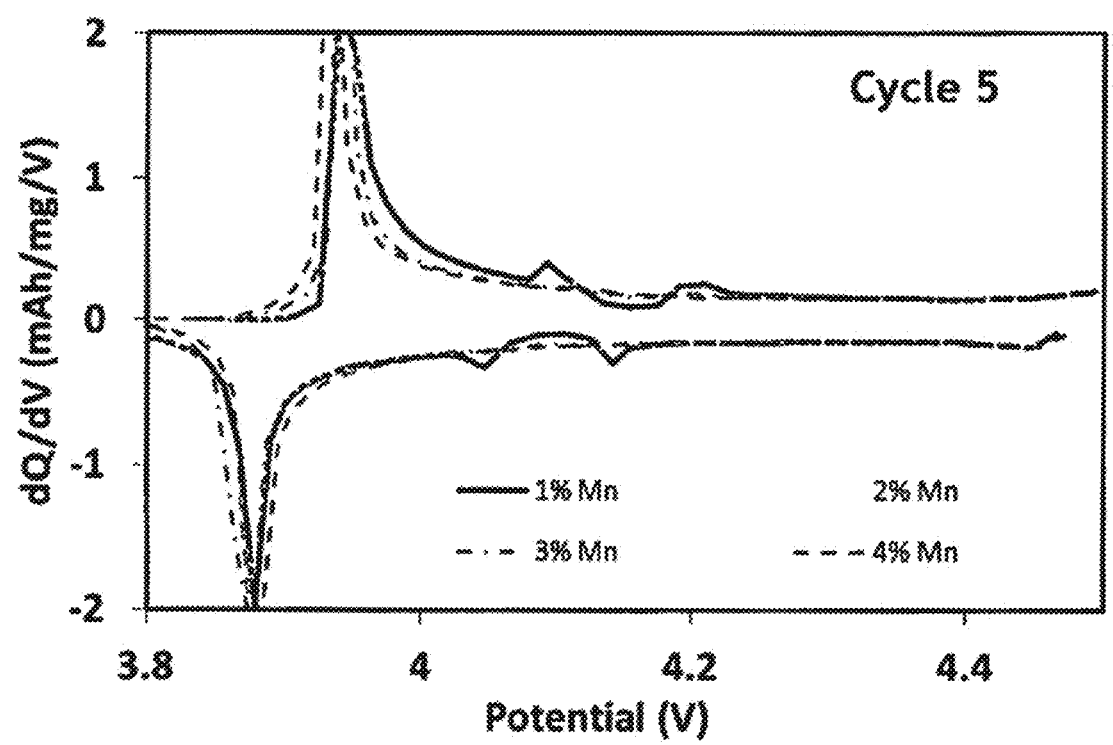
FIG. 28 is a plot of differential capacity curves for cathode active materials comprising $Li_\alpha Co_{0.99-y}Al_yMn_{0.01}O_\delta$, $Li_\alpha Co_{0.98-y}Al_yMn_{0.02}O_\delta$, $Li_\alpha Co_{0.97-y}Al_yMn_{0.03}O_\delta$, and $Li_\alpha Co_{0.96-y}Al_yMn_{0.04}O_\delta$, according to an illustrative embodiment.

Four samples of $Li_\alpha Co_{1-x-y}Al_yMn_xO_\delta$ were made into coin cells with a Li metal anode and cycled from 2.75-4.5V at C/5 charge/discharge rate. The four samples corresponded to x=0.01, 0.02. 0.03, and 0.04 where α=1.0; y ranged from 0.001-0.003; and δ was about 2.0. FIGS. 28 & 29 show plots of the derivative of the differential capacity with respect to electrochemical potential (i.e., dQ/dV vs V) illustrating the effect of Mn and Li content on battery cell performance. During the charge and discharge of a $LiCoO_2$ cathode, a phase transition from the hexagonal to monoclinic phase takes place between 4.0-4.3V (see FIG. 29). The phase transition also occurs for Mn substitutions of x=0.01 (see FIG. 28). The phase transition results in a volume expansion of the crystal lattice that may contribute to capacity fade of the electrode. In such situations, the substitution of Mn for Co in proportions greater than x=0.01 mitigates this phase transition, as demonstrated in FIG. 28 for compositions of x=0.02, 0.03, and 0.04.

The phase transition is also dependent on the Li content in the compound. When considering Mn substitutions as in $Li_\alpha Co_{0.97}Mn_{0.03}O_2$, the phase transition can be mitigated if $\alpha \leq 1.0$. FIG. 29 illustrates that, as the Li content increases from 0.977 to 1.014, the characteristic phase transition peaks in the dQ/dV curve between 4.0-4.3V reduce to a flat line for $\alpha=1.014$.

On the other hand, the benefit of Li excess is limited by its effect on volumetric energy density and retention. FIG. 30 demonstrates the effect of Li content in $Li_\alpha Co_{0.97}Mn_{0.03}O_2$ on the discharge energy during cycling between 2.75-4.5 V at a C/5 rate. The stoichiometric composition, $\alpha=1.003$, shows a maximum energy of 754 Wh/g, and loses about 8% of that energy in 25 cycles. The Li rich sample (i.e., $\alpha=1.014$) has a similar maximum but loses 10% of its energy. The sub-stoichiometric compositions (i.e., $\alpha \leq 1.0$) compositions show lower energies. This behavior and repeated tests with 2% Mn (i.e., x=0.02) indicate that the best energy and energy retention is obtained at a lithium content where $\alpha$ is about 1.00. The compositional values for each metal in the materials were determined by high precision ICP-OES analysis, with special regard to the measurement of the lithium content (i.e., $\alpha$).

Similar electrochemical measurements (not shown) also illustrate an effect of aluminum content on the mitigation of the hexagonal to monoclinic phase change. As aluminum is substituted into an otherwise fixed composition of $Li_\alpha Co_{1-x-y}Al_y Mn_x O_\delta$, the phase transformation is suppressed.

There may be a, x, and y where volumetric energy, energy retention and suppression of the phase transition occurs. From this examination it is determined that any substitution of Mn, Al, and Li, addition or other elements that can be substituted into the structure at total amounts of ≥3% (i.e., x≥0.03) will mitigate the hexagonal to monoclinic transition that occurs between 4.0-4.3V. It seems that the additions are also related to a sum of their oxidation states, i.e., $Mn^{4+}$, $Al^{3+}$, and $Li^+$ should be added up to some level to prevent the phase transition. This is because it has been observed that different Li stoichiometries for a given Mn content are needed to prevent the phase transition.

Example 20

Figure 31:
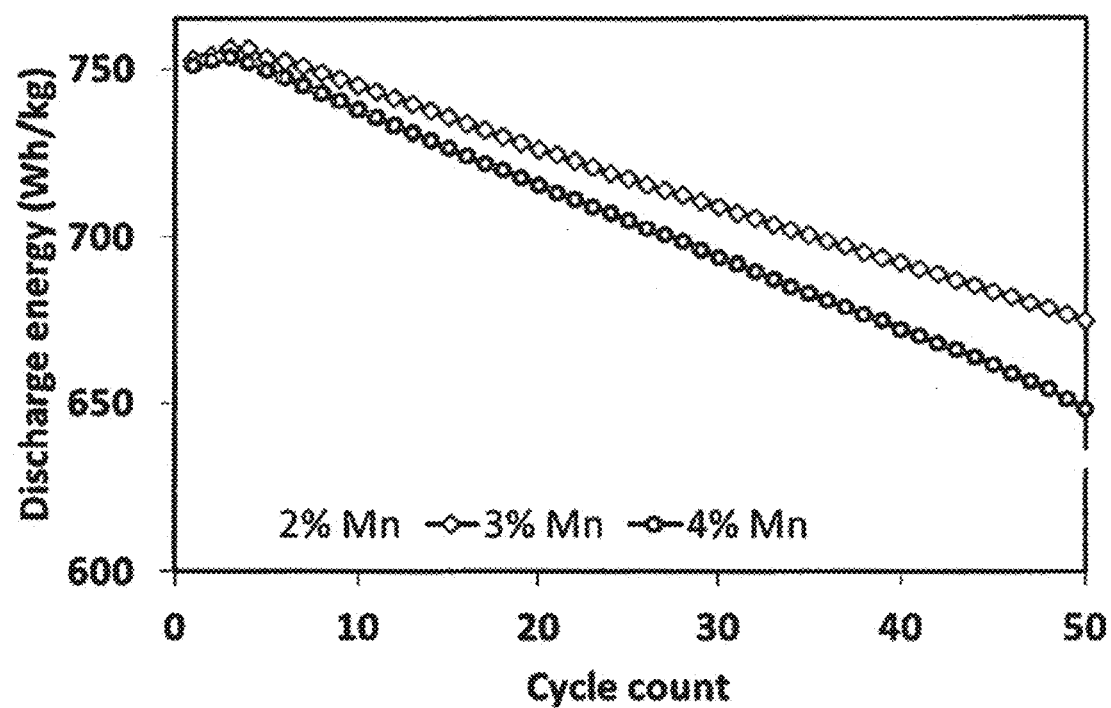
FIG. 31 is a plot of discharge energy versus cycle count for cathode active materials comprising $Li_\alpha Co_{0.98-y}Al_yMn_{0.02}O_\delta$, $Li_\alpha Co_{0.97-y}Al_yMn_{0.03}O_\delta$, and $Li_\alpha Co_{0.96-y}Al_yMn_{0.04}O_\delta$, according to an illustrative embodiment.

The optimum Mn content (i.e., x) to achieve the greatest volumetric energy density and energy retention of Mn-substituted $LiCoO_2$, cycling between 2.75-4.5 V at a C/5 rate is determined to lie between x=0.02 and x=0.04 as illustrated in FIG. 31. Battery cells including three compositions of x=0.02, 0.03, and 0.04 and containing similar Li and Al content were cycled from 2.75 to 4.5 V at a C/5 rate. The composition corresponding to x=0.03, although showing slightly lower initial energy compared to x=0.02, demonstrates the highest energy retention.

Example 21—Nuclear Magnetic Resonance

Solid-state $^6Li$ nuclear magnetic resonance (NMR) measurements have identified Mn—Mn clustering in $Li_\alpha Co_{1-x}Mn_x O_\delta$. Which clustering, would eventually lead to the formation of $Li_2MnO_3$ as Mn and Li content is increased beyond the phase limit for Li-rich compositions. Without wishing to be held to a particular mechanism or mode of action, Mn clustering stabilized the cathode structure, which can provide materials described herein with high voltage stability as shown in any electrochemical tests.

Figure 32:
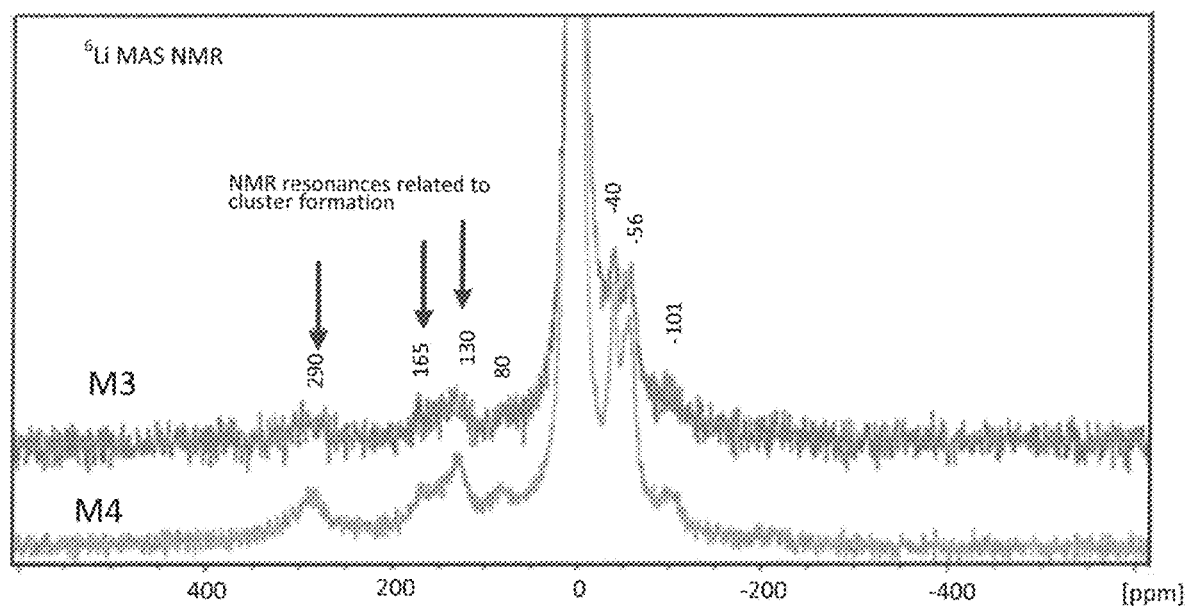
FIG. 32 is a plot of nuclear magnetic resonance patterns for $Li_\alpha Co_{0.97}Mn_{0.03}O_\delta$ and $Li_\alpha Co_{0.97}Mn_{0.03}O_\delta$, according to an illustrative embodiment.

Though HR-XRD and NMR did not show any $Li_2MnO_3$ formation for the compositions considered in this work. New phases peaks correspond to $Li_2MnO_3$ are absent in both HR-XRD and NMR spectra. FIG. 32 shows a comparison of x=0.03 and x=0.04 for Mn-substituted $LiCoO_2$. Quantification of the NMR at the designated resonances show that the clustering of manganese for x=0.04 is double that for x=0.03, rather than the expected 25% increase. Although Mn substitution is considered to stabilize the $LiCoO_2$ $R\bar{3}m$ crystal structure, large Mn clusters tend to incorporate Li into the transition metal (TM) layer, so that when Li is extracted from the crystal structure at higher voltage (4.5V), if Li in the transition metal layer drops into the lithium layer, vacancies created in the transition metal layer are destabilizing to the crystal structure.

Example 22—Aluminum Addition

Figure 33:
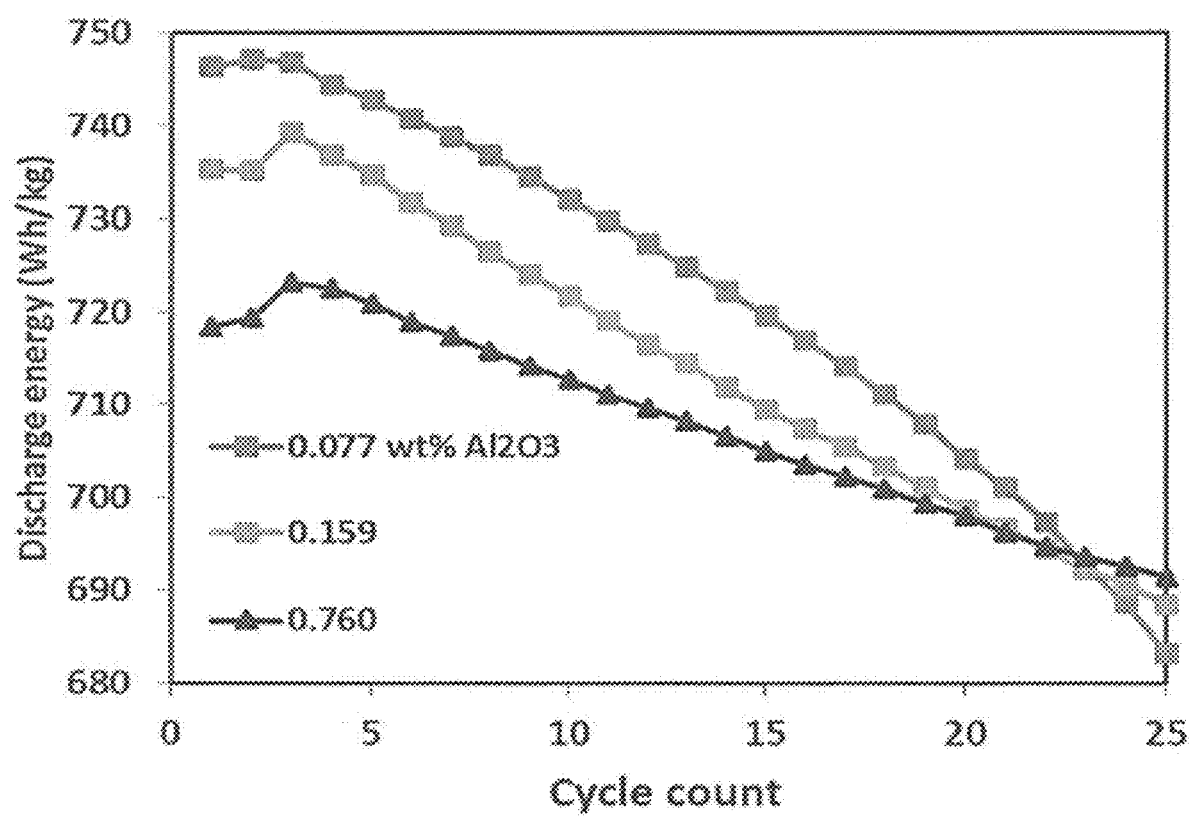
FIG. 33 is a plot of discharge energy versus cycle count for cathode active materials comprising $Li_{1.01}Co_{0.97-y}Al_yMn_{0.03}O_\delta$ for 0.077, 0.159, and 0.760 wt. % added $Al_2O_3$, according to an illustrative embodiment

Three cathode active materials with the composition $Li_{1.01}Co_{0.97-y}Al_y Mn_{0.03}O_\delta$ were made, fixing the Li and Mn content to 1.01 and 0.03, respectively, while varying the Al content to 0.077, 0.159 and 0.760 wt. %. The cathode active materials were tested in half-cells, cycling from 2.75-4.5V at a rate of C/5. FIG. 33 shows that as Al substitution is increased, the discharge energy decreases. However, the energy retention is improved with Al addition, with the largest substitution of 0.76 wt % Al exhibiting the best discharge energy after 25 cycles.

Example 23—Particle Morphology

To achieve stable and high energy densities, cathode active materials of composition of $Li_\alpha Co_{1-x-7}Al_y Mn_x O_\delta$ can be processed at sufficient temperatures and times such that secondary particles contain dense single grains (i.e., primary particles). These dense single grains can impart high strength to withstand calendaring processes during electrode fabrication and battery cell assembly. FIGS. 34A-34B & 35A-35B illustrate the effect of optimum processing to achieve high strength particles.

Figure 34A:
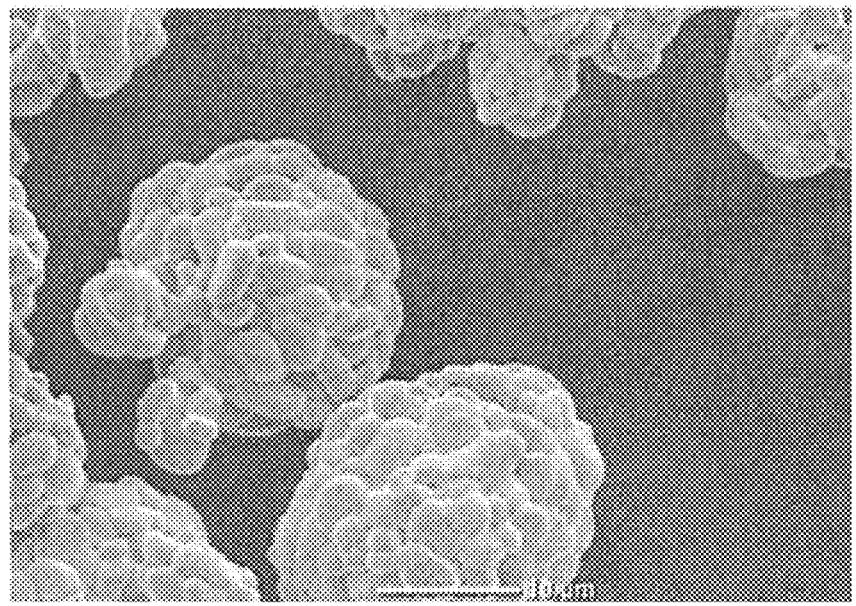
FIG. 34A is a scanning electron micrographs of particles of cathode active material prepared by firing a precursor and comprising $Li_\alpha Co_{1-x-y}Al_yMn_xO_\delta$, according to an illustrative embodiment.
Figure 34B:
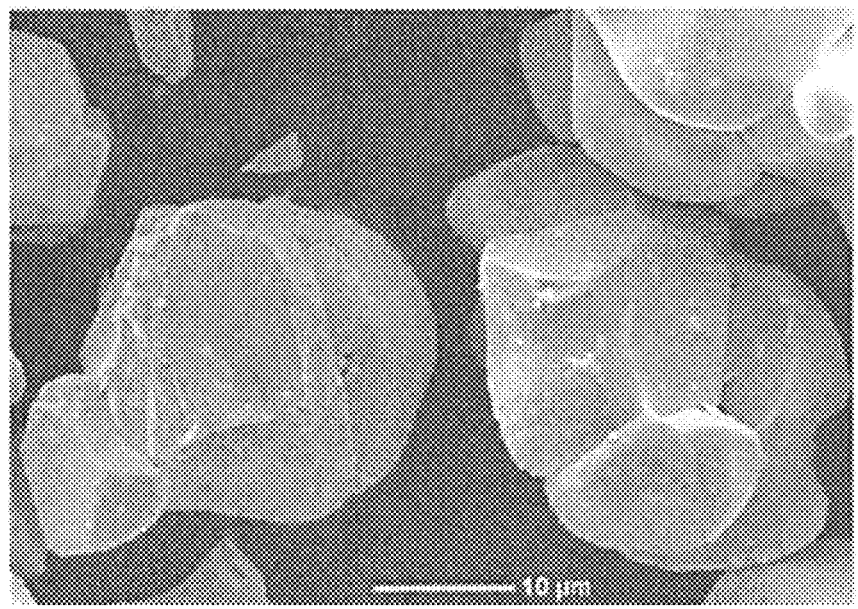
FIG. 34B is a scanning electron micrograph of the cathode active material of FIG. 34B, but in which the precursor was fired at a higher sintering temperature, according to an illustrative embodiment.
Figure 35A:
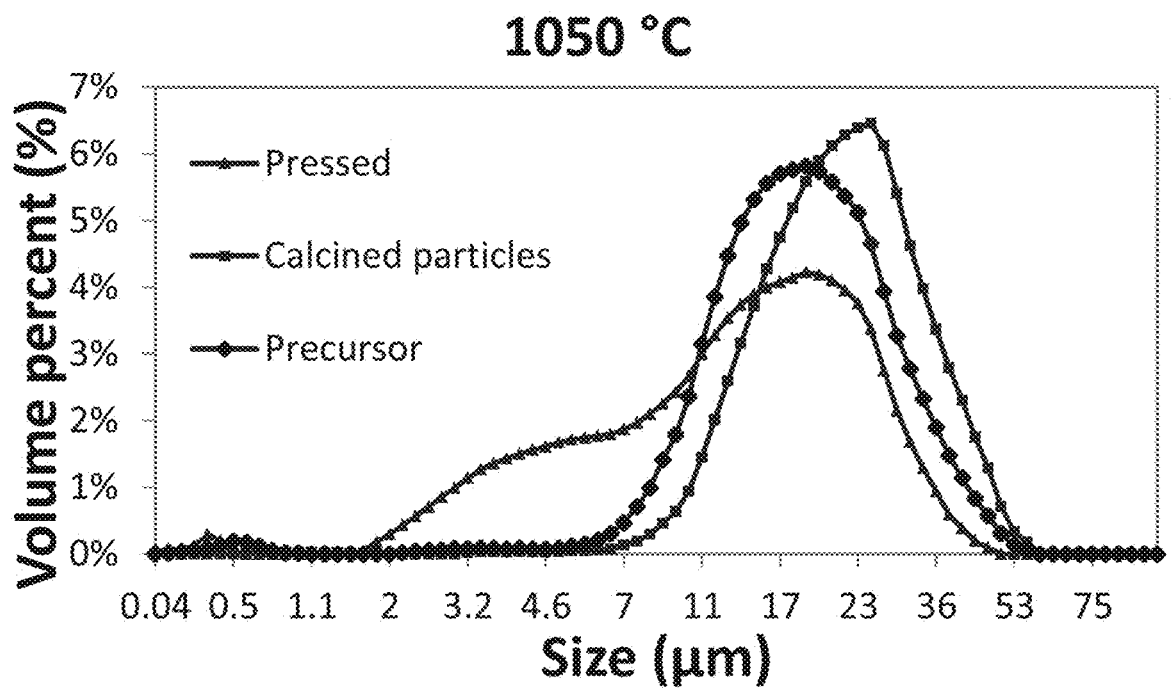
FIG. 35A is a particle size distribution of particles of cathode active material prepared from a precursor fired at 1050° C. and comprising $Li_\alpha Co_{1-x-y}Al_y Mn_x O_\delta$, according to an illustrative embodiment.
Figure 35B:
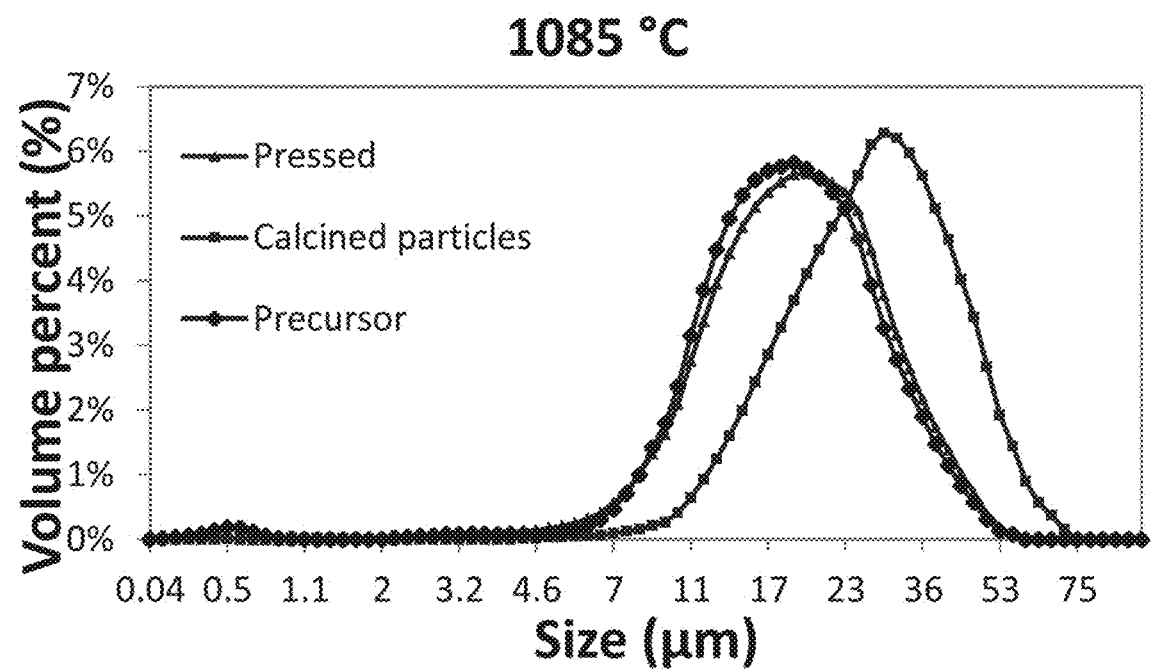
FIG. 35B a particle size distribution of particles of cathode active material prepared from a precursor fired at 1085° C. and comprising $Li_\alpha Co_{1-x-y}Al_y Mn_x O_\delta$, according to an illustrative embodiment

When precursor powders are processed at sufficient temperature and time, the multigrain structure found in FIG. 34A can be further sintered to gain larger and stronger grains as in FIG. 34B that are more difficult to crush. This improved strength is demonstrated in FIGS. 35A-35B. The size distribution of the precursor powder calcined at 1050° C. (FIG. 35A) grows from 18 to 22 µm due to the partial interconnection due to sintering. When the powder is pressed into a pellet and the particles are crushed under pressure a simulation of electrode laminate calendering), the particle size distribution is reduced into a bimodal distribution due to the breaking of particle-particle bonds (i.e., between primary particles) and particle fracture into smaller primary grains. However, when the temperature at the same processing time is raised to 1085° C., large single grains, which have sintered together during processing, break down to the original precursor size, but no further. This strength prevents the formation of new surfaces, such as surfaces which are not protected with an $Al_2O_3$ coating, and are subject to interaction with the electrolyte.

Example 24—Energy Retention

Figure 36:
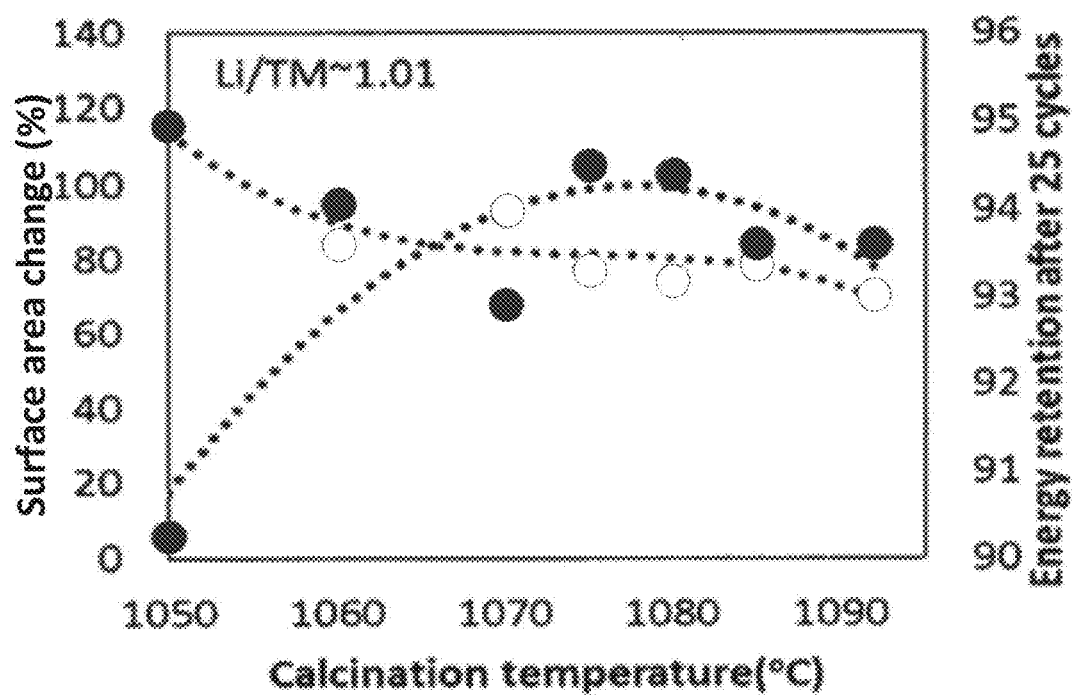
FIG. 36 is a plot of surface area change and energy retention versus calcination temperature of a cathode active material comprising $Li_{\square.01}Co_{1-x-y}Al_y Mn_x O_\delta$, according to an illustrative embodiment.

The calcination temperature not only affects particle strength, but the energy retention of the cathode active material as an electrode. As the calcination temperature increases the energy retention also increases to a maximum between 1075-1080° C. (FIG. 36). The change in surface area after compacting powder calcined at increasing temperatures stabilizes as the particle strength increases and no new surfaces are exposed due to crushing particles. FIG. 36 shows the correlation between strength (stabilized surface area change) and energy retention of the cathode active material. In FIG. 36, the cathode active material has a composition where the lithium to transition metal ratio (Li/TM) is 1.01 (i.e., $\alpha$=1.01 and y=0).

Figure 37:
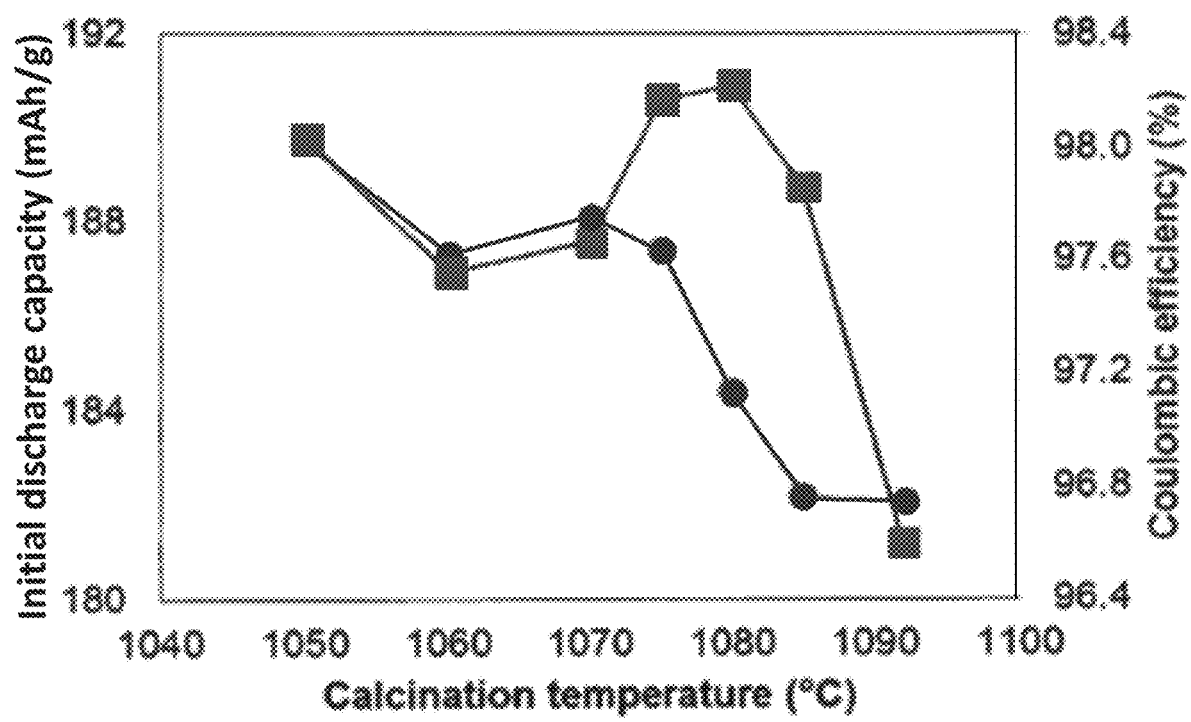
FIG. 37 is a plot of initial discharge capacity and coulombic efficiency versus calcination temperature of a cathode active material comprising $Li_{1.01}Co_{1-x-y}Al_y Mn_x O_\delta$, according to an illustrative embodiment.

The discharge capacity and coulombic efficiency of first cycle of the cathode material is also correlated to the calcination temperature. FIG. 37 illustrates this relationship. The initial discharge capacity and effectively, the initial energy decreases as the calcination temperature of the material is increased from 1050-1092° C. The coulombic efficiency is a measure of the amount of Li intercalated back into the cathode during the first discharge, showing the fraction of Li that is eliminated from future charge/discharge cycling. The maximum efficiency occurs at 1080° C., whereas the capacity while regarding the particle strength has an optimum 1070-1080° C. This sensitivity of the temperature of calcination is part of the novelty of the proposed invention, since it is shown to affect particle strength, energy retention, Li content, cyclability, capacity and energy of the material.

Example 25—Thermal Stability

Figure 38:
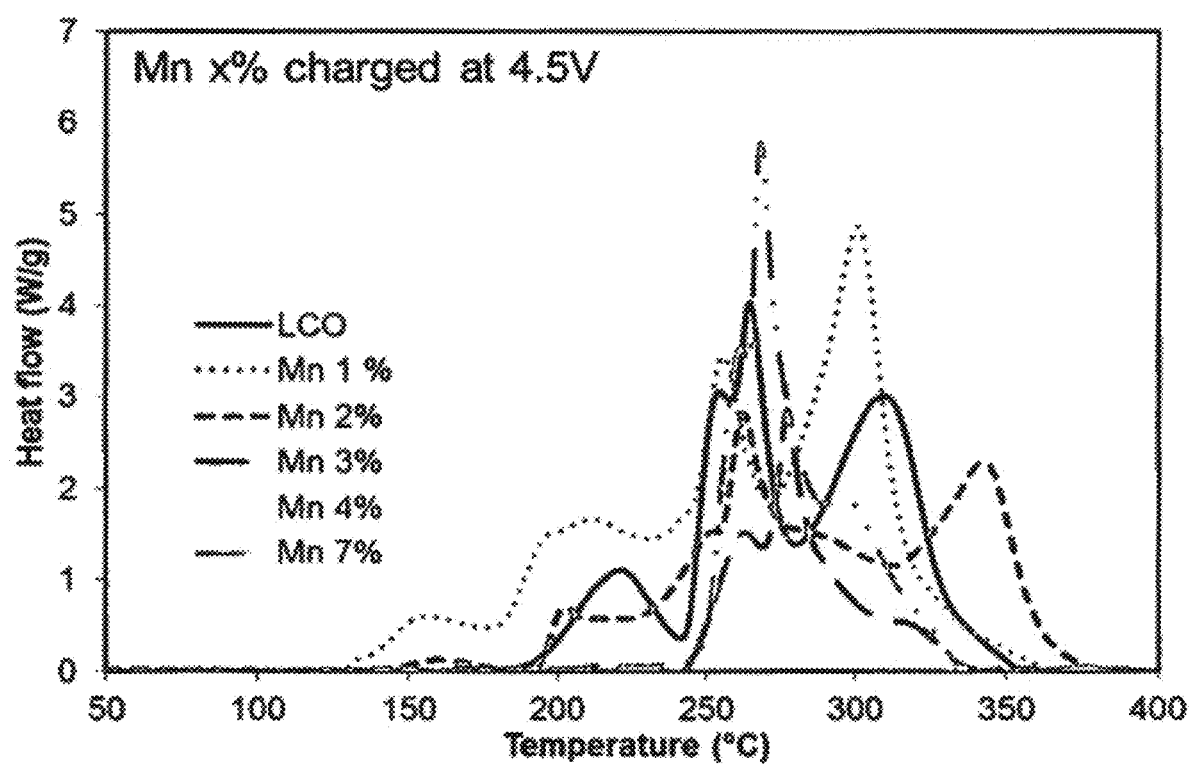
FIG. 38 is a plot of heat flow versus calcination temperature of cathode active materials comprising $LiCoO_2$, $Li_\alpha Co_{0.99}Mn_{0.10}O_\delta$, $Li_\alpha Co_{0.98}Mn_{0.02}O_\delta$, $Li_\alpha Co_{0.97}Mn_{0.03}O_\delta$, $Li_\alpha Co_{0.96}Mn_{0.04}O_\delta$, and $Li_\alpha Co_{0.93}Mn_{0.07}O_\delta$, according to an illustrative embodiment.

Along with the high energy of Li-ion battery materials comes the increased risk of unplanned energy release, e.g., heat that can cause a battery cell to catch fire. Differential scanning calorimetry (DSC) of cathode active materials charged and exposed to electrolyte help determine the risk of thermal failure. FIG. 38 shows DSC measurements of five Mn-substituted $LiCoO_2$ compositions from Mn=1-7 mole % (i.e. x=0.01-0.07). Compared to commercial LCO (i.e., $LiCoO_2$), the Mn 1% composition (i.e., x=0.01) shows a lower onset temperature to an exothermal reaction evolving more heat. However, as Mn content increases, the onset temperature of the reaction increases and the total heat released is reduced up to Mn 7%. After Mn=4%, onset temperature increases, but the heat release of the reaction begins to increase again. TABLE 4 enumerates these values. Based on the DSC measurements, the optimum Mn substitution is between Mn 3-4 mole % (i.e., 0.03≤x≤0.04).

lithium in the cathode active material while maintaining the R$\bar{3}$m crystal structure increases with increasing Mn content. This phase diagram of the $LiCo_{(1-x)}MnO_2$ system provides a map of the optimum Li addition without forming secondary phases.

Example 27—Raman Spectra

Figure 40:
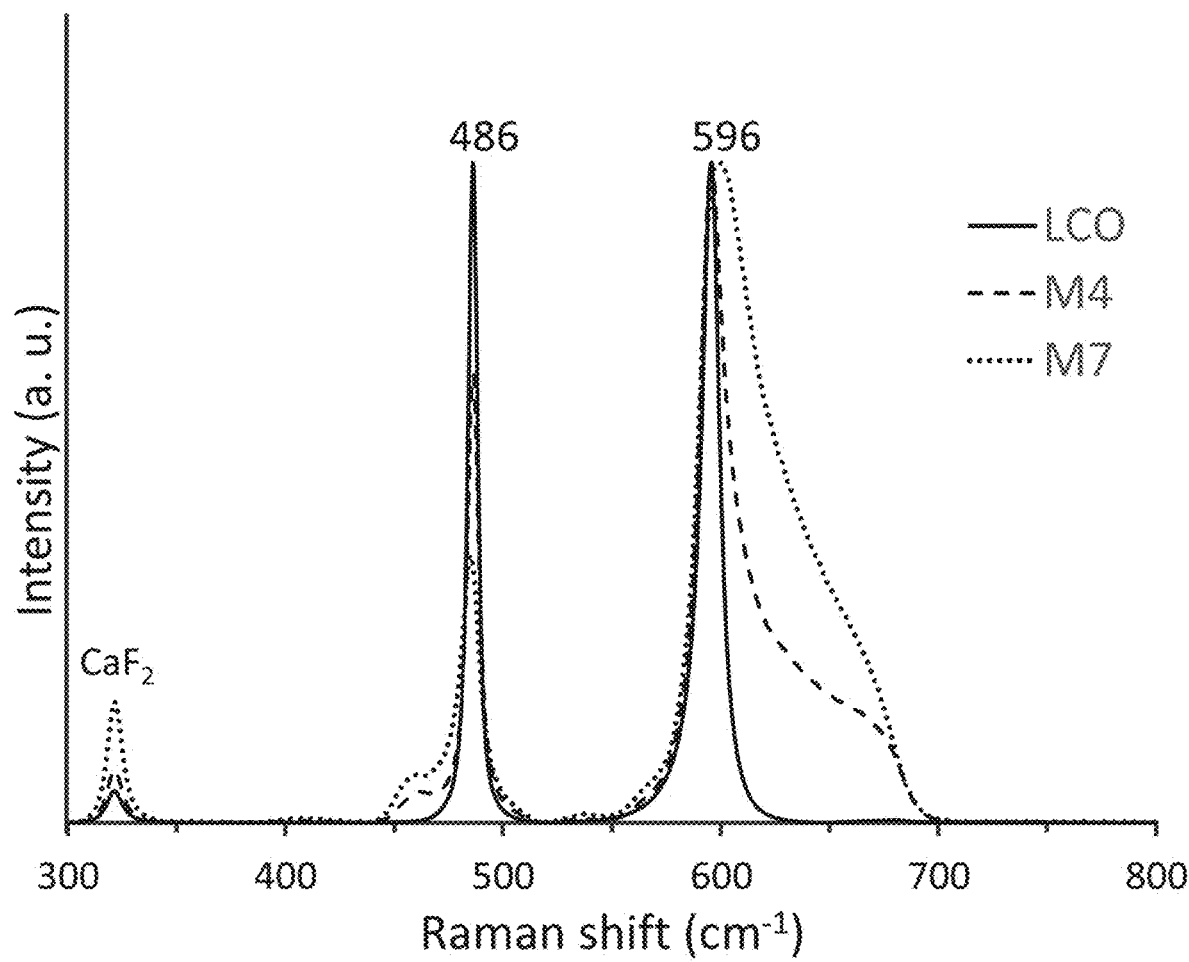
FIG. 40 is a plot of Raman spectra for cathode active materials comprising $LiCoO_2$, $Li_\alpha Co_{0.96}Mn_{0.04}O_\delta$, and $Li_\alpha Co_{0.93}Mn_{0.07}O_\delta$, according to an illustrative embodiment.

The Raman spectra of the layered $LiCoO_2$ and Mn-substituted $LiCoO_2$ (i.e., x=0.04 and 0.07) are shown in FIG. 40. The Raman spectra were obtained using 785-nm photonic excitation. According to factor-group analysis, the layered $LiCoO_2$ with R$\bar{3}$m crystal structure is predicted to show two Raman-active modes, i.e., one at ca. 596 cm$^{-1}$ with $Al_g$ symmetry due to a symmetric oxygen vibration along the c-axis and one at ca. 486 cm$^{-1}$ with $E_g$ symmetry due to two degenerate symmetric oxygen vibrations in the a/b crystallographic plane. With the addition of Mn into the structure, new Raman scattering features appear at frequencies above the 596 cm$^{-1}$ band and below the 486 cm$^{-1}$ band. This new scattering is due to Mn—O bond stretching vibrations associated with the various Mn—Co—Li occupancies that form throughout the transition metal layer. The relative intensity of the bands caused by these new Mn—O vibrations increases with increasing Mn substitution. The band near 320 cm$^{-1}$ is from the $CaF_2$ window through which the Raman spectra are taken.

Example 28—Stability to Oxidation

Figure 41:
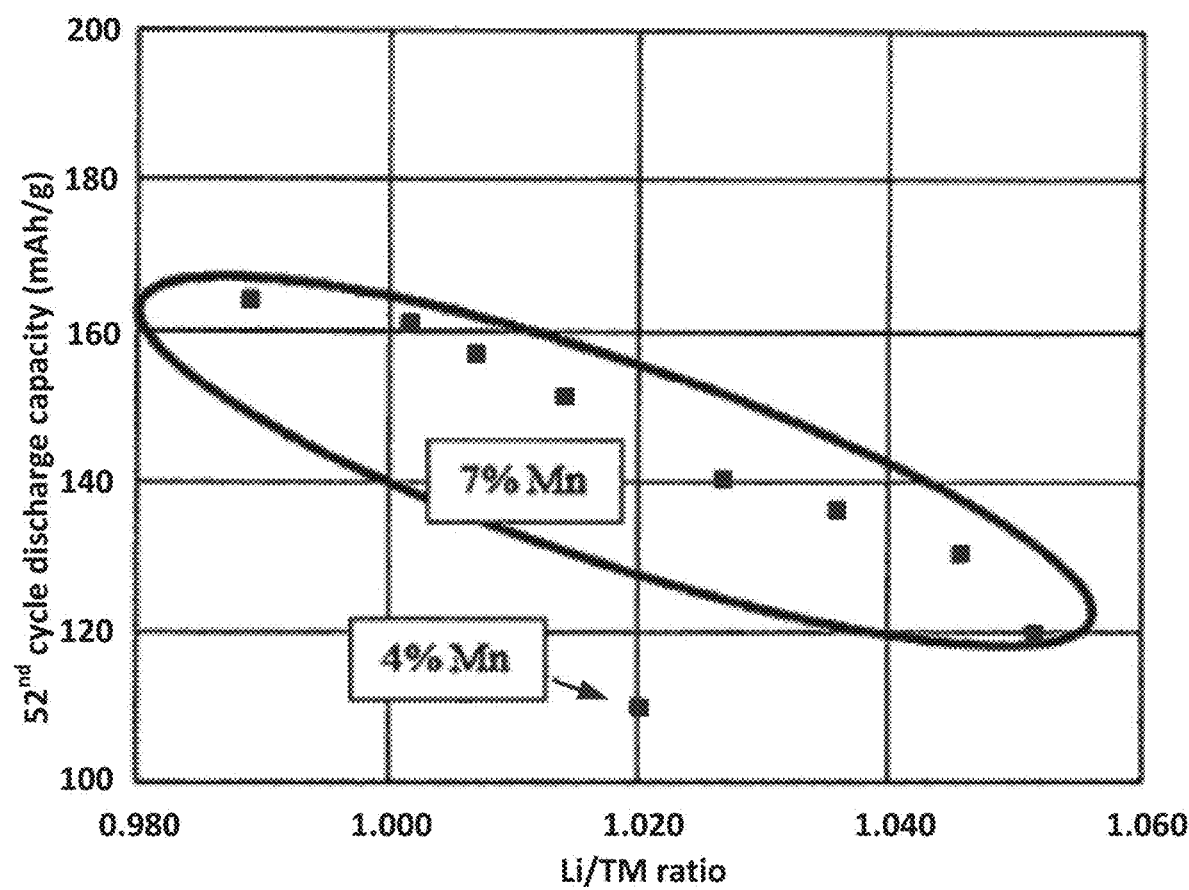
FIG. 41 is a plot of discharge capacity after 52 cycles versus lithium content, $\alpha$, of cathode active materials comprising $Li_\alpha Co_{0.96}Mn_{0.04}O_\delta$, and $Li_\alpha Co_{0.93}Mn_{0.07}O_\delta$, according to an illustrative embodiment.

The oxidative stability results for 7% Mn substitution (i.e., x=0.07) compared with 4% Mn substitution (i.e., x=0.04) are shown in FIG. 41. Half-cells were charged from an open circuit value to 4.65V and then cycled between 4.0 V and 4.65 V in a continuous cycling run. The 52nd cycle was a full cycle taken between 2.75 to 4.65 V. In FIG. 41, the plot of discharge capacity at 52nd cycle versus lithium to transition metal ratio (i.e., $\alpha$ where y=0) shows that the optimum capacity occurs at Li content (a) near unity. Compared to x=0.04 under these cycling conditions, the x=0.07 substitution maintains a higher capacity over 52 cycles, which shows better capacity retention under these conditions.

Figure 42:
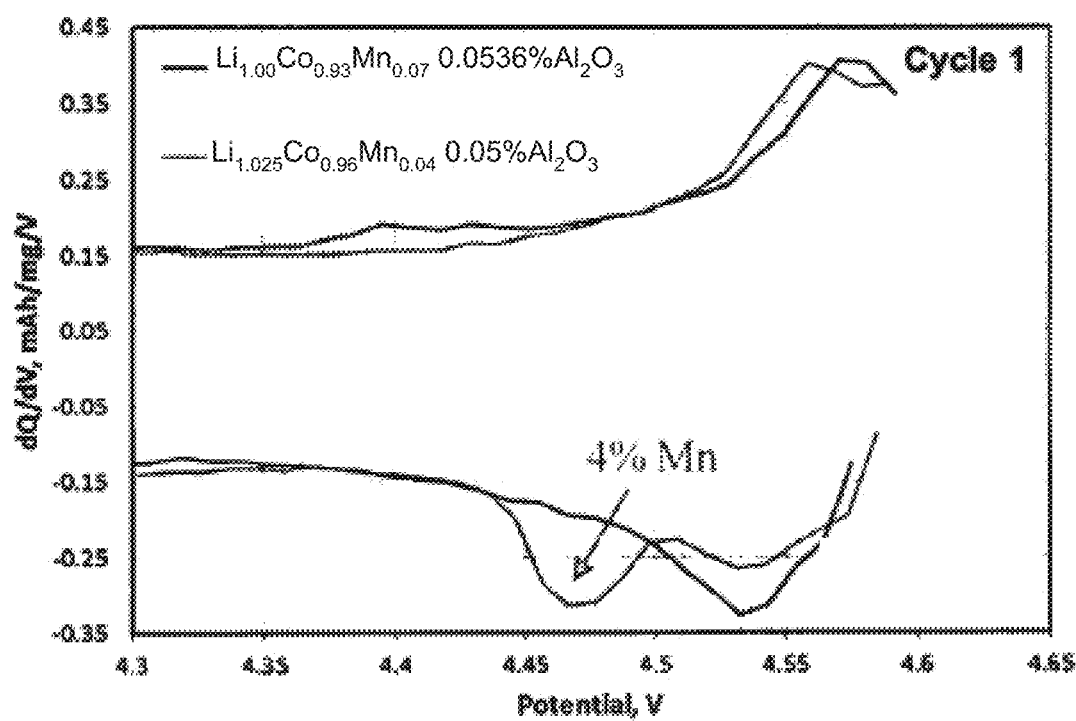
FIG. 42 is a plot of differential capacity curves for cathode active materials comprising $Li_{1.025}CO_{0.96-y}Al_y Mn_{0.04}O_\delta$, and $Li_{1.00}CO_{0.93-y}Al_y Mn_{0.07}O_\delta$, according to an illustrative embodiment.

In FIG. 42, the dQ/dV of a half-cell incorporating a cathode active material of $Li_{1.00}Co_{0.93-y}Al_yMn_{0.07}O_\delta$ is

TABLE 4

Summary of DSC Measurements

| | Sample Chemistry | | | | | |
|---|---|---|---|---|---|---|
| | $LiCoO_2$ | 1% Mn (x = 0.01) | 2% Mn (x = 0.02) | 3% Mn (x = 0.03) | 4% Mn (x = 0.04) | 7% Mn (x = 0.07) |
| Average Onset Temperature | 186° C. | 177° C. | 196° C. | 243° C. | 245° C. | 250° C. |
| Average Heat Released (50-400° C.) | 0.52 J/g | 0.57 J/g | 0.38 J/g | 0.16 J/g | 0.15 J/g | 0.31 J/g |

Example 26—Lattice Parameters

Figure 39:
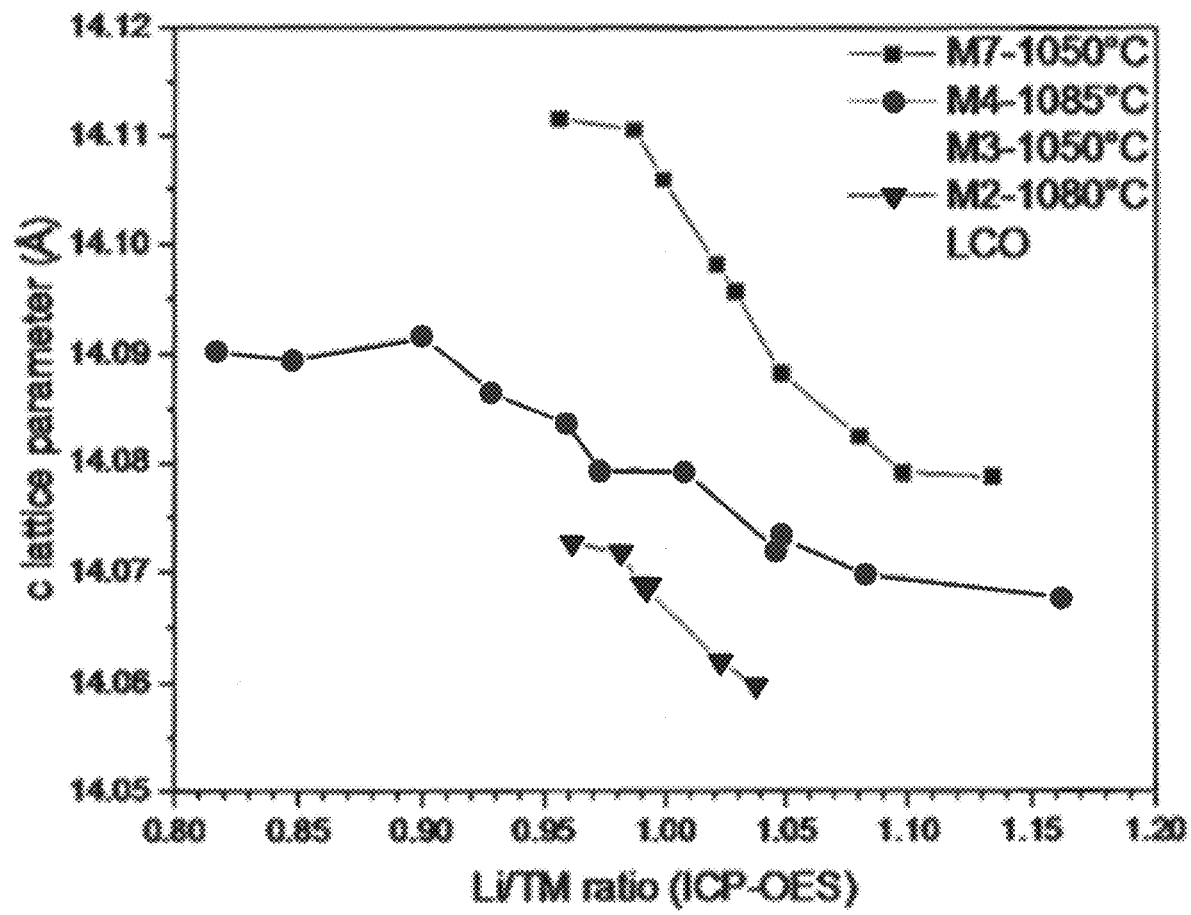
FIG. 39 is a plot of c-axis lattice parameter versus lithium content, $\alpha$, for cathode active materials comprising $LiCoO_2$, $Li_\alpha Co_{0.98}Mn_{0.02}O_\delta$, $Li_\alpha Co_{0.97}Mn_{0.03}O_\delta$, $Li_\alpha Co_{0.96}Mn_{0.04}O_\delta$, and $Li_\alpha Co_{0.93}Mn_{0.07}O_\delta$, according to an illustrative embodiment.

The Li content (i.e., $\alpha$), critical to the performance of the material, is associated with a change in the c-lattice parameter of the crystal structure varies as shown in FIG. 39. Depending on the Mn content, which also increases the c-lattice parameter as Mn is increased, the Li content will reduce the c-lattice value as Li increases. It also appears that capability of the materials to accommodate for excess plotted with the dQ/dV of a half-cell incorporating a cathode active material of $Li_{1.025}Co_{0.96-y}Al_yMn_{0.04}O_\delta$. FIG. 42 shows that the reduction process for the x=0.07 sample at high voltage occurs at approximately 4.53V. However, another reduction peak for the x=0.04 sample is evident at 4.47 V, which indicates possible instability or additional phase changes. Such instability or phases changes may lead to structural transformations with cycling. Note that there is no respective charge peak for this reduction process which could indicate irreversibility and thus inferior capacity retention when cycled to higher voltages of 4.65 V as discussed in FIG. 41.

Example 29—Capacity and Coulombic Efficiency

Figure 43:
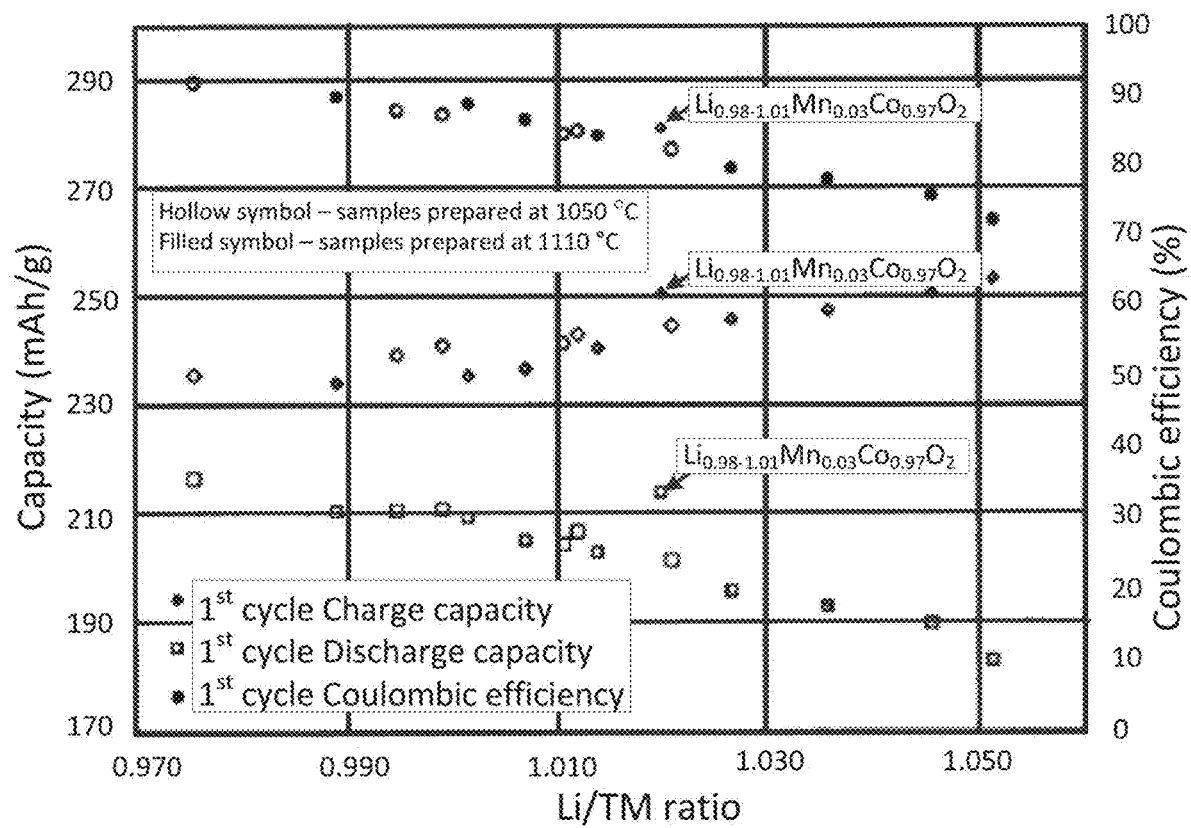
FIG. 43 is a data plot of first-cycle charge capacity, first-cycle discharge capacity, and first cycle coulombic efficiency versus lithium content, $\alpha$ for cathode active materials comprising $Li_\alpha Co_{0.96}Mn_{0.04}O_\delta$, according to an illustrative embodiment.

The capacity on the first cycle is depicted in FIG. 43 wherein the first cycle charge and discharge values are plotted as a function of the lithium to transition metal ratio (i.e., $\alpha$ where y=0) along with the calculated coulombic efficiencies. The improvement in coulombic efficiency is better for near stoichiometric values. The greater $\alpha$ the more Li can be extracted out of the cathode active material. However, and in converse, the higher the Li content, the lower the resultant discharge capacity. An optimal $\alpha$ is hence investigated.

Example 30—X-Ray Absorption

From X-ray absorption (XAS) results (not shown here), for all compounds throughout the series, Co is in the +3 oxidation state and Mn in the +4 oxidation state for all $\alpha$ values in the Mn-substituted $LiCoO_2$ samples. As such, the calculated stoichiometry is $Li_{0.983}Co_{0.914}Mn_{0.069}O_2$ and Li is deficient in the Li layer. Moving Li cations out from the Li layer to satisfy for transition metal layer leads to $Li_{0.966}[Li_{0.017}Co_{0.914}Mn_{0.069}]O_2$. (Note that the bracketed values for Li. Co, and Mn sum to unity.) For the purposes of this summary we further distinguish this material as having about 5% Li-deficiencies in the Li layer and some small amount of Li in the TM layer to join with Mn to make Mn—Li—Mn domains in place of Co—Co—Co domains with charge compensation being a key to the stability of the resulting lattice $LiMn_2$. However, the size of these units is limited as suggested by density functional theory (DFT) total energy calculations (not shown), and shows greater stability in the model as compared to x=0.04 under the above cycling conditions.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

We claim:

1. A compound of Formula (VII):

$$Li_\alpha Co_{1-x-y}M_yMn_xO_\delta \qquad (VII)$$

wherein
M is Al,
$0.95 \le \alpha \le 1.00$,
$0.001 \le x \le 0.07$,
$0 < y \le 0.05$, and
$1.98 \le \delta \le 2.04$.

2. The compound according to claim 1, wherein $0.95 \le \alpha \le 0.98$.

3. The compound according to claim 1, wherein $0.01 \le y \le 0.03$.

4. The compound according to claim 1, wherein $0.02 \le y \le 0.03$.

5. The compound according to claim 1, wherein $0.002 \le y \le 0.004$.

6. The compound of claim 1, wherein $0.002 \le y \le 0.005$.

7. The compound of claim 1, wherein M is in an amount of at least 2000 ppm.

8. The compound of claim 1, wherein M is in an amount of at least 900 ppm.

9. The compound of claim 1, wherein M is in an amount of at least 500 ppm.

* * * * *